(12) United States Patent
Kato et al.

(10) Patent No.: US 12,008,468 B2
(45) Date of Patent: Jun. 11, 2024

(54) DISTRIBUTED DEEP LEARNING SYSTEM USING A COMMUNICATION NETWORK FOR STOCHASTIC GRADIENT DESCENT CALCULATIONS

(71) Applicant: Nippon Telegraph and Telephone Corporation, Tokyo (JP)

(72) Inventors: Junichi Kato, Tokyo (JP); Kenji Kawai, Tokyo (JP); Huycu Ngo, Tokyo (JP); Yuki Arikawa, Tokyo (JP); Tsuyoshi Ito, Tokyo (JP); Takeshi Sakamoto, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 981 days.

(21) Appl. No.: 16/967,702

(22) PCT Filed: Feb. 6, 2019

(86) PCT No.: PCT/JP2019/004213
§ 371 (c)(1),
(2) Date: Aug. 5, 2020

(87) PCT Pub. No.: WO2019/159783
PCT Pub. Date: Aug. 22, 2019

(65) Prior Publication Data
US 2021/0034978 A1 Feb. 4, 2021

(30) Foreign Application Priority Data

Feb. 16, 2018 (JP) ................................. 2018-025940

(51) Int. Cl.
*G06N 3/08* (2023.01)
*G06N 3/04* (2023.01)
*G06N 3/063* (2023.01)

(52) U.S. Cl.
CPC ................ *G06N 3/08* (2013.01); *G06N 3/04* (2013.01); *G06N 3/063* (2013.01)

(58) Field of Classification Search
None
See application file for complete search history.

(56) References Cited

U.S. PATENT DOCUMENTS

| 2015/0193695 A1* | 7/2015 | Cruz Mota | ......... H04L 63/1425 706/12 |
| 2023/0177328 A1* | 6/2023 | Sridharan | .............. G06N 3/044 706/25 |

OTHER PUBLICATIONS

Zou et al, Distributed Training Large-Scale Deep Architectures, arXiv:1709.06622v1 [cs.DC] Aug. 10, 2017; pp. 1-10 (Year: 2017).*

(Continued)

*Primary Examiner* — Alan Chen
(74) *Attorney, Agent, or Firm* — SLATER MATSIL, LLP

(57) ABSTRACT

Each of learning nodes calculates gradients of a loss function from an output result obtained by inputting learning data to a learning target neural network, converts a calculation result into a packet, and transmits the packet to a computing interconnect device. The computing interconnect device receives the packet transmitted from each of the learning nodes, acquires a value of the gradients stored in the packet, calculates a sum of the gradients, converts a calculation result into a packet, and transmits the packet to each of the learning nodes. Each of the learning nodes receives the packet transmitted from the computing interconnect device and updates a constituent parameter of a neural network based on a value stored in the packet.

12 Claims, 35 Drawing Sheets

(56) References Cited

OTHER PUBLICATIONS

Bedi et al., Asynchronous Incremental Stochastic Dual Descent Algorithm for Network Resource Allocation, arXiv:1702.08290v2 [math.OC] Dec. 10, 2017, pp. 1-41 (Year: 2017).*
Daily et al., GossipGraD: Scalable Deep Learning using Gossip Communication based Asynchronous Gradient Descent, arXiv:1803.05880v1 [cs.DC] Mar. 15, 2018, pp. 1-13 (Year: 2018).*
Neckermann, Multi-Node Stochastic Gradient Descent, Master of Science School of Informatics, University of Edinburgh, 2017, Master Thesis; Total pages: 56 (Year: 2017).*
Chen et al., Revisiting Distributed Synchronous SGD, arXiv:1604.00981v3 [cs.LG] Mar. 21, 2017; Total Pages: 10 (Year: 2017).*
Li, Scaling Distributed Machine Learning with System and Algorithm Co-design, School of Computer Science Carnegie Mellon University Pittsburgh, PA, 2017; Dissertation; Total Pages: 178 (Year: 2017).*
Lin et al., A model-based approach to streamlining distributed training for asynchronous SGD, 2018 IEEE International Symposium on the Modeling, Analysis, and Simulation of Computer and Telecommunication Systems; pp. 306-318 (Year: 2018).*
M. Hidaka et al., "Development of environment-independent and-distributable Deep Convolutional Neural Network Framework with Java Script," Information Processing Society of Japan Research Report Graphics and CAD (CG), vol. 1.2015-CG-161, No. 3, 2015, 11 pages.
Priya Goyal, et al., "Accurate, Large Minibatch SGD: Training ImageNet in 1 Hour," Cornell University Library, https://arxiv.org/abs/1706.02677, Jun. 8, 2017, 12 pages.
Rengan Xu, et al., "Deep learning performance with NVIDIA® Tesla® P 100 GPU," Dell EMC, http://ja.community.dell.com/techcenter/m/mediagallery/3765/download, 2016, 9 pages.
Takuya Akiba, et al., "Extremely Large Minibatch SGD: Training ResNet-50 on ImageNet in 15 Minutes," Cornell University Library, https://arxiv.org/abs/1711.04325, Nov. 12, 2017, 4 pages.

* cited by examiner

DISTRIBUTED DEEP LEARNING SYSTEM USING A COMMUNICATION NETWORK FOR STOCHASTIC GRADIENT DESCENT CALCULATIONS

CROSS-REFERENCE TO RELATED APPLICATIONS

This application is a National phase entry of PCT Application No. PCT/JP2019/004213, filed on Feb. 6, 2019, which claims priority to Japanese Application No. 2018-025940, filed on Feb. 16, 2018, which applications are hereby incorporated herein by reference.

TECHNICAL FIELD

The present invention relates to a distributed deep learning system that executes deep learning, which is machine learning in which a neural network is used, in a plurality of learning nodes in a distributed manner and in cooperation.

BACKGROUND

Sophistication of services and provision of added values have been actively performed by utilization of machine learning for various kinds of information and data. Large calculation resources are often necessary for the machine learning in that case. In particular, in machine learning in which a neural network is used called deep learning, a large amount of data for learning need to be processed in learning, which is a process for optimizing constituent parameters of the neural network. In order to increase the speed of this learning processing, one solution is to perform parallel processing with a plurality of arithmetic operation devices.

For example, Non-Patent Literature 1 discloses a distributed deep learning system in which, as shown in FIG. 36, four learning nodes 100-1 to 100-4, an InfiniBand switch 101, and a head node 102 are connected via an InfiniBand network. Four GPUs (Graphics Processing Units) are mounted on each of the learning nodes 100-1 to 100-4. In the distributed deep learning system disclosed in this Non-Patent Literature 1, an increase in speed is achieved by processing learning arithmetic operation in parallel with the four learning nodes 100-1 to 100-4.

Non-Patent Literature 2 discloses a configuration in which a learning node (a GPU server) mounted with eight GPUs and an Ethernet (registered trademark) switch are connected via an Ethernet network. In this Non-Patent Literature 2, examples in which one learning node, two learning nodes, four learning nodes, eight learning nodes, sixteen learning nodes, thirty-two learning nodes, and forty-four learning nodes are used are respectively disclosed. Machine learning is performed on a system disclosed in Non-Patent Literature 2 using a distributed synchronous SGD (Stochastic Gradient Descent) method. Specifically, the machine learning is performed in the following procedure.

(I) A part of learning data is extracted. A set of the extracted learning data is referred to as minibatch.

(II) The minibatch is divided by the number of GPUs and allocated to each of the GPUs.

(III) In each of the GPUs, a loss function L(w) serving as an indicator indicating how much output values output from a neural network when the learning data allocated in (II) is input deviate from a correct answer (referred to as teacher data) is calculated. In this process for calculating a loss function, the output values are calculated in order from a layer on an input side toward a layer on an output side of the neural network. Therefore, this process is called forward propagation.

(IV) In each of the GPUs, partial differential values (gradients) due to constituent parameters of the neural network (weigh and the like of the neural network) with respect to the loss function value calculated in (III) are calculated. In this process, gradients with respect to the constituent parameters of each of the layers are calculated in order from the layer on the output side toward the layer on the input side of the neural network. Therefore, this process is referred to as back propagation.

(V) An average of the calculated gradients is calculated for each of the GPUs.

(VI) In each of the GPUs, each of the constituent parameters of the neural network is updated using the average of the gradients calculated in (V) and using the Stochastic Gradient Descent (SGD) method such that the loss function L(w) becomes smaller. The Stochastic Gradient Descent method is calculation processing for reducing the loss function L(w) by changing a value of each of the constituent parameters by a small amount in the direction of the gradients. By repeating this processing, the neural network is updated to a highly accurate neural network that has a small loss function L(w), that is, performs an output close to a correct answer.

Non-Patent Literature 3 discloses a distributed deep learning system having a configuration in which one hundred twenty-eight learning nodes each mounted with eight GPUs are connected via an InfiniBand network.

In all of the distributed deep learning systems disclosed in Non-Patent Literatures 1 to 3, it is indicated that learning speed increases and a learning time can be reduced as the number of learning nodes increases. In this case, an average of the neural network constituent parameters such as the gradients calculated by each of the learning nodes is calculated. Therefore, it is necessary to perform calculation such as average calculation by transmitting and receiving these constituent parameters among the learning nodes or transmitting and receiving the constituent parameters between the learning nodes and the head node described in Non-Patent Literature 1.

On the other hand, necessary communication processing rapidly increases as the number of nodes is increased in order to increase the number of parallel processes. As in the conventional technique, when arithmetic operation processing such as average calculation and data transmission and reception processing are performed by software on the learning nodes and the head node, there is a problem in that an overhead involved in the communication processing increases and it is difficult to sufficiently increase learning efficiency.

In Non-Patent Literature 3, a relation between a required time required to perform the learning processing by 100 cycles and a time required for communication in the required time and the number of GPUs is disclosed. According to this relation, the time required for communication increases as the number of GPUs increases. In particular, the time required for communication suddenly increases when the number of GPUs is 512 or more.

CITATION LIST

Non-Patent Literature

Non-Patent Literature 1: Rengan Xu and Nishanth Dandapanthu, "Performance of Deep Learning by NVIDIA (registered trademark) Tesla (registered trademark) P100 GPU", Dell Inc., 2016.

Non-Patent Literature 2: Priya Goyal, Piotr Dollar, Ross Girshick, Pieter Noordhuis, Lukasz Wesolowski, Aapo Kyrola, Andrew Tulloch, Yangqing Jia, Kaiming He, "Accurate, Large Minibatch SGD: Training ImageNet in 1 Hour", United States, Cornel University Library.

Non-Patent Literature 3: Takuya Akiba, Shuji Suzuki, Keisuke Fukuda, "Extremely Large Minibatch SGD: Training ResNet-50 on ImageNet in 15 Minutes", United States, Cornel University Library.

SUMMARY

Technical Problem

An object of embodiments of the present invention is to provide a distributed deep learning system that can perform, while processing learning in parallel with a large number of learning nodes connected to a communication network, cooperative processing at high speed among the learning nodes connected by the communication network.

Means for Solving the Problem

A distributed deep learning system (a first embodiment of the present invention) includes: a plurality of learning nodes; and a computing interconnect device connected to the plurality of learning nodes via a communication network. Each of the learning nodes includes: a gradient calculation unit that calculates a gradient of a loss function from an output result obtained by inputting learning data to a learning target neural network; a first transmission unit that converts a calculation result of the gradient calculation unit into a packet and transmits the packet to the computing interconnect device; a first reception unit that receives a packet transmitted from the computing interconnect device and acquires a value stored in the packet; and a constituent-parameter update unit that updates a constituent parameter of the neural network based on the value acquired by the first reception unit. The computing interconnect device includes: a second reception unit that receives a packet transmitted from each of the learning nodes and acquires a value of the gradient stored in the packet; an arithmetic unit that receives, as an input, the value of the gradient acquired by the second reception unit and performs calculation processing; and a second transmission unit that converts a calculation result of the arithmetic unit into a packet and transmits the packet to each of the learning nodes.

A distributed deep learning system (a second embodiment of the present invention) includes: a plurality of learning nodes; and a computing interconnect device connected to the plurality of learning nodes via a communication network. Each of the learning nodes includes: a gradient calculation unit that calculates a gradient of a loss function from an output result obtained by inputting learning data to a learning target neural network; a first transmission unit that converts a calculation result of the gradient calculation unit into a packet and transmits the packet to the computing interconnect device; a first reception unit that receives a packet transmitted from the computing interconnect device and acquires a value stored in the packet; and a constituent-parameter update unit that updates a constituent parameter of the neural network based on the value acquired by the first reception unit. The computing interconnect device includes: a constituent parameter memory that stores a constituent parameter of the neural network of each of the learning nodes; a second reception unit that receives a packet transmitted from each of the learning nodes and acquires a value of the gradient stored in the packet; an arithmetic unit that receives, as an input, the value of the gradient acquired by the second reception unit and performs calculation processing; a constituent-parameter-update computation unit that calculates, based on a calculation result of the arithmetic unit and a value of the constituent parameter stored in the constituent parameter memory, a value after update of the constituent parameter and updates the value of the constituent parameter stored in the constituent parameter memory; and a second transmission unit that converts the value after the update of the constituent parameter into a packet and transmits the packet to each of the learning nodes. The constituent-parameter update unit of each of the learning nodes overwrites the constituent parameter of the neural network with the value after the update of the constituent parameter acquired by the first reception unit.

A distributed deep learning system (a third embodiment of the present invention) includes: a plurality of learning nodes; and a plurality of computing interconnect devices connected to the plurality of learning nodes or other devices via a communication network. Each of the learning nodes includes: a gradient calculation unit that calculates a gradient of a loss function from an output result obtained by inputting learning data to a learning target neural network; a first transmission unit that converts a calculation result of the gradient calculation unit into a packet and transmits the packet to the computing interconnect device connected to the own node; a first reception unit that receives a packet transmitted from the computing interconnect device connected to the own node and acquires a value stored in the packet; and a constituent-parameter update unit that updates a constituent parameter of the neural network based on the value acquired by the first reception unit. The computing interconnect device positioned at highest order among the plurality of computing interconnect devices includes: a second reception unit that receives a packet transmitted from the computing interconnect device at immediately lower order than the own device and a packet transmitted from the learning node connected to the own device and acquires a value of the gradient stored in the received packets; a first arithmetic unit that receives, as an input, the value of the gradient acquired by the second reception unit and performs calculation processing; and a second transmission unit that converts a calculation result of the first arithmetic unit into a packet and transmits the packet to the computing interconnect device at immediately lower order than the own device and the learning node connected to the own device. The computing interconnect device at low order or the computing interconnect device positioned between the learning node at low order and the computing interconnect device higher in order among the plurality of computing interconnect devices includes: a third reception unit that receives a packet transmitted from the computing interconnect device at immediately lower order than the own device or a packet transmitted from the learning node connected to the own device and acquires a value of the gradient stored in the received packets; a second arithmetic unit that receives, as an input, the value of the gradient acquired by the third reception unit and performs calculation processing; a third transmission unit that converts a calculation result of the second arithmetic unit into a packet and transmits the packet to the computing interconnect device at immediately higher order than the own device; and a transfer unit that transfers a packet transmitted from the computing interconnect device at immediately higher order than the own device to the computing interconnect device at immediately lower order than the own device or the learning node connected to the own device or receives the packet transmitted from the computing interconnect device at immediately higher order than the own device, acquires a value stored in the packet, converts the acquired value into a packet again, and transmits the packet to the computing interconnect device at immediately lower order than the own device or the learning node connected to the own device.

A distributed deep learning system (a fourth embodiment of the present invention) includes: a plurality of learning nodes; and a plurality of computing interconnect devices connected to the plurality of learning nodes or other devices via a communication network. Each of the learning nodes includes: a gradient calculation unit that calculates a gradient of a loss function from an output result obtained by inputting learning data to a learning target neural network; a first transmission unit that converts a calculation result of the gradient calculation unit into a packet and transmits the packet to the computing interconnect device connected to the own node; a first reception unit that receives a packet transmitted from the computing interconnect device connected to the own node and acquires a value stored in the packet; and a constituent-parameter update unit that updates a constituent parameter of the neural network based on the value acquired by the first reception unit. The computing interconnect device positioned at highest order among the plurality of computing interconnect devices includes: a constituent parameter memory that stores a constituent parameter of the neural network of each of the learning nodes; a second reception unit that receives a packet transmitted from the computing interconnect device at immediately lower order than the own device and a packet transmitted from the learning node connected to the own device and acquires a value of the gradient stored in the received packets; a first arithmetic unit that receives, as an input, the value of the gradient acquired by the second reception unit and performs calculation processing; a constituent-parameter-update computation unit that calculates, based on a calculation result of the arithmetic unit and a value of the constituent parameter stored in the constituent parameter memory, a value after update of the constituent parameter and updates the value of the constituent parameter stored in the constituent parameter memory; and a second transmission unit that converts a value after the update of the constituent parameter into a packet and transmits the packet to the computing interconnect device at immediately lower order than the own device and the learning node connected to the own device. The computing interconnect device at low order or the computing interconnect device positioned between the learning node at low order and the computing interconnect device higher in order among the plurality of computing interconnect devices includes: a third reception unit that receives a packet transmitted from the computing interconnect device at immediately lower order than the own device or a packet transmitted from the learning node connected to the own device and acquires a value of the gradient stored in the received packets; a second arithmetic unit that receives, as an input, the value of the gradient acquired by the third reception unit and performs calculation processing; a third transmission unit that converts a calculation result of the second arithmetic unit into a packet and transmits the packet to the computing interconnect device at immediately higher order than the own device; and a transfer unit that transfers a packet transmitted from the computing interconnect device at immediately higher order than the own device to the computing interconnect device at immediately lower order than the own device or the learning node connected to the own device or receives the packet transmitted from the computing interconnect device at immediately higher order than the own device, acquires a value stored in the packet, converts the acquired value into a packet again, and transmits the packet to the computing interconnect device at immediately lower order than the own device or the learning node connected to the own device. The constituent-parameter update unit of each of the learning nodes overwrites the constituent parameter of the neural network with the value after the update of the constituent parameter acquired by the first reception unit.

A distributed deep learning system (a fifth embodiment of the present invention) includes: a plurality of learning nodes; and a plurality of computing interconnect devices connected to the plurality of learning nodes or other devices via a communication network. The plurality of computing interconnect devices are connected by a ring-type communication network that performs communication in only one direction. Each of the learning nodes includes: a gradient calculation unit that calculates a gradient of a loss function from an output result obtained by inputting learning data to a learning target neural network; a first transmission unit that converts a calculation result of the gradient calculation unit into a packet and transmits the packet to the computing interconnect device connected to the own node; a first reception unit that receives a packet transmitted from the computing interconnect device connected to the own node and acquires a value stored in the packet; and a constituent-parameter update unit that updates a constituent parameter of the neural network based on the value acquired by the first reception unit. A first computing interconnect device among the plurality of computing interconnect devices includes: a second reception unit that receives a packet transmitted from the learning node connected to the own device and acquires a value of the gradient stored in the packet; a third reception unit that receives a packet transmitted from the computing interconnect device adjacent to the own device upstream and acquires a value of the gradient stored in the packet; a first sort unit that outputs the value of the gradient acquired by the third reception unit and, when acquiring a value already acquired again, discards the value; a second transmission unit that converts the value of the gradient acquired by the second reception unit or the value of the gradient output from the first sort unit into a packet and transmits the packet to the computing interconnect device adjacent to the own device downstream; and a third transmission unit that converts the value of the gradient output from the first sort unit into a packet and transmits the packet to the learning node connected to the own device. A second computing interconnect device other than the first computing interconnect device among the plurality of computing interconnect devices includes: a fourth reception unit that receives a packet transmitted from the computing interconnect device adjacent to the own device upstream and acquires a value stored in the packet; a fifth reception unit that receives a packet transmitted from the learning node connected to the own device and acquires a value of the gradient stored in the packet; a second sort unit that sorts the value acquired by the fourth reception unit into a value of incompletion of calculation processing for the gradient and a value of completion of the calculation processing; an arithmetic unit that receives, as an input, the value of the incompletion output from the second sort unit and the value of the gradient acquired by the fifth reception unit and performs calculation processing; a fourth transmission unit that converts a calculation result of the arithmetic unit or the value of the completion output from the second sort unit into a packet and transmits the packet to the computing interconnect device adjacent to the own device downstream; and a fifth transmission unit that converts the value of the completion output from the second sort unit into a packet and transmits the packet to the learning node connected to the own device.

A distributed deep learning system (a sixth embodiment of the present invention) includes: a plurality of learning nodes; and a plurality of computing interconnect devices connected to the plurality of learning nodes or other devices via a communication network. The plurality of computing interconnect devices are connected by a ring-type communication network that performs communication in only one direction. Each of the learning nodes includes: a gradient calculation unit that calculates a gradient of a loss function from an output result obtained by inputting learning data to a learning target neural network; a first transmission unit that converts a calculation result of the gradient calculation unit into a packet and transmits the packet to the computing interconnect device connected to the own node; a first reception unit that receives a packet transmitted from the computing interconnect device connected to the own node and acquires a value stored in the packet; and a constituent-parameter update unit that updates a constituent parameter of the neural network based on the value acquired by the first reception unit. A first computing interconnect device among the plurality of computing interconnect devices includes: a constituent parameter memory that stores a constituent parameter of the neural network of each of the learning nodes; a second reception unit that receives a packet transmitted from the learning node connected to the own device and acquires a value of the gradient stored in the packet; a third reception unit that receives a packet transmitted from the computing interconnect device adjacent to the own device upstream and acquires a value of the gradient stored in the packet; a first sort unit that outputs the value of the gradient acquired by the third reception unit and, when acquiring a value already acquired again, discards the value; a constituent-parameter-update computation unit that calculates, based on the value of the gradient output from the first sort unit and a value of the constituent parameter stored in the constituent parameter memory, a value after update of the constituent parameter and updates the value of the constituent parameter stored in the constituent parameter memory; a second transmission unit that converts the value of the gradient acquired by the second reception unit or the value after the update of the constituent parameter into a packet and transmits the packet to the computing interconnect device adjacent to the own device downstream; and a third transmission unit that converts the value after the update of the constituent parameter into a packet and transmits the packet to the learning node connected to the own device. A second computing interconnect device other than the first computing interconnect device among the plurality of computing interconnect devices includes: a fourth reception unit that receives a packet transmitted from the computing interconnect device adjacent to the own device upstream and acquires a value stored in the packet; a fifth reception unit that receives a packet transmitted from the learning node connected to the own device and acquires a value of the gradient stored in the packet; a second sort unit that sorts the value acquired by the fourth reception unit into a value of incompletion of calculation processing for the gradient and the value after the update of the constituent parameter; an arithmetic unit that receives, as an input, the value of the incompletion output from the second sort unit and the value of the gradient acquired by the fifth reception unit and performs calculation processing; a fourth transmission unit that converts a calculation result of the arithmetic unit or the value after the update of the constituent parameter output from the second sort unit into a packet and transmits the packet to the computing interconnect device adjacent to the own device downstream; and a fifth transmission unit that converts the value after the update of the constituent parameter output from the second sort unit into a packet and transmits the packet to the learning node connected to the own device. The constituent-parameter update unit of each of the learning nodes overwrites the constituent parameter of the neural network with the value after the update of the constituent parameter acquired by the first reception unit.

Effects of Embodiments of the Invention

According to embodiments of the present invention, transmission and reception processing for a communication packet between a computing interconnect device and learning nodes can be performed by hardware processing simultaneously in parallel and at high speed. Therefore, it is possible to process distributed deep learning at high speed compared with when the communication processing and the gradient addition processing are performed by software processing in the conventional head node.

DETAILED DESCRIPTION OF ILLUSTRATIVE EMBODIMENTS

First Embodiment

Figure 1:
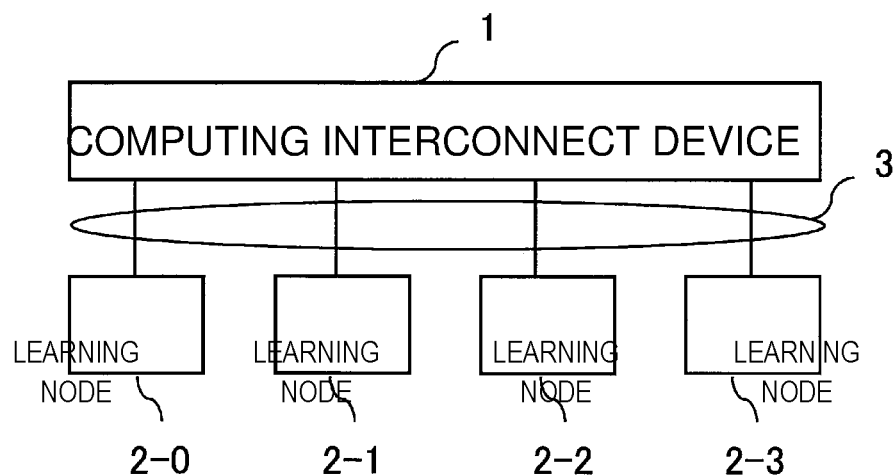
FIG. 1 is a block diagram showing a configuration of a distributed deep learning system according to a first embodiment of the present invention.

Embodiments of the present invention are explained below with reference to the drawings. FIG. 1 is a block diagram showing a configuration of a distributed deep learning system according to a first embodiment of the present invention. The distributed deep learning system according to this embodiment includes one computing interconnect (CI) device 1 and four learning nodes 2-0 to 2-3. In this embodiment, a star-type network configuration is adopted.

Note that, in embodiments of the present invention, computing interconnect devices or learning nodes mean devices distributed and disposed on a network.

The computing interconnect device 1 includes four communication ports. The communication ports and communication ports of the learning nodes 2-0 to 2-3 are connected via a communication network 3. As the communication network 3, a network for exchanging a communication packet to perform communication such as an Ethernet or an InfiniBand is used.

<Explanation of the Learning Nodes>

The learning nodes 2-0 to 2-3 are devices that have a learning function of calculating output values of neural networks, which are mathematical models constructed in a software manner, and further updating constituent parameters of the neural networks according to learning data to improve accuracy of the output values. The neural networks are constructed in the learning nodes 2-0 to 2-3.

As a method of realizing the learning nodes 2-0 to 2-3, the learning nodes 2-0 to 2-3 may be realized by software on a CPU or a GPU or may be realized by an LSI (Large Scale Integration) circuit formed on an FPGA (Field Programmable Gate Array) or an ASIC (Application Specific Integrated Circuit).

<Explanation About Learning>

Figure 2:
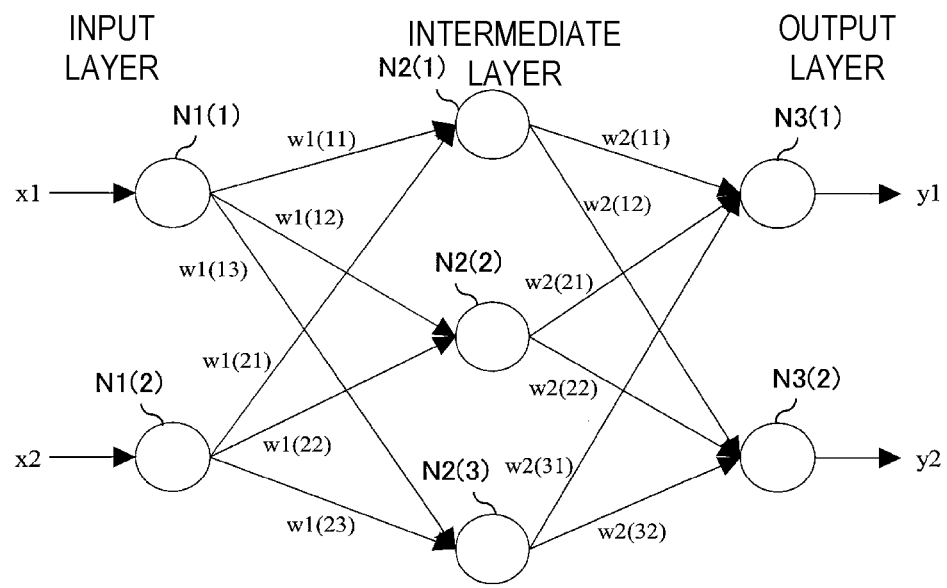
FIG. 2 is a block diagram showing a configuration of a two-layer neural network.

Learning processing of the neural networks in the learning nodes 2-0 to 2-3 is explained using learning with teacher data as an example. An extremely simple two-layer neural network including an input layer (a first layer), an intermediate layer (a second layer), and an output layer (a third layer) is shown in FIG. 2 as an example of the neural networks. In FIG. 2, Nk(i) is an i-th neuron in a k-th layer, x1 and x2 are inputs, y1 and y2 are outputs, w1(11), w1(12), . . . , and w1(23) are weight parameters in a first layer, and w2(11), w2(12), . . . , and w2(32) are weight parameters in a second layer.

In the case of the learning with teacher data, teacher data (correct answer data) corresponding to learning data is prepared for the learning data. Constituent parameters of the neural network are updated such that an output value of the neural network becomes close to the teacher data. The constituent parameters of the neural network in the case of the example shown in FIG. 2 are the weights w1(11), w1(12), . . . , and w1(23) and w2(11), w2(12), . . . , and w2(32). Accuracy of the neural network is increased by optimizing these constituent parameters.

Specifically, a loss function serving as an indicator indicating how much an output value of the neural network and the teacher data deviate from each other. Therefore, the constituent parameters are updated such that the loss function decreases. In this example, when teacher data corresponding to the input learning data x1 and x2 are represented as t1 and t2, a loss function L is represented, for example, as indicated by the following expression.

[Math 1]

$$L = \frac{1}{2}\sum_{k=1}^{2} (y_k - t_k)^2 \qquad (1)$$

Subsequently, partial differential values (which are referred to as gradients) due to the constituent parameters of the neural network with respect to the loss function L are calculated. In this example, the gradients are as follows.

[Math 2]

$$\left(\frac{\partial L}{\partial w1(11)}, \frac{\partial L}{\partial w1(12)}, \cdots, \right. \\ \left. \frac{\partial L}{\partial w1(23)}, \frac{\partial L}{\partial w2(11)}, \frac{\partial L}{\partial w2(12)}, \cdots, \frac{\partial L}{\partial w2(32)}\right) \qquad (2)$$

Subsequently, the constituent parameters of the neural network are updated using the gradients such that the loss function L becomes smaller. There are various methods for the update. Respective weight parameters are updated as follows using, for example, a gradient descent method.

[Math 3]

$$w1(11) \leftarrow w1(11) - \eta\frac{\partial L}{\partial w1(11)} \qquad (3)$$
$$\cdots$$
$$w2(32) \leftarrow w2(32) - \eta\frac{\partial L}{\partial w2(32)}$$

Here, η is a constant called learning ratio. According to Expression (3), the weight parameters are changed by an amount proportional to the learning ratio η in the opposite direction of the gradients, that is, a direction for reducing the loss function L. Therefore, a loss function L of the neural network after update is smaller than the loss function L before the update.

In this way, processing for calculation of the loss function L, calculation of the gradients, and update of the constituent parameters is performed on one set of input learning data. The next input learning data is input to and the same processing is performed on the neural network having the updated constituent parameters to update the constituent parameters. By repeating this cycle, the neural network is updated to a neural network with a small loss function L to perform learning of the neural network.

In a process for calculating the loss function L, output values are calculated in order from the input layer toward the output layer of the neural network. Therefore, this process is referred to as forward propagation. On the other hand, in a process for calculating the gradients, a method called back propagation for calculating gradients for the constituent parameters in the layers in order from the output layer toward the input layer of the neural network is often used.

<Distributed Learning Processing by a Plurality of Learning Nodes>

To achieve sufficient accuracy in the learning of the neural network explained above, it is necessary to input a large amount of learning data to the neural network and repeat the learning processing. This requires a long time. There is a great advantage in reducing the required time for the learning.

In order to reduce the required time for the learning, a method of distributed cooperative learning for preparing a plurality of learning nodes of the same neural network, dividing learning data to the respective learning nodes to learn the learning data in parallel to thereby reduce a total learning time has been adopted. A procedure of conventional distributed learning processing is explained with reference to FIG. 3.

First, learning data x is divided into learning data for the number of learning nodes 100-1 to 100-3 and allocated to the learning nodes 100-1 to 100-3. Note that, in FIG. 3, one each of x0 to x3 is described as a representative of learning data allocated to the learning nodes 100-0 to 100-3. However, the learning data x0 to x3 respectively include sets of one to a plurality of learning data.

Subsequently, the learning nodes 100-0 to 100-3 respectively input the learning data x0 to x3 to the neural network and calculate the loss function L with a method of forward propagation (step S100 in FIG. 3). Note that one loss function L is obtained for the learning nodes 100-0 to 100-3 (neural networks).

Subsequently, the learning nodes 100-0 to 100-3 calculate gradients of the loss function L calculated in step S100 with a method of back propagation (step S101 in FIG. 3). The gradients of the loss function L are vectors including components of each of constituent parameters as indicated by Expression (2). In embodiments of the present invention, such gradient vectors are simply referred to as gradients.

Subsequently, for example, the head node 102 calculates an average of the gradients respectively calculated by the learning nodes 100-0 to 100-3 and returns a result of the calculation to the learning nodes 100-0 to 100-3 (step S102 in FIG. 3). This processing is referred to as All-reduce processing. Note that a sum of the gradients may be calculated instead of the average of the gradients. At this time, for example, if the learning ratio η during update processing for the next weight parameter is multiplied by (1/the number of learning nodes), the same result as the result of calculating the average of the gradients is obtained.

Figure 3:
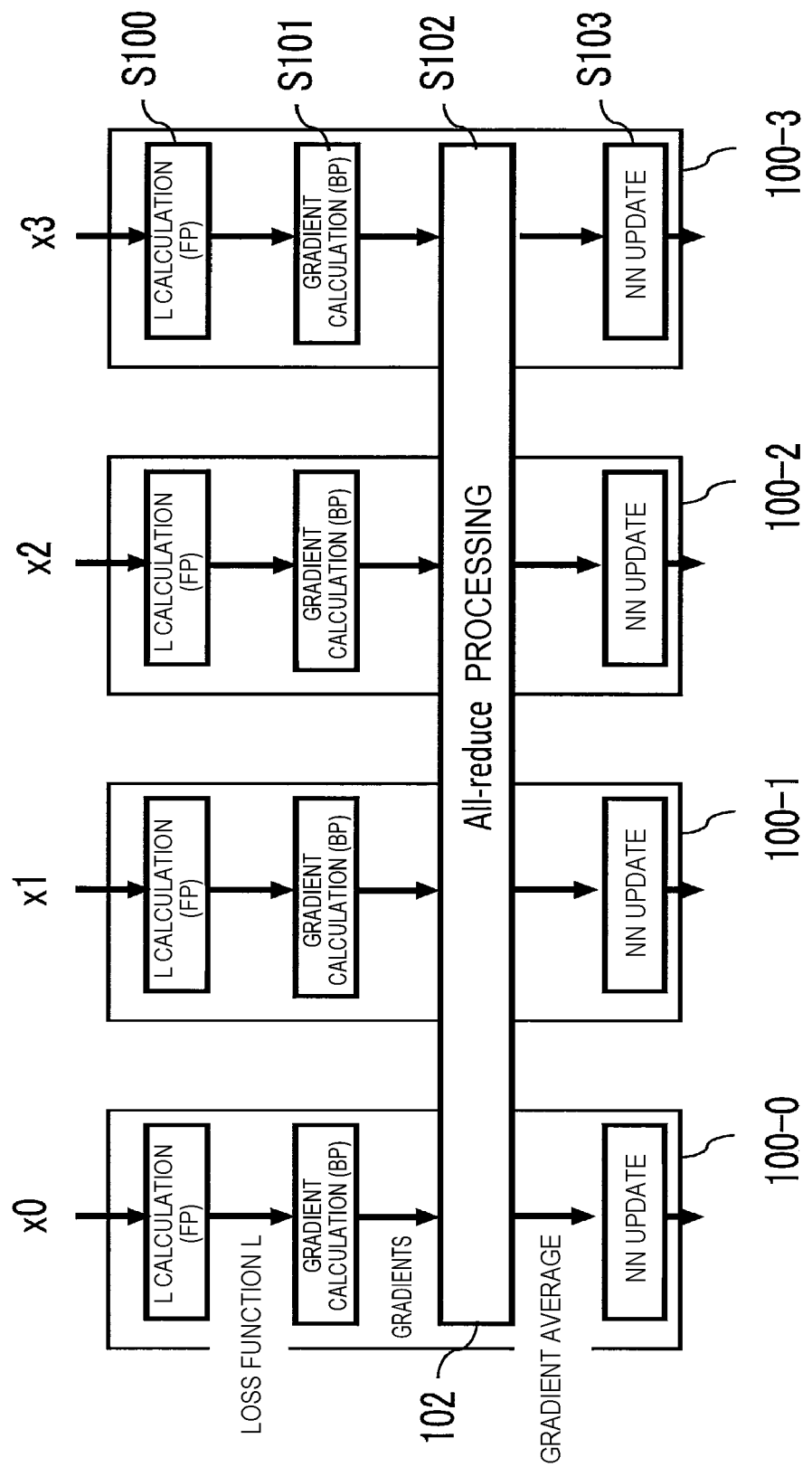
FIG. 3 is a diagram for explaining a procedure of conventional distributed learning processing.

Finally, the learning nodes 100-0 to 100-3 update the weight parameters of the neural network using the average of the gradients calculated in step S102 (step S103 in FIG. 3).

Consequently, one cycle of the distributed learning ends.
<Distributed Processing in This Embodiment>

Subsequently, a procedure of distributed learning processing in this embodiment is explained with reference to FIG. 4. In this embodiment, as in the past, the learning nodes 2-0 to 2-3 respectively input the learning data x0 to x3 to the neural network and calculate the loss function L (step S200 in FIG. 4). Subsequently, the learning nodes 2-0 to 2-3 calculate gradients of the loss function L (step S201 in FIG. 4). The learning nodes 2-0 to 2-3 respectively transmit calculation values of the calculated gradients to the computing interconnect device 1 connected to the learning nodes 2-0 to 2-3 by a communication network (step S202 in FIG. 4).

Figure 4:
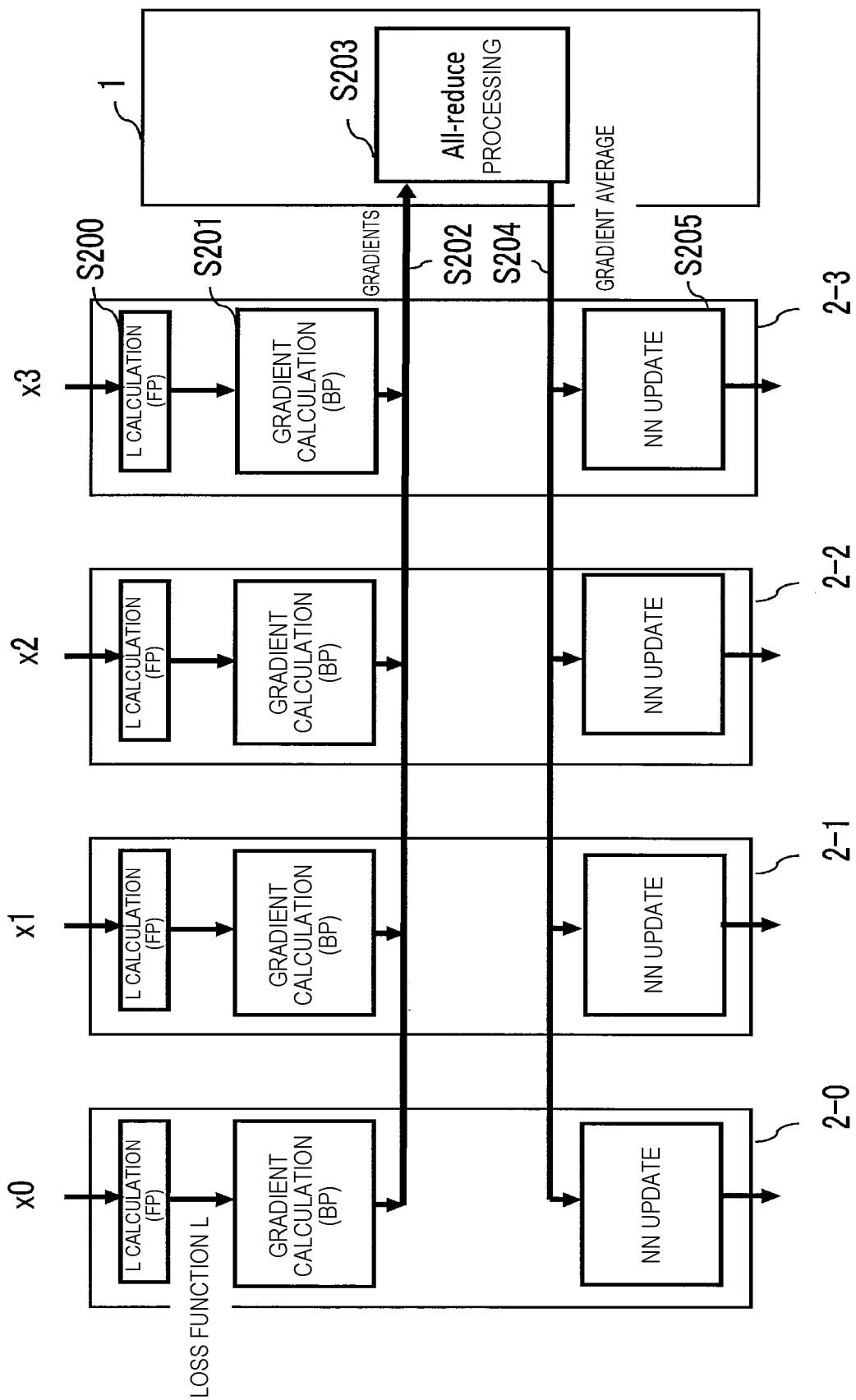
FIG. 4 is a diagram for explaining a procedure of distributed learning processing according to the first embodiment of the present invention.

Note that, as in FIG. 3, in FIG. 4, one each of x0 to x3 is described as a representative of learning data allocated to the learning nodes 2-0 to 2-3. However, the learning data x0 to x3 respectively include sets of one to a plurality of learning data.

Subsequently, the computing interconnect device 1 performs All-reduce processing (step S203 in FIG. 4) for calculating an average of the gradients transmitted from the learning nodes 2-0 to 2-3 and transmitting a result of the calculation to the learning nodes 2-0 to 2-3 (step S204 in FIG. 4).

Finally, the learning nodes 2-0 to 2-3 update constituent parameters of the neural network using the average of the gradients transmitted from the computing interconnect device 1 (step S205 in FIG. 4).

Note that a sum of the gradients may be calculated instead of the average of the gradients. At this time, for example, if the learning ratio η during update processing for the next weight parameter is multiplied by (1/the number of learning nodes), the same result as the result of calculating the average of the gradients is obtained. The gradients may be multiplied by a weighting constant to use a weighted average or a root mean square of the gradients may be calculated.

Consequently, one cycle of the distributed learning in this embodiment ends.

Usually, gradient calculation calculates gradients for constituent parameters (weight parameters) in layers in order from the output layer toward the input layer of the neural network according to the method of back propagation. Therefore, in transmitting gradient calculation results of the learning nodes 2-0 to 2-3 to the computing interconnect device 1, it is unnecessary to wait until the gradient calculation for all the layers ends.

Therefore, the learning nodes 2-0 to 2-3 calculate the loss function L as explained above (step S200 in FIG. 5) and calculate gradients of the loss function L (step S201 in FIG. 5). However, the learning nodes 2-0 to 2-3 can transmit, without waiting for the calculation of the gradients for all the constituent parameters to end in step S201, gradient values to the computing interconnect device 1 in order from the gradient value for the constituent parameter for which the calculation ends (step S206 in FIG. 5).

Figure 5:
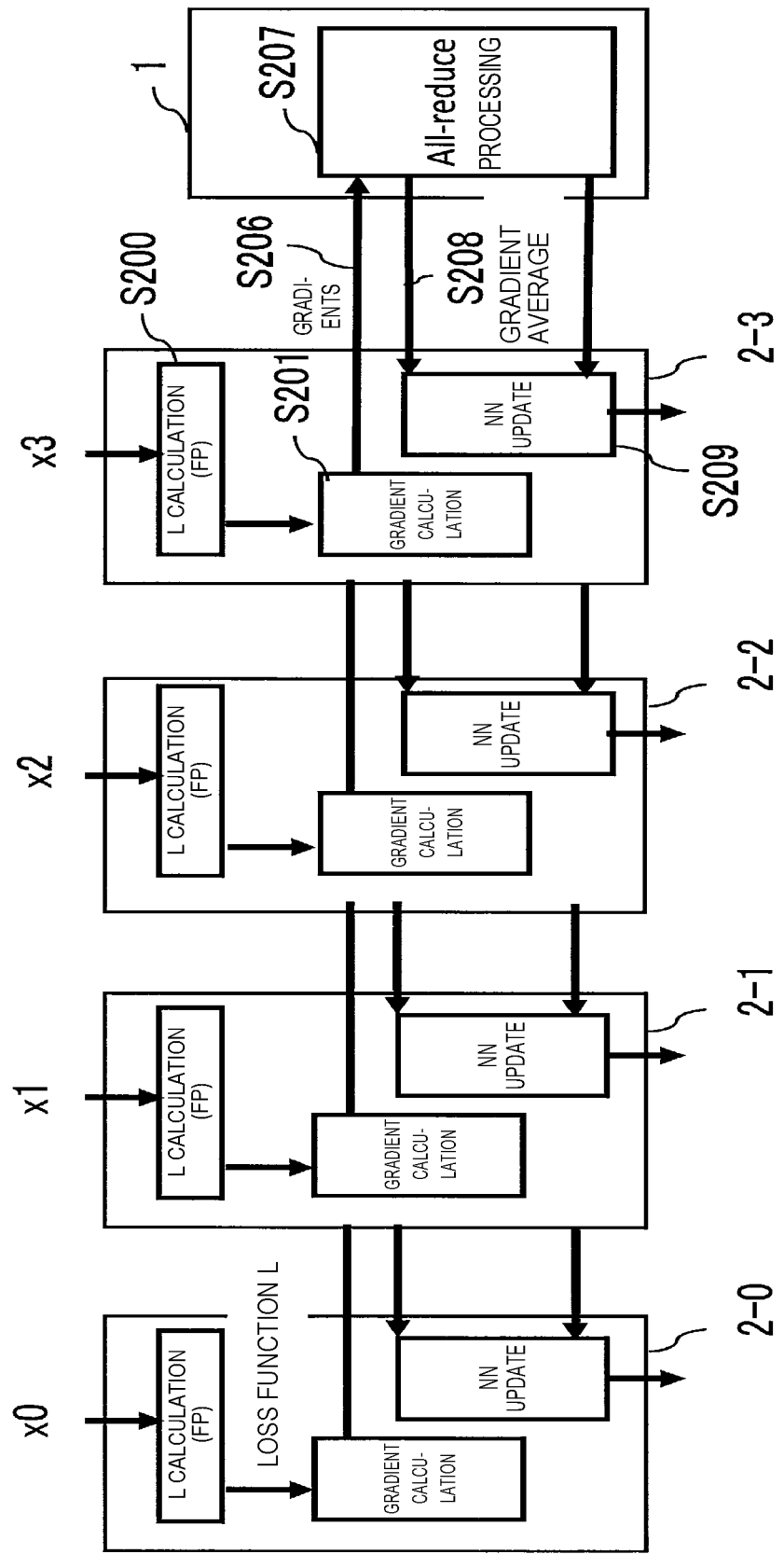
FIG. 5 is a diagram for explaining another procedure of the distributed learning processing according to the first embodiment of the present invention.

The computing interconnect device 1 calculates an average of the gradients transmitted from the learning nodes 2-0 to 2-3 (step S207 in FIG. 5) and transmits the calculated gradient average to the learning nodes 2-0 to 2-3 (step S208 in FIG. 5).

When receiving a calculation result from the computing interconnect device 1, the learning nodes 2-0 to 2-3 update, using the received gradient average, constituent parameters corresponding to the gradient average without waiting for all calculation results to be received (step S209 in FIG. 5).

In this way, the gradient calculation, the All-reduce processing, and the constituent parameter update can be processed in a pipeline manner. Therefore, it is possible to further increase speed.

Note that, as explained above, the computing interconnect device 1 may calculate a sum of the gradients for each of the constituent parameters instead of the average of the gradients. In a configuration of the computing interconnect device 1 explained below, an example in which the sum of the gradients is calculated is explained.
<Configuration of the Computing Interconnect Device>

Figure 6:
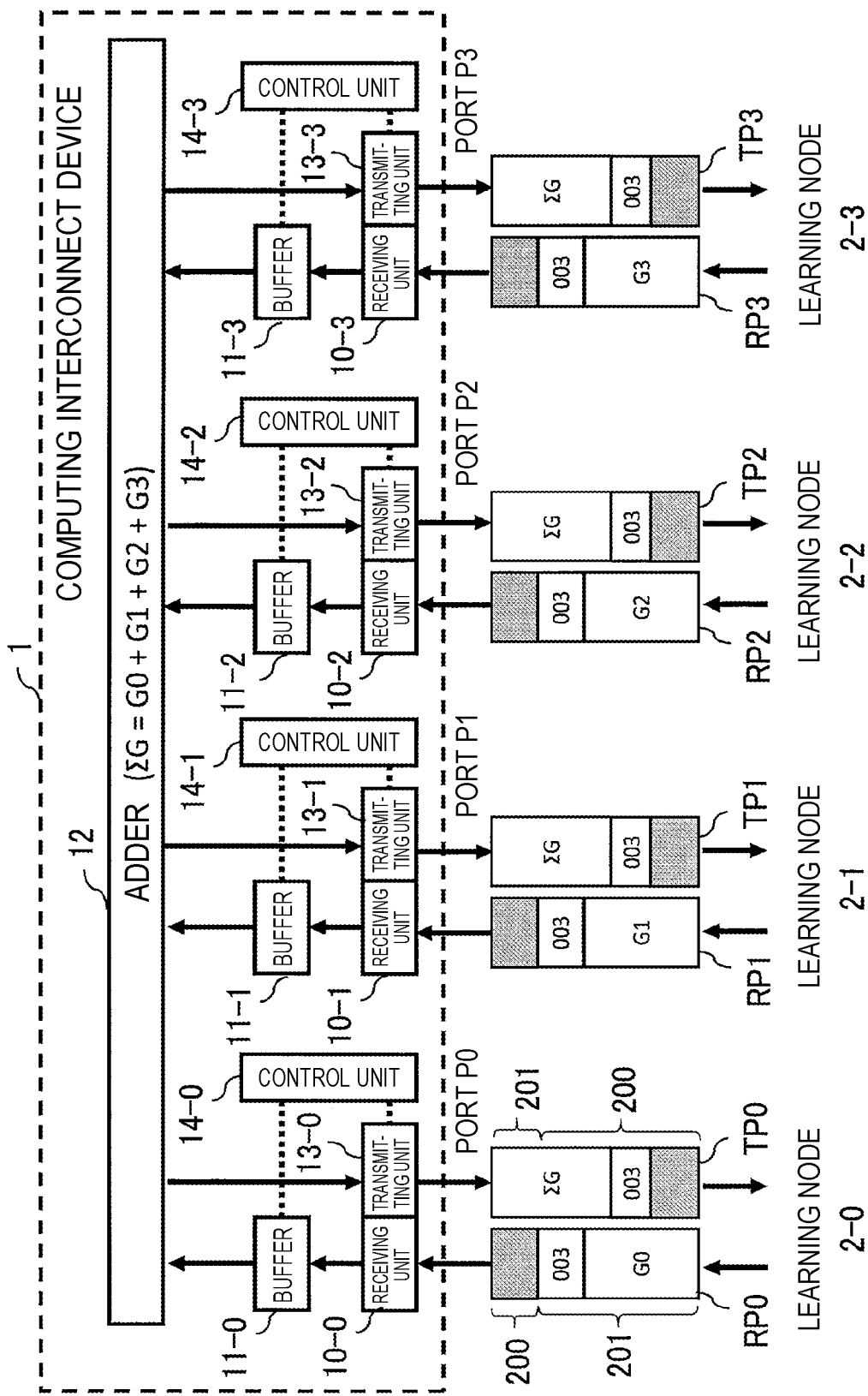
FIG. 6 is a block diagram showing a configuration of a computing interconnect device of the distributed deep learning system according to the first embodiment of the present invention.

A configuration of the computing interconnect device 1 in this embodiment is shown in FIG. 6. The computing interconnect device 1 includes the following: ports P0 to P3 for transmission and reception respectively connected to the learning nodes 2-0 to 2-3 by the communication network 3 and reception units 10-0 to 10-3 that are provided for each of the learning nodes 2-0 to 2-3 and extract calculation results of gradients from communication packets transmitted from the learning nodes 2-0 to 2-3; buffer memories 11-0 to 11-3 that are provided for each of the learning nodes 2-0 to 2-3 and once store calculation results of gradients of the learning nodes 2-0 to 2-3 and an adder 12 (an arithmetic unit) that calculates a sum of gradients; transmission units 13-0 to 13-3 that are provided respectively for each of learning nodes 2-0 to 2-3 and write the sum of the gradients calculated by the adder 12 in communication packets and transmit the communication packets to the learning nodes 2-0 to 2-3 corresponding to the transmission units 13-0 to 13-3; and control units 14-0 to 14-3 that are provided respectively for each of the learning nodes 2-0 to 2-3 and control the buffer memories 11-0 to 11-3 and the transmission units 13-0 to 13-3.

As it is well known, a communication packet includes a header 200 and a data payload 201. In data payloads of communication packets RP0 to RP3 transmitted from the learning nodes 2-0 to 2-3 and received by the ports P0 to P3, gradient values (G0 to G3 shown in FIG. 6) respectively calculated by the learning nodes 2-0 to 2-3 and sequential numbers ("003" in an example shown in FIG. 6) of communication packets allocated to each of the learning nodes are stored.

The reception units 10-0 to 10-3 of the computing interconnect device 1 respectively extract the gradient values G0 to G3 and the sequential numbers from the data payloads of the received communication packets RP0 to RP3 and store the gradient values G0 to G3 and the sequential numbers in the buffer memories 11-0 to 11-3. The gradient values G0 to G3 and the sequential numbers are once stored in the buffer memories 11-0 to 11-3 because even communication packets to which the same sequential number is allocated (that is, communication packets corresponding to the same constituent parameter) do not always arrive at completely the same timing from the learning nodes 2-0 to 2-3.

When the gradient values G0 to G3, to which the same sequential number is given, from all the learning nodes 2-0 to 2-3 corresponding to the control units 14-0 to 14-3 of the computing interconnect device 1 are written in the buffer memories 11-0 to 11-3, the control units 14-0 to 14-3 read out the gradient values G0 to G3 from the buffer memories 11-0 to 11-3 and pass the gradient values G0 to G3 to the adder 12. In this way, by performing control to calculate a sum of gradients stored in communication packets having the same sequential number received from the learning nodes 2-0 to 2-3, the control units 14-0 to 14-3 guarantee that corresponding gradient values of the learning nodes 2-0 to 2-3 can be added up.

The adder 12 of the computing interconnect device 1 calculates a sum ΣG of the gradients as indicated by the following expression and outputs a result of the calculation.

$$\Sigma G = G0 + G1 + G2 + G3 \quad (4)$$

Note that, as explained above, since the gradients are vectors including components of each of the constituent parameters. Therefore, the addition of the gradients is calculation for adding components corresponding to the same constituent parameter.

The control units 14-0 to 14-3 pass the sequential numbers ("003" in the example shown in FIG. 6) corresponding to the gradient values G0 to G3 read out from the buffer memories 11-0 to 11-3 to the transmission units 13-0 to 13-3. The transmission units 13-0 to 13-3 store, in the data payloads of the communication packets TP0 to TP3, the calculation result ΣG of the sum of the gradients calculated by the adder 12 and the sequential numbers received from the control units 14-0 to 14-3. The control units 14-0 to 14-3 cause the transmission units 13-0 to 13-3 to simultaneously transmit the communication packets TP0 to TP3 to the learning nodes 2-0 to 2-3.

The computing interconnect device 1 explained above can be realized by an LSI circuit formed on an FPGA or an ASIC. The same applies to computing interconnect devices in embodiments explained below.

Figure 7:
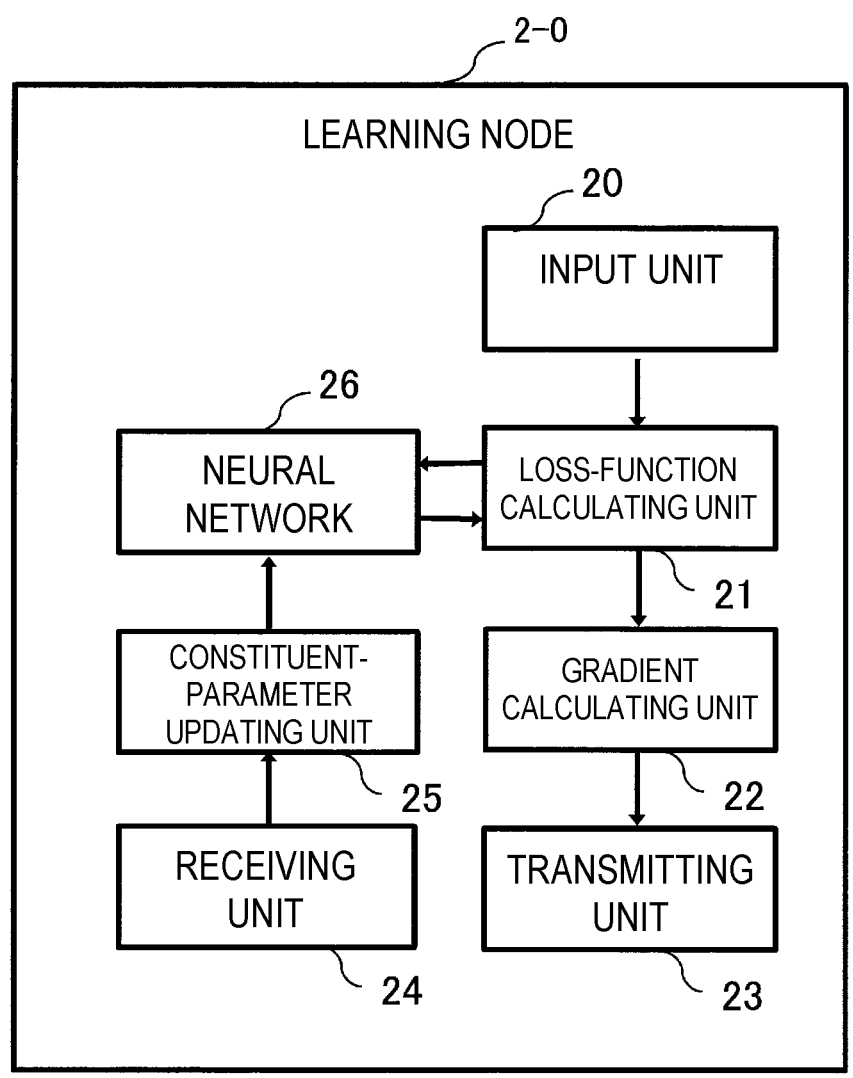
FIG. 7 is a block diagram showing a configuration example of a learning node of the distributed deep learning system according to the first embodiment of the present invention.

FIG. 7 is a block diagram showing a configuration example of the learning node 2-0. The learning node 2-0 includes an input unit 20 that receives learning data, a loss-function calculation unit 21 that calculates the loss function L when the learning data is input, a gradient calculation unit 22 that calculates a gradient of the loss function L, a transmission unit 23 that converts a gradient value calculated by the gradient calculation unit 22 into a packet and transmits the packet to the computing interconnect device 1, a reception unit 24 that receives a communication packet transmitted from the computing interconnect device 1, a constituent-parameter update unit 25 that updates a constituent parameter (a weight parameter) of a neural network using a sum of gradients stored in the communication packet transmitted from the computing interconnect device 1, and a neural network 26 having a function of calculating an output value of a neural network, which is a mathematical model.

In the example shown in FIG. 7, the configuration of the learning node 2-0 is shown. However, configurations of the other learning nodes 2-1 to 2-3 are the same as the configuration of the learning node 2-0.

The transmission units 23 of the learning nodes 2-0 to 2-3 write, in the data payloads of the communication packets RP0 to RP3, calculation results of gradients calculated by the gradient calculation units 22 and sequential numbers and transmit the communication packets RP0 to RP3 to the computing interconnect device 1.

The reception units 24 of the learning nodes 2-0 to 2-3 extract calculation results of sums of the gradients and the sequential numbers from the data payloads of the communication packets TP0 to TP3 received from the computing interconnect device 1.

The constituent-parameter update units 25 of the learning nodes 2-0 to 2-3 update, based on the calculation results of the sums of the gradients, constituent parameters of the neural networks 26 specified by the sequential numbers.

Note that, in embodiments of the present invention, it is assumed that configurations of the neural networks 26 of the learning nodes 2-0 to 2-3 are the same. The same applies in the other embodiments explained below.

In this embodiment, since the computing interconnect device 1 is used for the All-reduce processing, although there is a slight delay based on fluctuation in arrival times of communication packets from the learning nodes 2-0 to 2-3, transmission and reception processing for the communication packets between the computing interconnect device 1 and the learning nodes 2-0 to 2-3 can be performed by hardware processing simultaneously in parallel and at high speed. Therefore, it is possible to perform processing at high speed compared with when the communication processing and the gradient addition processing are performed by software processing in the head node of the conventional technique.

Second Embodiment

Subsequently, a second embodiment of the present invention is explained. In the first embodiment, the computing interconnect device 1 performs the calculation of the sum of the gradients and the learning nodes 2-0 to 2-3 perform the update calculation for the constituent parameters of the neural network. However, in this embodiment, a computing interconnect device performs update calculation for constituent parameters of a neural network in addition to calculation of a sum of gradients.

Figure 8:
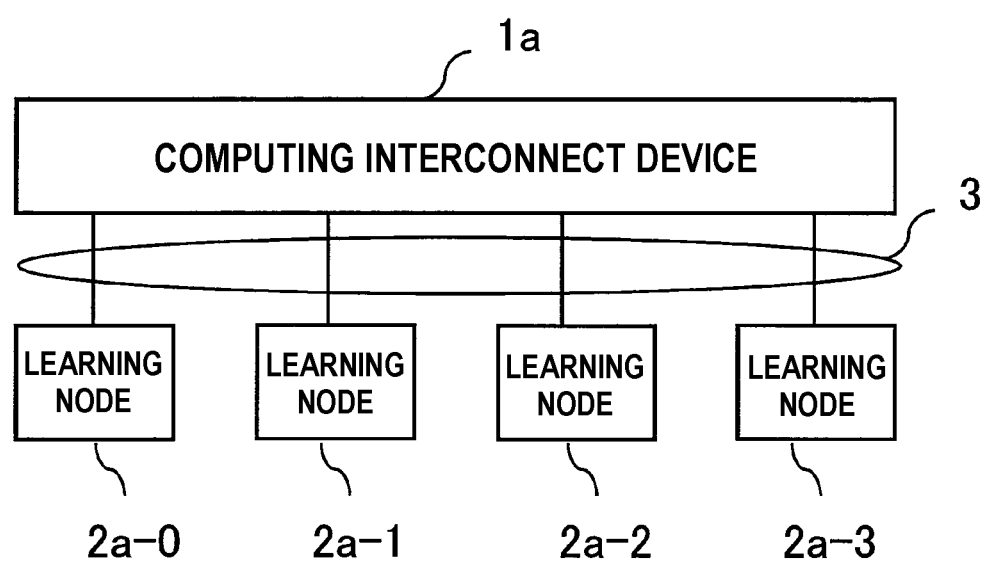
FIG. 8 is a block diagram showing a configuration of a distributed deep learning system according to a second embodiment of the present invention.

FIG. 8 is a block diagram showing a configuration of a distributed deep learning system according to this embodiment. The distributed deep learning system in this embodiment is configured from one computing interconnect device 1*a*, four learning nodes 2*a*-0 to 2*a*-3, and the communication network 3 that connects the computing interconnect device 1*a* and the learning nodes 2*a*-0 to 2*a*-3.

Figure 9:
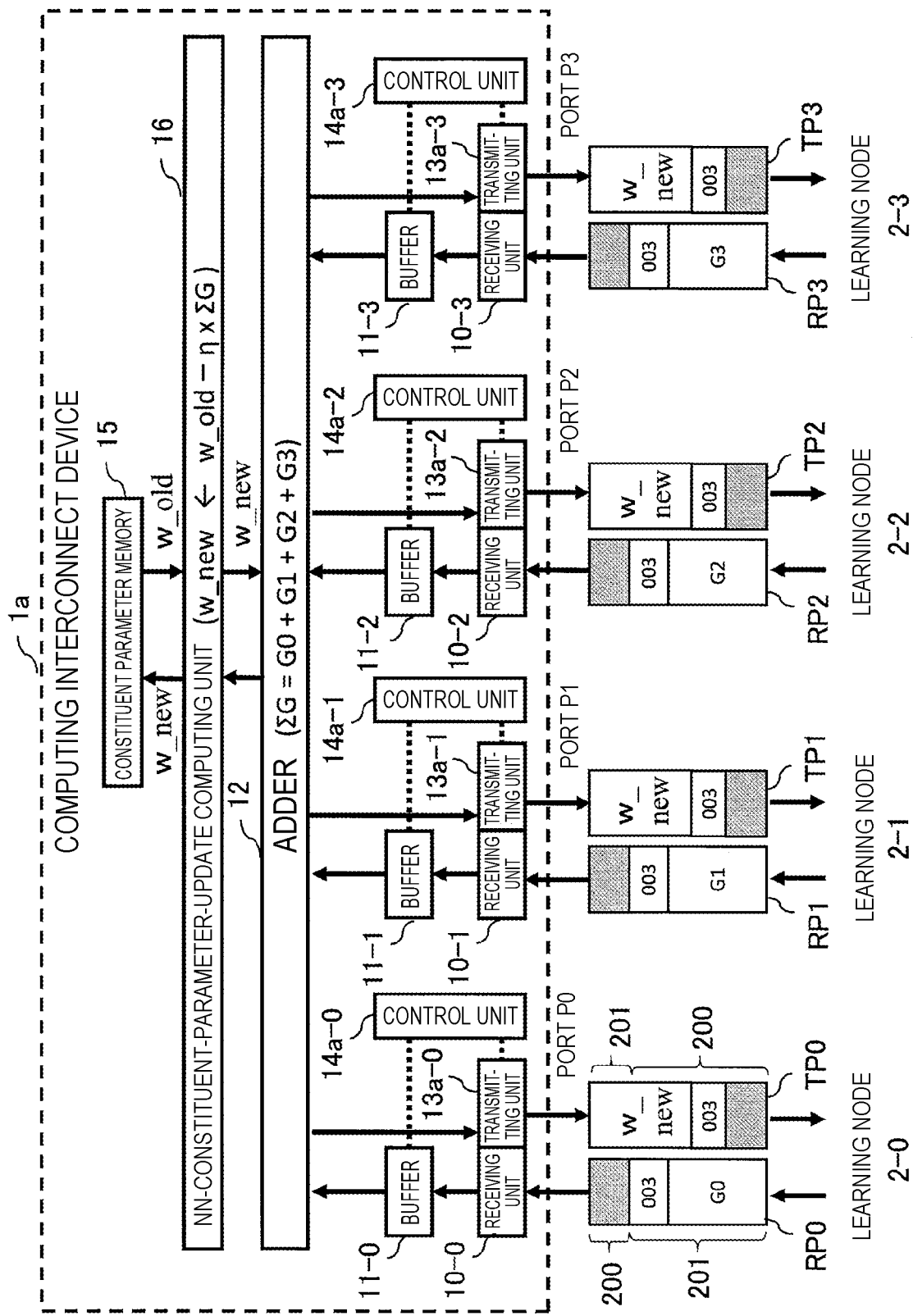
FIG. 9 is a block diagram showing a configuration of a computing interconnect device of the distributed deep learning system according to the second embodiment of the present invention.

FIG. 9 is a block diagram showing a configuration of the computing interconnect device 1*a* in this embodiment. The same components as the components shown in FIG. 6 are denoted by the same reference numerals and signs. The computing interconnect device 1*a* in this embodiment includes ports P0 to P3 for transmission and reception connected to the respective learning nodes 2*a*-0 to 2*a*-3 by the communication network 3, reception units 10-0 to 10-3, buffer memories 11-0 to 11-3, the adder 12, transmission units 13*a*-0 to 13*a*-3, control units 14*a*-0 to 14*a*-3, a constituent parameter memory 15 that stores constituent parameters of the neural networks 26, which are learning targets of the learning nodes 2*a*-0 to 2*a*-3, and an NN (neural network)-constituent-parameter-update computation unit 16 that calculates values after update of constituent parameters (weight parameters) of the neural networks.

At a learning start point in time, in the neural networks 26 of the learning nodes 2*a*-0 to 2*a*-3, the same initial values of constituent parameters are set in all the learning nodes 2*a*-0 to 2*a*-3. The initial values of the constituent parameters are transmitted, for example, from the learning nodes 2*a*-0 to 2*a*-3 to the computing interconnect device 1 using communication packets. In the computing interconnect device 1*a* that receives the initial values of the constituent parameters, the initial values of the constituent parameters are stored in the constituent parameter memory 15.

As in the first embodiment, the learning nodes 2*a*-0 to 2*a*-3 input learning data to the respective neural networks 26 in which the initial values of the constituent parameters are set and calculate the loss function L. Subsequently, the learning nodes 2*a*-0 to 2*a*-3 calculate gradients of the loss function L. The transmission units 23 of the learning nodes 2*a*-0 to 2*a*-3 write, in data payloads of the communication packets RP0 to RP3, calculation results of the gradients calculated by the gradient calculation units 22 and sequential numbers and transmit the communication packets RP0 to RP3 to the computing interconnect device 1*a*.

Therefore, in the data payloads of the communication packets TP0 to TP3 received by the reception units 10-0 to 10-3 of the computing interconnect device 1*a*, gradient values (G0 to G3 shown in FIG. 9) calculated by the learning nodes 2*a*-0 to 2*a*-3 and sequential numbers ("003" in an example shown in FIG. 9) are respectively stored.

As in the first embodiment, when the gradient values G0 to G3, to which the same sequential number is given, from all the learning nodes 2*a*-0 to 2*a*-3 are written in the buffer memories 11-0 to 11-3, the control units 14*a*-0 to 14*a*-3 of the computing interconnect device 1*a* read out the gradient values G0 to G3 from the buffer memories 11-0 to 11-3 and pass the gradient values G0 to G3 to the adder 12. The adder 12 calculates a sum ΣG of the gradients for each of the constituent parameters and outputs a result of the calculation.

The NN-constituent-parameter-update computation unit 16 calculates, based on the sum ΣG of the gradients calculated by the adder 12 and a value w_old of constituent parameters stored in the constituent parameter memory 15, for each of the constituent parameters, a value w_new after update of the constituent parameters of the neural networks and outputs the value w_new to the transmission units 13*a*-0 to 13*a*-3. When, for example, the gradient descent method is used as an updating method, the following calculation is performed:

$$w\_new \leftarrow w\_old - \eta \times \Sigma G \qquad (5)$$

The NN-constituent-parameter-update computation unit 16 outputs the value w_new after the update of the constituent parameters to the transmission units 13*a*-0 to 13*a*-3 and, at the same time, overwrites the values of the constituent parameters stored in the constituent parameter memory 15 with the value w_new after the update.

The control units 14*a*-0 to 14*a*-3 pass the sequential numbers ("003" in the example shown in FIG. 6) corresponding to the gradient values G0 to G3 read out from the buffer memories 11-0 to 11-3 to the transmission units 13*a*-0 to 13*a*-3. The transmission units 13-0 to 13-3 store, in the communication packets TP0 to TP3, the value w_new after the update of the constituent parameters calculated by the NN-constituent-parameter-update computation unit 16 and the sequential numbers received from the control units 14*a*-0 to 14*a*-3. The control units 14*a*-0 to 14*a*-3 cause the transmission units 13*a*-0 to 13*a*-3 to simultaneously transmit the communication packets TP0 to TP3 to the learning nodes 2*a*-0 to 2*a*-3.

The computing interconnect device 1*a* explained above can be realized by an LSI circuit formed on an FPGA or an ASIC.

Figure 10:
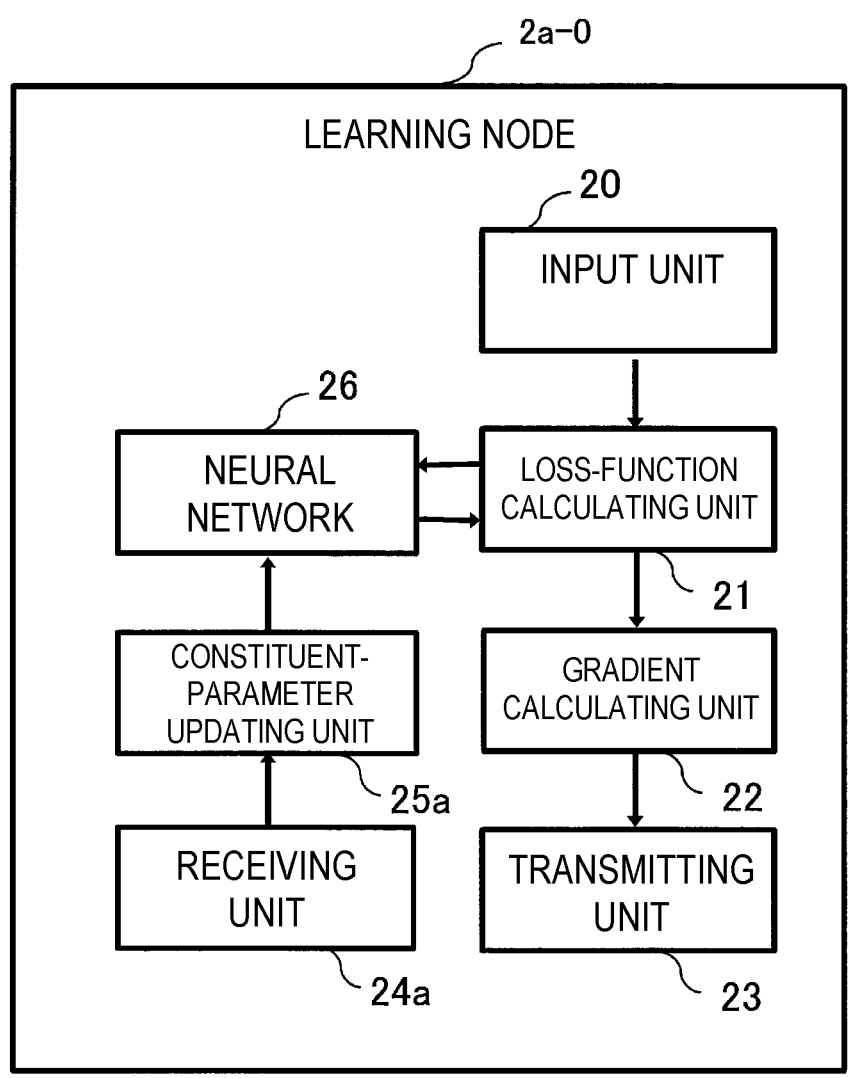
FIG. 10 is a block diagram showing a configuration example of a learning node of the distributed deep learning system according to the second embodiment of the present invention.

FIG. 10 is a block diagram showing a configuration example of the learning node 2*a*-0. The same components as the components shown in FIG. 7 are denoted by the same reference numerals and signs. The learning node 2*a*-0 includes the input unit 20, the loss-function calculation unit 21, the gradient calculation unit 22, the transmission unit 23, a reception unit 24*a*, a constituent-parameter update unit 25*a*, and the neural network 26. The constituent-parameter update unit 25*a* updates the constituent parameters of the neural network 26 using the value w_new after the update of the constituent parameters stored in the communication packet transmitted from the computing interconnect device 1*a*.

In the example shown in FIG. 10, the configuration of the learning node 2*a*-0 is shown. However, configurations of the other learning nodes 2*a*-1 to 2*a*-3 are the same as the configuration of the learning node 2*a*-0.

The reception units 24*a* of the learning nodes 2*a*-0 to 2*a*-3 extract the value w_new after the update of the constituent parameters and the sequential numbers from the data payloads of the communication packets TP0 to TP3 received from the computing interconnect device 1*a*.

The constituent-parameter update units 25*a* of the learning nodes 2*a*-0 to 2*a*-3 update the neural networks 26 by overwriting the constituent parameters of the neural networks 26, which are specified by the sequential numbers, with the value w_new after the update of the constituent parameters.

In this embodiment, since the computing interconnect device 1*a* is used for the All-reduce processing and the update calculation for the constituent parameters of the neural networks, although there is a slight delay based on fluctuation in arrival times of communication packets from the learning nodes 2*a*-0 to 2*a*-3, transmission and reception processing for the communication packets between the computing interconnect device 1*a* and the learning nodes 2*a*-0 to 2*a*-3 can be performed by hardware processing simultaneously in parallel and at high speed. Therefore, it is possible to perform processing at high speed compared with when the communication processing and the gradient addition processing are performed by software processing in the head node of the conventional technique.

In particular, in this embodiment, it is possible to achieve an increase in speed by preparing a dedicated arithmetic circuit for the update calculation processing for the constituent parameters as well. As the sum calculation for the gradients and the update calculation for the constituent parameters, the same calculation only has to be performed independently for each of the constituent parameters irrespective of the configurations of the neural networks 26. Therefore, there is also an advantage that, even when the configurations of the neural networks 26 in the learning nodes 2a-0 to 2a-3 are changed, the same dedicated arithmetic circuit can be used as the arithmetic unit of the computing interconnect device 1a.

Third Embodiment

Figure 11:
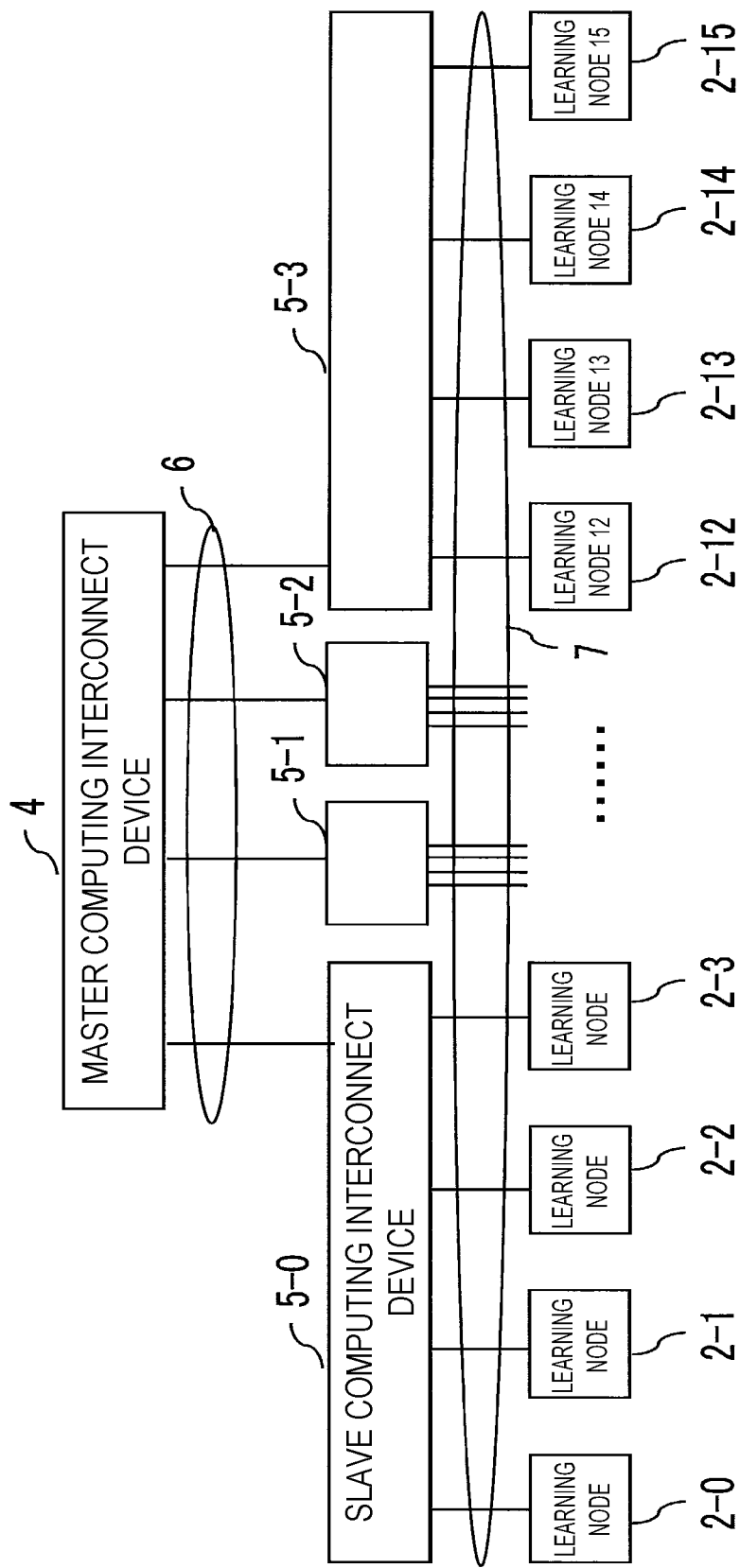
FIG. 11 is a block diagram showing a configuration of a distributed deep learning system according to a third embodiment of the present invention.

Subsequently, a third embodiment of the present invention is explained. A configuration of a distributed deep learning system in this embodiment is shown in FIG. 11. The distributed deep learning system in this embodiment is configured by one master computing interconnect device 4, a plurality of slave computing interconnect devices 5-0 to 5-3, a plurality of learning nodes 2-0 to 2-15, a communication network 6 that connects the master computing interconnect device 4 and the slave computing interconnect devices 5-0 to 5-3, and a communication network 7 that connects the slave computing interconnect devices 5-0 to 5-3 and the learning nodes 2-0 to 2-15.

In this embodiment, as shown in FIG. 11, the master computing interconnect device 4, the slave computing interconnect devices 5-0 to 5-3, and the learning nodes 2-0 to 2-15 are connected in a tree shape. The master computing interconnect device 4 is connected to a top (route) of the tree, the learning nodes 2-0 to 2-15 are connected to portions of leaves of the tree, and the slave computing interconnect devices 5-0 to 5-3 are disposed in portions of nodes in the middle between the master computing interconnect device 4 and the learning nodes 2-0 to 2-15.

Figure 12:
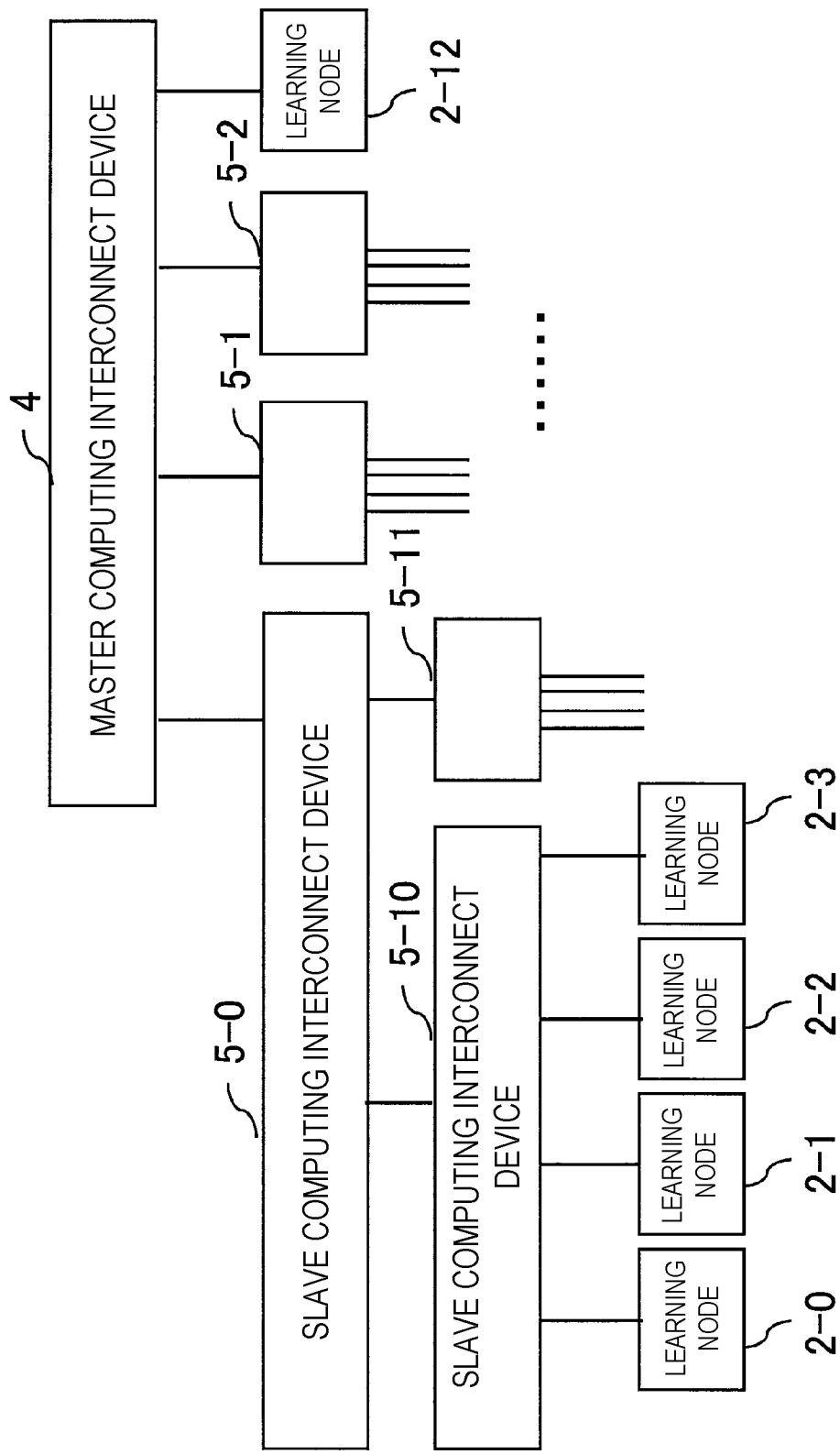
FIG. 12 is a block diagram showing another configuration of the distributed deep learning system according to the third embodiment of the present invention.

It is also possible to adopt a tree structure in which, as shown in FIG. 12, the slave computing interconnect devices 5-0 to 5-11 are disposed in multiple stages and the learning node 2-12 is connected directly under the master computing interconnect device 4.

In this embodiment, the master computing interconnect device 4 and the slave computing interconnect devices 5-0 to 5-3 preform All-reduce processing in cooperation.

Figure 13:
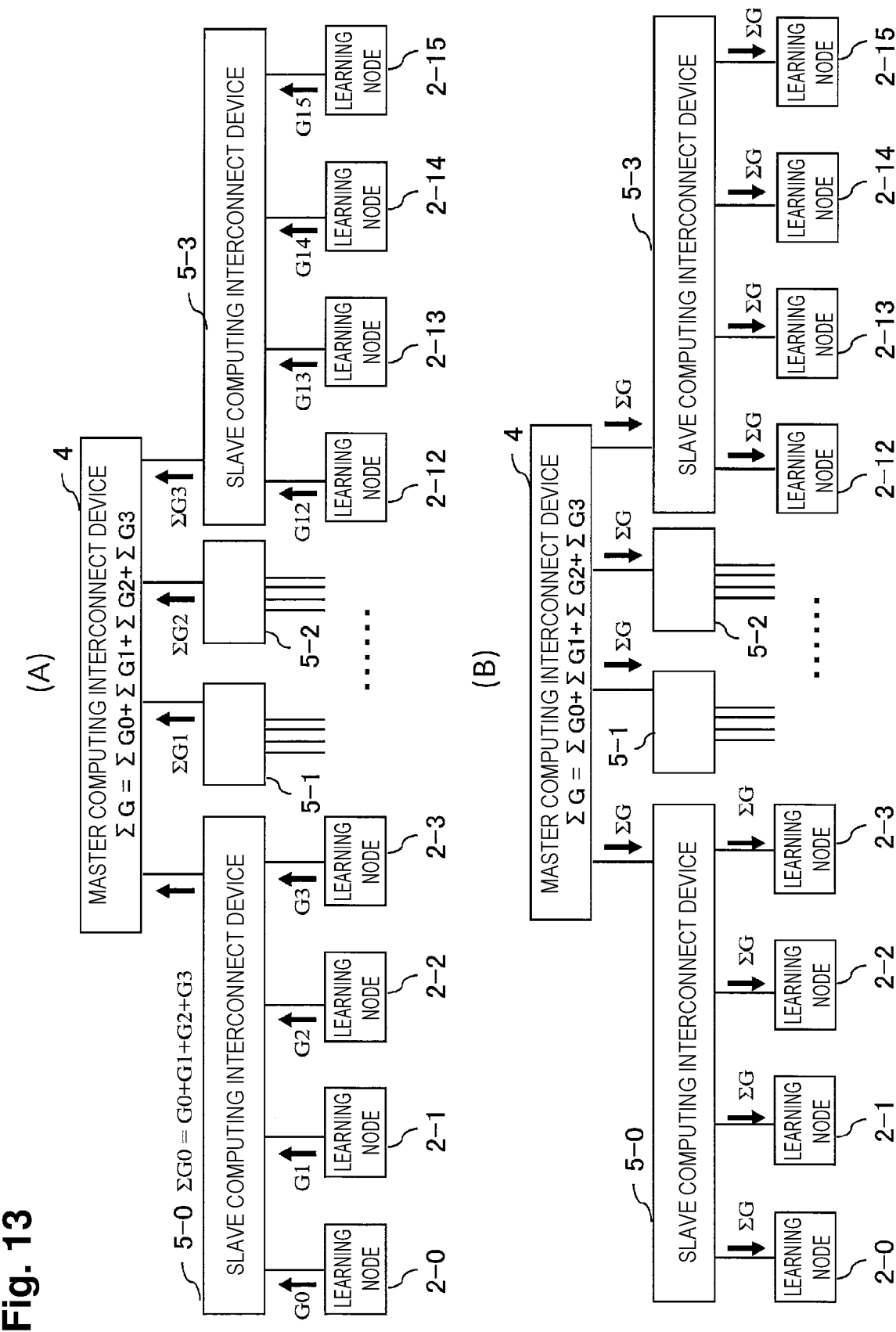
FIG. 13 is a diagram for explaining operation of the distributed deep learning system according to the third embodiment of the present invention.

Operation of the distributed deep learning system in this embodiment is shown in FIG. 13(A) and FIG. 13(B). After respectively calculating gradients, the learning nodes 2-0 to 2-15 transmit calculation results G0 to G15 of the gradients to the slave computing interconnect devices 5-0 to 5-3 to which the learning nodes 2-0 to 2-15 are connected as shown in FIG. 13(A).

The slave computing interconnect devices 5-0 to 5-3 respectively calculate sums of gradients transmitted from the learning nodes 2-0 to 2-15 connected to the slave computing interconnect devices 5-0 to 5-3 and transmit calculation results of the sums of the gradients to a high-order computing interconnect device (the master computing interconnect device 4 in examples shown in FIG. 13(A) and FIG. 13(B)).

In the example shown in FIG. 13(A), for example, the slave computing interconnect device 5-0 calculates a sum $\Sigma G0=G0+G1+G2+G3$ of gradients G0 to G3 transmitted from the learning nodes 2-0 to 2-3 and transmits the sum $\Sigma G0$ to the high-order master computing interconnect device 4. The slave computing interconnect device 5-3 calculates a sum $\Sigma G3=G12+G13+G14+G15$ of gradients G12 to G15 transmitted from the learning nodes 2-12 to 2-15 and transmits the sum $\Sigma G3$ to the high-order master computing interconnect device 4.

In the example shown in FIG. 13(B), the master computing interconnect device 4 calculates a sum $\Sigma G=\Sigma G0+\Sigma G1+\Sigma G2+\Sigma G3$ obtained by totaling sums $\Sigma G0$ to $\Sigma G3$ of gradients transmitted from the slave computing interconnect devices 5-0 to 5-3 connected directly under the master computing interconnect device 4 and transmits the calculated sum $\Sigma G$ of the gradients to the slave computing interconnect devices 5-0 to 5-3 directly under the master computing interconnect device 4.

In the case of the tree structure shown in FIG. 12, the master computing interconnect device 4 calculates a sum obtained by totaling sums of gradients transmitted from the slave computing interconnect devices 5-0 to 5-2 connected directly under the master computing interconnect device 4 and gradients transmitted from the learning node 2-12 connected directly under the master computing interconnect device 4. The master computing interconnect device 4 transmits the calculated sum of the gradients to the slave computing interconnect devices 5-0 to 5-2 and the learning node 2-12 directly under the master computing interconnect device 4.

Further, in the example shown in FIG. 13(B), the slave computing interconnect devices 5-0 to 5-3, which receive the sum $\Sigma G$ of the gradients from the master computing interconnect device 4 directly above the slave computing interconnect devices 5-0 to 5-3, respectively transmit the received sum $\Sigma G$ of the gradients to the learning nodes 2-0 to 2-15 further directly under the slave computing interconnect devices 5-0 to 5-3. The learning nodes 2-0 to 2-15, which receive the sum $\Sigma G$ of the gradients, update the constituent parameters of the neural networks using the sum $\Sigma G$ of the gradients.

Figure 14:
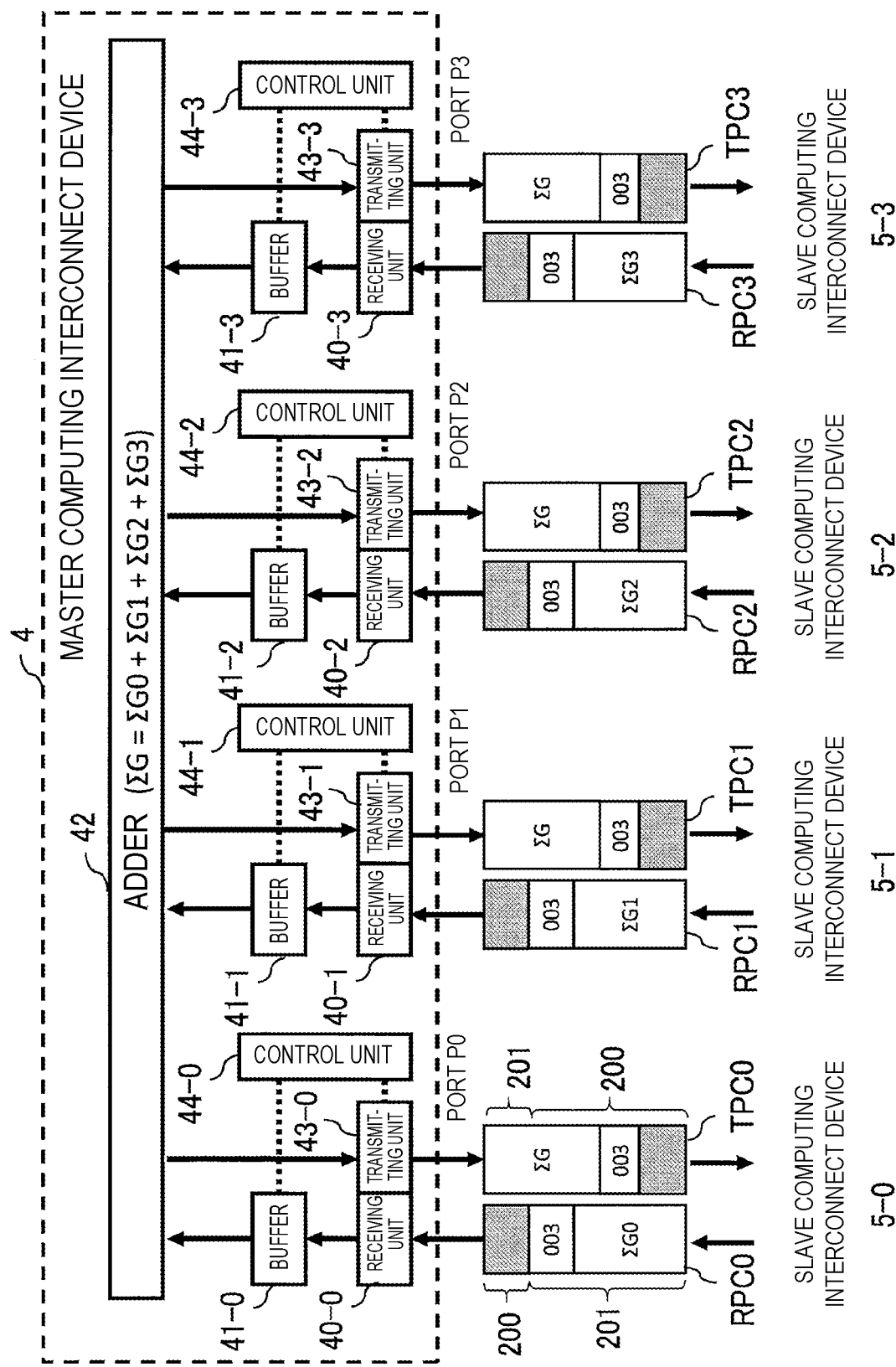
FIG. 14 is a block diagram showing a configuration of a master computing interconnect device of the distributed deep learning system according to the third embodiment of the present invention.

A configuration of the master computing interconnect device 4 in this embodiment is shown in FIG. 14. The master computing interconnect device 4 includes the ports P0 to P3 for transmission and reception, reception units 40-0 to 40-3, buffer memories 41-0 to 41-3, an adder 42 (an arithmetic unit), transmission units 43-0 to 43-3, and control units 44-0 to 44-3.

The reception units 40-0 to 40-3, the buffer memories 41-0 to 41-3, the transmission units 43-0 to 43-3, and the control units 44-0 to 44-3 are respectively provided for each of the slave computing interconnect devices 5-0 to 5-3.

The ports P0 to P3 for transmission and reception are respectively connected to the slave computing interconnect devices 5-0 to 5-3 by the communication network 6. The reception units 40-0 to 40-3 extract calculation results of sums of gradients from communication packets transmitted from the slave computing interconnect devices 5-0 to 5-3. The buffer memories 41-0 to 41-3 once store the calculation results of the sums of the gradients of the slave computing interconnect devices 5-0 to 5-3. The adder 42 (the arithmetic unit) calculates a sum obtained by further totaling the sums of the gradients. The transmission units 43-0 to 43-3 write the sum of the gradients calculated by the adder 42 in communication packets and transmit the communication packets to the slave computing interconnect devices 5-0 to 5-3 corresponding to the transmission units 43-0 to 43-3. The control units 44-0 to 44-3 control the buffer memories 41-0 to 41-3 and the transmission units 43-0 to 43-3.

As explained above, a communication packet includes the header 200 and the data payload 201. The sums ($\Sigma G0$ to $\Sigma G3$ shown in FIG. 14) of the gradients calculated by the slave computing interconnect devices 5-0 to 5-3 and sequential numbers ("003" in an example shown in FIG. 14) are respectively stored in data payloads of communication packets RPC0 to RPC3 transmitted from the slave computing interconnect devices 5-0 to 5-3 and received by the ports P0 to P3.

The reception units 40-0 to 40-3 of the master computing interconnect device 4 respectively extract the sums $\Sigma G0$ to $\Sigma G3$ of the gradients and the sequential numbers from the data payloads of the received communication packets RPC0 to RPC3 and store the sums ΣG0 to ΣG3 of the gradients and the sequential numbers in the buffer memories 41-0 to 41-3. The sums ΣG0 to ΣG3 of the gradients and the sequential numbers are once stored in the buffer memories 41-0 to 41-3 because even communication packets to which the same sequential number is allocated (that is, communication packets corresponding to the same constituent parameter) do not always arrive at completely the same timing from the slave computing interconnect devices 5-0 to 5-3.

When the sums ΣG0 to ΣG3 of the gradients, to which the same sequential number is given, from all the slave computing interconnect devices 5-0 to 5-3 corresponding to the control units 44-0 to 44-3 of the master computing interconnect device 4 are written in the buffer memories 41-0 to 41-3, the control units 44-0 to 44-3 read out the sums ΣG0 to ΣG3 of the gradients from the buffer memories 41-0 to 41-3 and pass the sums ΣG0 to ΣG3 of the gradients to the adder 42. In this way, by performing control to calculate a total of sums of gradients stored in communication packets having the same sequential number received from the slave computing interconnect devices 5-0 to 5-3, the control units 44-0 to 44-3 guarantee that sums of corresponding gradients of the slave computing interconnect devices 5-0 to 5-3 can be added up.

The adder 42 of the master computing interconnect device 4 calculates a sum ΣG obtained by further totaling the sums of the gradients as indicated by the following expression and outputs a result of the calculation.

$$\Sigma G = \Sigma G0 + \Sigma G1 + \Sigma G2 + \Sigma G3 \quad (6)$$

The control units 44-0 to 44-3 pass sequential numbers ("003" in the example shown in FIG. 14) corresponding to the sums ΣG0 to ΣG3 of the gradients read out from the buffer memories 41-0 to 41-3 to the transmission units 43-0 to 43-3. The transmission units 43-0 to 43-3 store, in data payloads of communication packets TPC0 to TPC3, the calculation result ΣG of the sums of the gradients calculated by the adder 42 and the sequential numbers received from the control units 44-0 to 44-3. The control units 44-0 to 44-3 cause the transmission units 43-0 to 43-3 to simultaneously transmit the communication packets TPC0 to TPC3 to the slave computing interconnect devices 5-0 to 5-3.

Note that, in the example shown in FIG. 14, an example is explained in which the slave computing interconnect devices 5-0 to 5-3 are connected directly under the master computing interconnect device 4. However, learning nodes may be connected directly under the master computing interconnect device 4 as in the example shown in FIG. 12.

Figure 15:
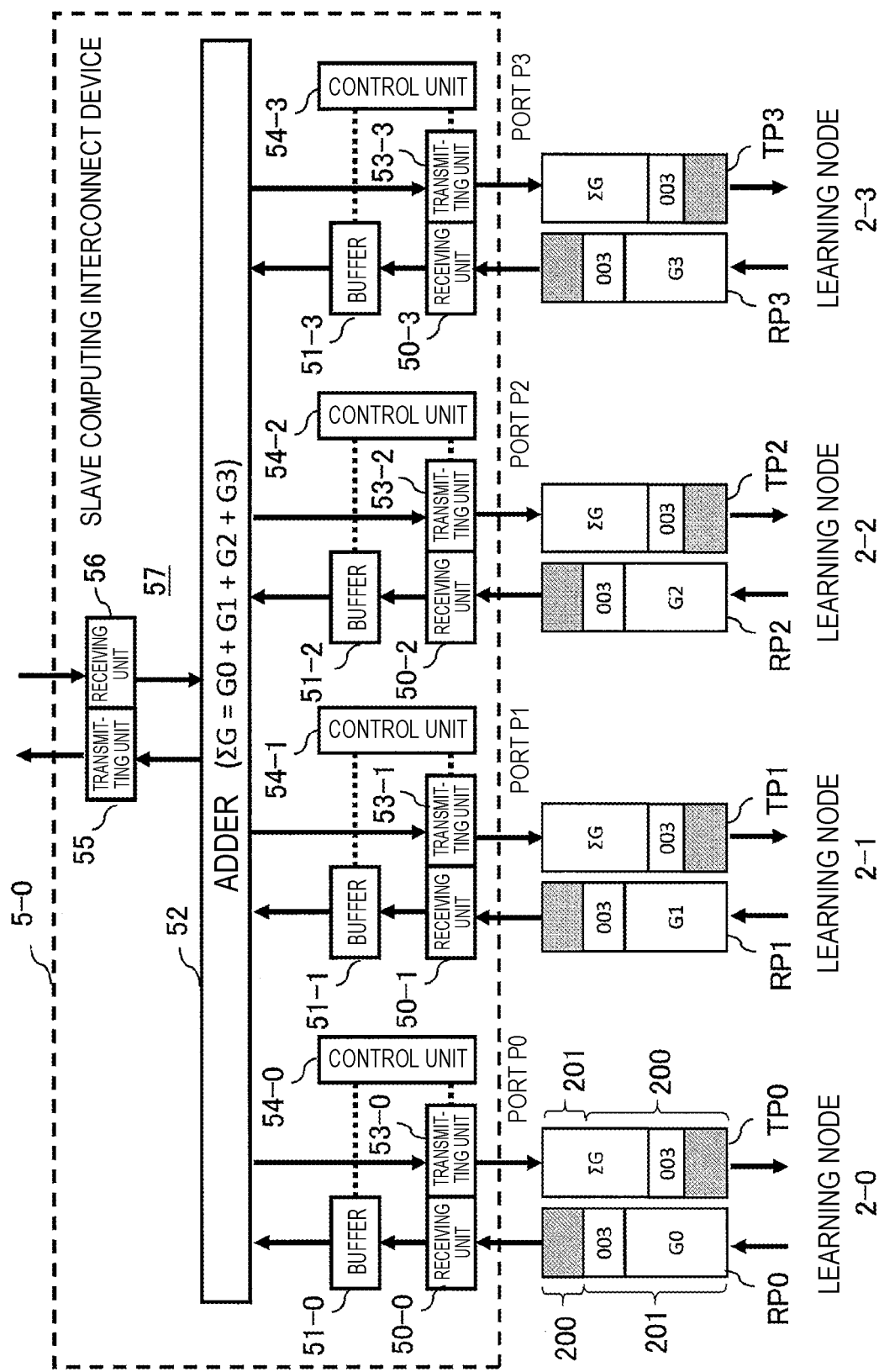
FIG. 15 is a block diagram showing a configuration of a slave computing interconnect device of the distributed deep learning system according to the third embodiment of the present invention.

A configuration of the slave computing interconnect device 5-0 is shown in FIG. 15. The slave computing interconnect device 5-0 includes the ports P0 to P3 for transmission and reception, reception units 50-0 to 50-3, buffer memories 51-0 to 51-3, an adder 52 (an arithmetic unit), transmission units 53-0 to 53-3, control units 54-0 to 54-3, and a transmission unit 55 and a reception unit 56 that transmit and receive a sum of gradients to and from the master computing interconnect device 4. The reception units 50-0 to 50-3, the buffer memories 51-0 to 51-3, the transmission units 53-0 to 53-3, and the control units 54-0 to 54-3 are provided for each of the learning nodes 2-0 to 2-3. The ports P0 to P3 for transmission and reception are connected to the respective learning nodes 2-0 to 2-3 by the communication network 7. The reception units 50-0 to 50-3 extract calculation results of gradients from communication packets transmitted from the learning nodes 2-0 to 2-3. The buffer memories 51-0 to 51-3 once store the calculation results of the gradients of the learning nodes 2-0 to 2-3. The adder 52 (the arithmetic unit) calculates a sum of the gradients. The transmission units 53-0 to 53-3 write a calculation result of a sum of gradients transmitted from the master computing interconnect device 4 in communication packets and transmit the communication packets to the learning nodes 2-0 to 2-3 corresponding to the transmission units 53-0 to 53-3. The control units 54-0 to 54-3 control the buffer memories 51-0 to 51-3 and the transmission units 53-0 to 53-3. The transmission unit 55 writes the sum of the gradients calculated by the adder 52 in a communication packet and transmits the communication packet to the master computing interconnect device 4. The reception unit 56 receives a calculation result of the sum of the gradients from the master computing interconnect device 4. Note that the reception unit 56 and the transmission units 53-0 to 53-3 configure a transfer unit 57.

Operations of the reception units 50-0 to 50-3 and the buffer memories 51-0 to 51-3 of the slave computing interconnect device 5-0 are the same as the operations of the reception units 10-0 to 10-3 and the buffer memories 11-0 to 11-3 of the computing interconnect device 1. Therefore, explanation of the operations is omitted.

When the gradient values G0 to G3, to which the same sequential number is given, from all the learning nodes 2-0 to 2-3 corresponding to the control units 54-0 to 54-3 of the slave computing interconnect device 5-0 are written in the buffer memories 51-0 to 51-3, the control units 54-0 to 54-3 read out the gradient values G0 to G3 from the buffer memories 51-0 to 51-3 and pass the gradient values G0 to G3 to the adder 52. The control units 54-0 to 54-3 pass sequential numbers ("003" in an example shown in FIG. 15) corresponding to the gradient values G0 to G3 read out from the buffer memories 51-0 to 51-3 to the transmission unit 55.

The adder 52 of the slave computing interconnect device 5-0 calculates a sum ΣG of gradients according to Expression (4) and outputs a result of the calculation to the transmission unit 55.

The transmission unit 55 stores the calculation result ΣG of sums of gradients calculated by the adder 52 and the sequential numbers received from the control units 54-0 to 54-3 in a data payload of the communication packet TPC0 and transmits the communication packet TPC0 to the master computing interconnect device 4 directly above the slave computing interconnect device 5-0. Note that, since all the sequential numbers passed from the control units 54-0 to 54-3 are the same value, one value only has to be stored in the communication packet TPC0.

The reception unit 56 of the slave computing interconnect device 5-0 extracts the sum ΣG of the gradients and the sequential numbers from the data payload of the communication packet TPC0 received from the master computing interconnect device 4.

The transmission units 53-0 to 53-3 of the slave computing interconnect device 5-0 store the sum ΣG of the gradients and the sequential numbers received from the reception unit 56 in the data payloads of the communication packets TP0 to TP3. The control units 54-0 to 54-3 cause the transmission units 53-0 to 53-3 to simultaneously transmit the communication packets TP0 to TP3 to the learning nodes 2-0 to 2-3. Note that the reception unit 56 and the transmission units 53-0 to 53-3 may transfer a communication packet received from the master computing interconnect device 4 directly to the learning nodes 2-0 to 2-3 directly under the reception unit 56 and the transmission units 53-0 to 53-3.

In the example shown in FIG. 15, a configuration of the slave computing interconnect device 5-0 is shown. However, configurations of the other slave computing interconnect devices are the same as the configuration of the slave computing interconnect device 5-0.

In the example shown in FIG. 15, an example is explained in which the learning nodes 2-0 to 2-3 are connected directly under the slave computing interconnect device 5-0. However, another slave computing interconnect device may be connected directly under the slave computing interconnect device 5-0 as in the example shown in FIG. 12.

Configurations of the learning nodes 2-0 to 2-15 are as explained in the first embodiment.

As explained above, in this embodiment, since the computing interconnect devices 4 and 5 are used for the All-reduce processing, although there is a slight delay based on fluctuation in arrival times of communication packets from the learning nodes 2-0 to 2-15, transmission and reception processing for the communication packets between the computing interconnect devices 4 and 5 and the learning nodes 2-0 to 2-15 can be performed by hardware processing simultaneously in parallel and at high speed. Therefore, it is possible to perform processing at high speed compared with when the communication processing and the gradient addition processing are performed by software processing in the head node of the conventional technique. Further, by connecting the learning nodes 2-0 to 2-15 and the computing interconnect devices 4 and 5 in the tree shape as in this embodiment, it is possible to perform distributed processing with a larger number of the learning nodes 2-0 to 2-15.

Fourth Embodiment

Subsequently, a fourth embodiment of the present invention is explained. Like the third embodiment, this embodiment is also a system in which a master computing interconnect device, slave computing interconnect devices, and learning nodes are connected in a tree shape. That is, as in FIG. 11, a master computing interconnect device positioned at highest order, slave computing interconnect devices, and learning nodes are connected in a tree shape. This embodiment is different from the third embodiment in that the master computing interconnect device performs update calculation for constituent parameters of neural networks as well.

Figure 16:
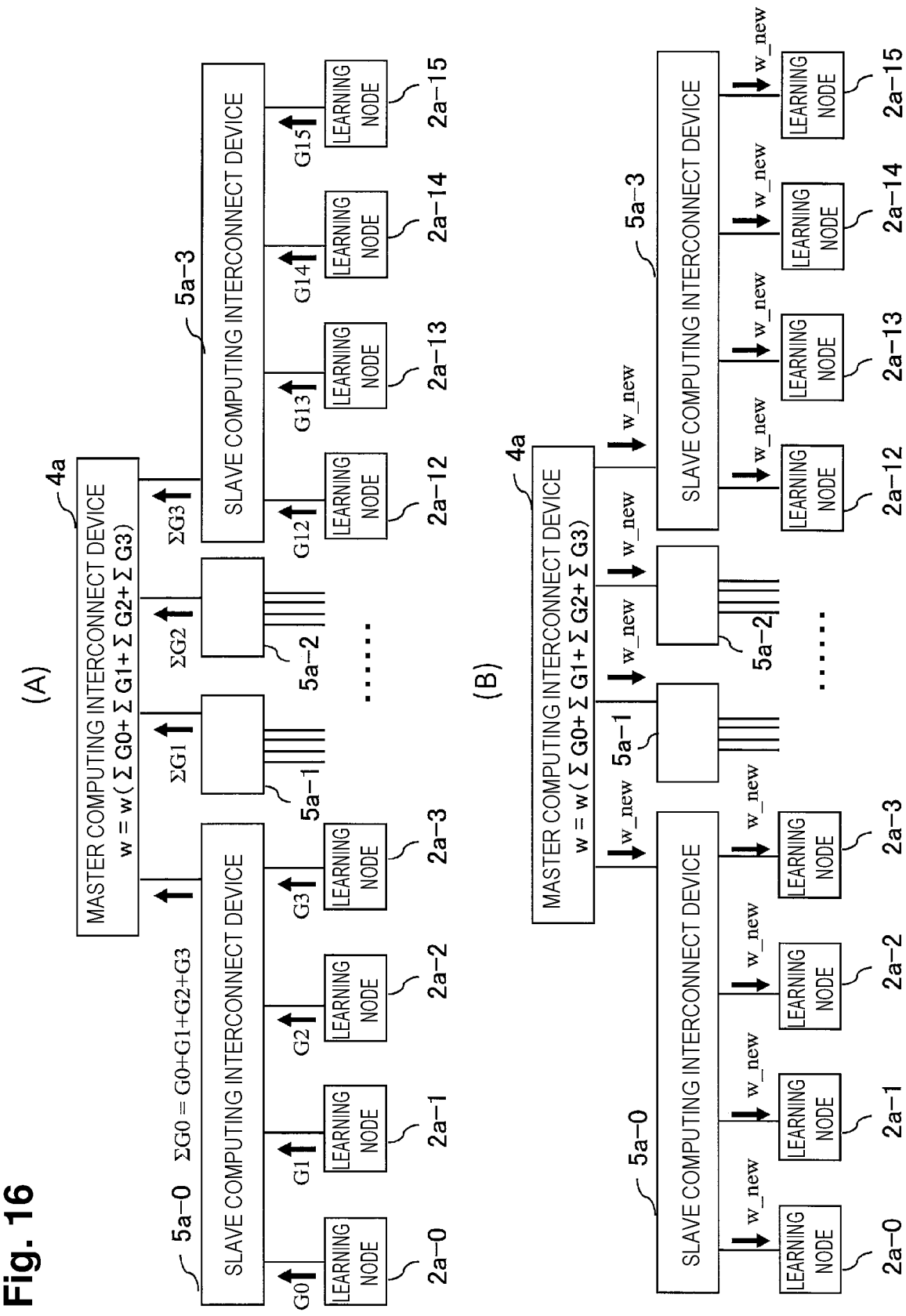
FIG. 16 is a diagram for explaining operation of a distributed deep learning system according to a fourth embodiment of the present invention.

Operations of a distributed deep learning system in this embodiment are shown in FIG. 16(A) and FIG. 16(B). After respectively calculating gradients, learning nodes 2a-0 to 2a-15 transmit calculation results G0 to G15 of the gradients to slave computing interconnect devices 5a-0 to 5a-3 to which the learning nodes 2a-0 to 2a-15 are connected as shown in FIG. 16(A).

The slave computing interconnect devices 5a-0 to 5a-3 respectively calculate sums of gradients transmitted from the learning nodes 2a-0 to 2a-15 connected to the slave computing interconnect devices 5a-0 to 5a-3 and transmit calculation results of the sums of the gradients to a high-order computing interconnect device (in examples shown in FIG. 16(A) and FIG. 16(B), a master computing interconnect device 4a).

In the example shown in FIG. 16(A), for example, the slave computing interconnect device 5a-0 calculates a sum $\Sigma G0=G0+G1+G2+G3$ of gradients G0 to G3 transmitted from the learning nodes 2a-0 to 2a-3 and transmits the sum $\Sigma G0$ to the high-order master computing interconnect device 4a. The slave computing interconnect device 5a-3 calculates a sum $\Sigma G3=G12+G13+G14+G15$ of gradients G12 to G15 transmitted from the learning nodes 2a-12 to 2a-15 and transmits the sum $\Sigma G3$ to the high-order master computing interconnect device 4a.

In the example shown in FIG. 16(B), the master computing interconnect device 4a calculates a sum $\Sigma G=\Sigma G0+\Sigma G1+\Sigma G2+\Sigma G3$ obtained by totaling the sums $\Sigma G0$ to $\Sigma G3$ of the gradients transmitted from the slave computing interconnect devices 5a-0 to 5a-3 connected directly under the master computing interconnect device 4a.

Further, the master computing interconnect device 4a calculates the value w_new after the update of the constituent parameters of the neural networks using the sum $\Sigma G$ of the gradients and transmits a result of the calculation to the slave computing interconnect devices 5a-0 to 5a-3 directly under the master computing interconnect device 4a.

The slave computing interconnect devices 5a-0 to 5a-3, which receive the value w_new after the update of the constituent parameters from the master computing interconnect device 4a directly above the slave computing interconnect devices 5a-0 to 5a-3, respectively transmit the value w_new after the update of the constituent parameters to the learning nodes 2a-0 to 2a-15 further directly under the slave computing interconnect devices 5a-0 to 5a-3.

The learning nodes 2a-0 to 2a-15 update the neural networks by overwriting constituent parameters of the neural networks 26 with the value w_new after the update of the constituent parameters.

Figure 17:
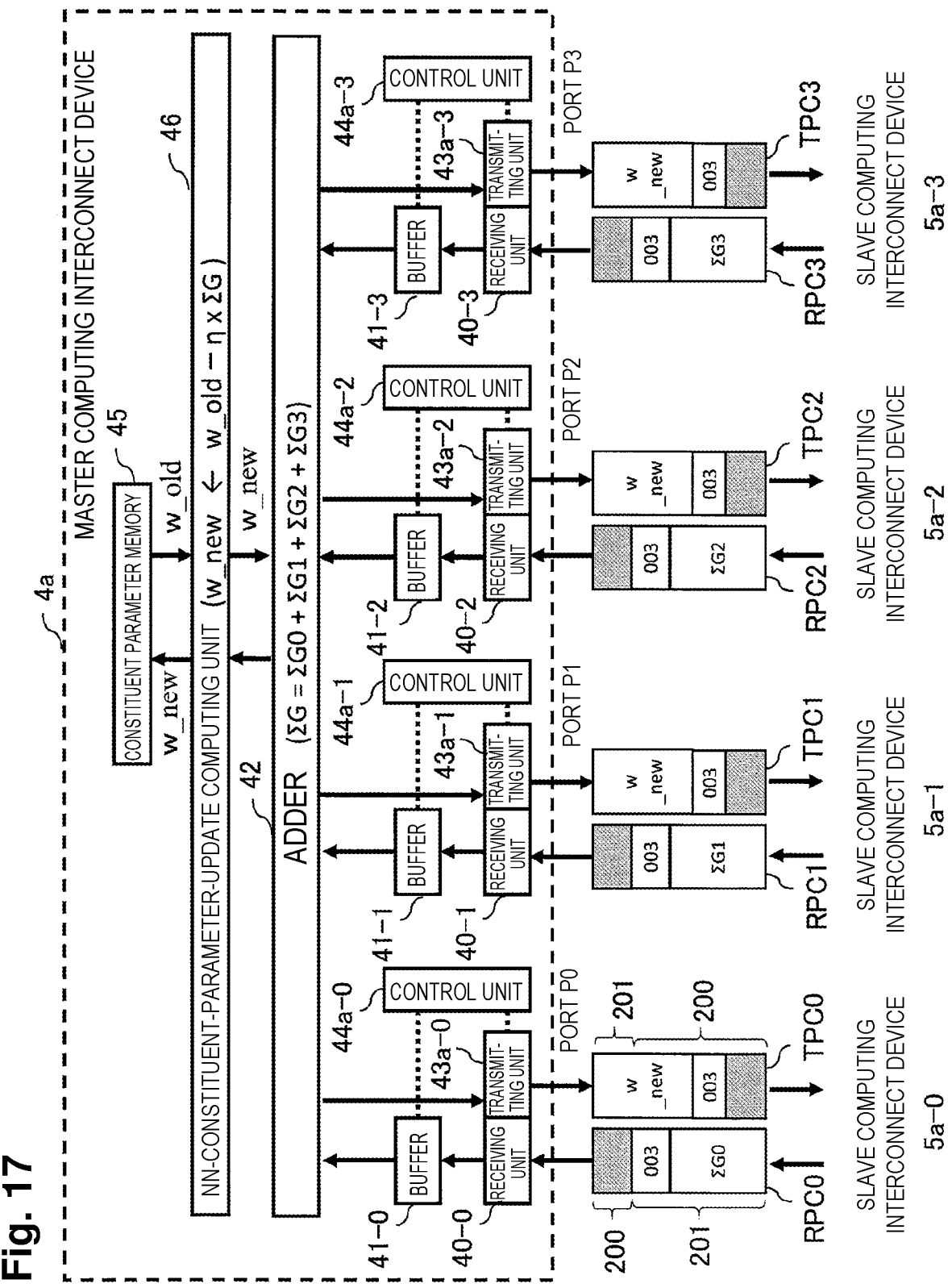
FIG. 17 is a block diagram showing a configuration of a master computing interconnect device of the distributed deep learning system according to the fourth embodiment of the present invention.

FIG. 17 is a block diagram showing a configuration of the master computing interconnect device 4a in this embodiment. The same components as the components shown in FIG. 14 are denoted by the same reference numerals and signs. The master computing interconnect device 4a includes the ports P0 to P3 respectively connected to the slave computing interconnect devices 5a-0 to 5a-3 by a communication network, the reception units 40-4 to 40-3, the buffer memories 41-0 to 41-3, the adder 42, transmission units 43a-0 to 43a-3, control units 44a-0 to 44a-3, a constituent parameter memory 45 that stores constituent parameters of learning target neural networks of the learning nodes 2a-0 to 2a-15, and an NN (neural network)-constituent-parameter-update computation unit 46 that calculates values after update of constituent parameters (weight parameters) of the neural networks.

At a learning start point in time, in the neural networks of the learning nodes 2a-0 to 2a-15, the same initial values of constituent parameters are set in all the learning nodes 2a-0 to 2a-15. The initial values of the constituent parameters of the neural networks are stored in the constituent parameter memory 45 of the master computing interconnect device 4a. Initial values of the constituent parameters are transmitted to the master computing interconnect device 4a through the slave computing interconnect devices 5a-0 to 5a-3 using communication packets, for example, from the learning nodes 2a-0 to 2a-15. In the master computing interconnect device 4a that receives the initial values of the constituent parameters, the initial values of the constituent parameters are stored in the constituent parameter memory 45.

As in the third embodiment, when the sums $\Sigma G0$ to $\Sigma G3$ of the gradients, to which the same sequential number is given, from all the slave computing interconnect devices 5a-0 to 5a-3 corresponding to the control units 44-0 to 44-3 of the master computing interconnect device 4a are written in the buffer memories 41-0 to 41-3, the control units 44-0 to 44-3 read out the sums $\Sigma G0$ to $\Sigma G3$ of the gradients from the buffer memories 41-0 to 41-3 and pass the sums $\Sigma G0$ to $\Sigma G3$ of the gradients to the adder 42.

The adder 42 of the master computing interconnect device 4a calculates a sum $\Sigma G$ obtained by further totaling the sums of the gradients as indicated by Expression (6).

The NN-constituent-parameter-update computation unit 46 calculates, based on the sum ΣG of the gradients calculated by the adder 42 and the value w_old of the constituent parameters stored in the constituent parameter memory 45, for each of the constituent parameters, the value w_new after the update of the constituent parameters of the neural networks and outputs the value w_new to the transmission units 43a-0 to 43a-3. When, for example, the gradient descent method is used as an updating method, the calculation indicated by Expression (5) is performed.

The NN-constituent-parameter-update computation unit 46 outputs the value w_new after the update of the constituent parameters to the transmission units 43a-0 to 43a-3 and, at the same time, overwrites the values of the constituent parameters stored in the constituent parameter memory 45 with the value w_new after the update.

The control units 44a-0 to 44a-3 pass sequential numbers ("003" in an example shown in FIG. 17) corresponding to the sums ΣG0 to ΣG3 of the gradients read out from the buffer memories 41-0 to 41-3 to the transmission units 43a-0 to 43a-3. The transmission units 43a-0 to 43a-3 store, in the payloads of the communication packets TPC0 to TPC3, the value w_new after the update of the constituent parameters calculated by the NN-constituent-parameter-update computation unit 46 and the sequential numbers received from the control units 44a-0 to 44a-3. The control units 44a-0 to 44a-3 cause the transmission units 43a-0 to 43a-3 to simultaneously transmit the communication packets TPC0 to TPC3 to the slave computing interconnect devices 5a-0 to 5a-3.

Note that, in the example shown in FIG. 17, an example is explained in which the slave computing interconnect devices 5a-0 to 5a-3 are connected directly under the master computing interconnect device 4a. However, learning nodes may be connected directly under the master computing interconnect device 4a as in the example shown in FIG. 12.

Configurations of the slave computing interconnect devices 5a-0 to 5a-3 are the same as the configurations of the slave computing interconnect devices 5-0 to 5-3 in the third embodiment. Therefore, differences from the third embodiment are explained using the reference numerals and signs shown in FIG. 15.

The reception units 56 of the slave computing interconnect devices 5a-0 to 5a-3 extract the value w_new after the update of the constituent parameters and the sequential numbers from the data payloads of the communication packets TPC0 to TPC3 received from the master computing interconnect device 4a.

The transmission units 53-0 to 53-3 of the slave computing interconnect devices 5a-0 to 5a-3 store, in the data payloads of the communication packets TP0 to TP3, the value w_new after the update of the constituent parameters and the sequential numbers received from the reception unit 56. The control units 54-0 to 54-3 cause the transmission units 53-0 to 53-3 to simultaneously transmit the communication packets TP0 to TP3 to the learning nodes 2a-0 to 2a-15 directly under the slave computing interconnect devices 5a-0 to 5-3. As explained in the third embodiment, the reception unit 56 and the transmission units 53-0 to 53-3 may directly transfer communication packets received from the master computing interconnect device 4a to the learning nodes 2a-0 to 2a-15 directly under the slave computing interconnect devices 5a-0 to 5a-3.

Note that, in the example shown in FIG. 15, the learning nodes are connected directly under the slave computing interconnect devices. However, another slave computing interconnect device may be connected directly under the slave computing interconnect devices 5a-0 to 5a-3 as in the example shown in FIG. 12.

Configurations of the learning nodes 2a-0 to 2a-15 are as explained in the second embodiment. The reception units 24a of the learning nodes 2a-0 to 2a-15 extract the value w_new after the update of the constituent parameters and the sequential numbers from the data payloads of the communication packets TP0 to TP3 received from the slave computing interconnect devices 5a-0 to 5a-3 directly above the learning nodes 2a-0 to 2a-15.

The constituent-parameter update units 25a of the learning nodes 2a-0 to 2a-15 update the neural networks 26 by overwriting the constituent parameters of the neural networks 26, which are specified by the sequential numbers, with the value w_new after the update of the constituent parameters.

In this embodiment, since the computing interconnect devices 4a and 5a are used for the All-reduce processing and the update calculation for the constituent parameters of the neural networks, although there is a slight delay based on fluctuation in arrival times of communication packets from the learning nodes 2a-0 to 2a-15, transmission and reception processing for the communication packets between the computing interconnect devices 4a and 5a and the learning nodes 2a-0 to 2a-15 can be performed by hardware processing simultaneously in parallel and at high speed. Therefore, it is possible to perform processing at high speed compared with when the communication processing and the gradient addition processing are performed by software processing in the head node of the conventional technique.

In particular, in this embodiment, it is possible to achieve an increase in speed by preparing a dedicated arithmetic circuit for the update calculation processing for the constituent parameters as well. As the sum calculation for the gradients and the update calculation for the constituent parameters, the same calculation only has to be performed independently for each of the constituent parameters irrespective of the configurations of the neural networks 26. Therefore, there is also an advantage that, even when the configurations of the neural networks 26 in the learning nodes 2a-0 to 2a-15 are changed, the same dedicated arithmetic circuit can be used as the arithmetic unit of the master computing interconnect device 4a.

Fifth Embodiment

Figure 18:
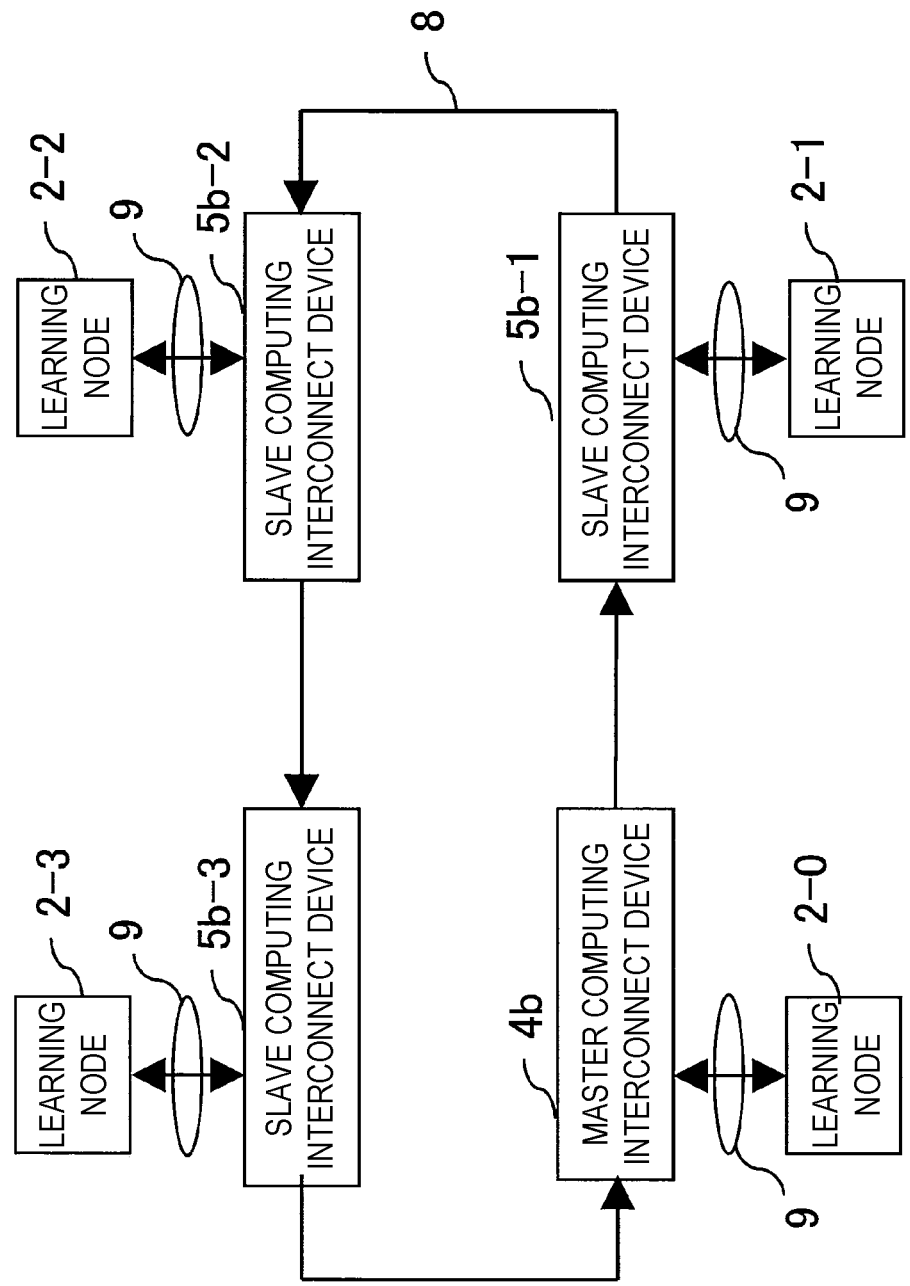
FIG. 18 is a block diagram showing a configuration of a distributed deep learning system according to a fifth embodiment of the present invention.

Subsequently, a fifth embodiment of the present invention is explained. FIG. 18 is a block diagram showing a configuration of a distributed deep learning system according to this embodiment. In this embodiment, as shown in FIG. 18, one master computing interconnect device 4b and a plurality of slave computing interconnect devices 5b-1 to 5b-3 are connected by a ring-type communication network 8. The learning nodes 2-0 to 2-3 are respectively connected to the master computing interconnect device 4b and the slave computing interconnect devices 5b-1 to 5b-3 via communication networks 9.

The master computing interconnect device 4b and the learning node 2-0 may be connected by a communication cable. The slave computing interconnect devices 5b-1 and 5b-2 and the learning nodes 2-1 to 2-3 may be connected by communication cables. The computing interconnect devices 4b and 5b-1 and 5b-2 may be directly inserted into I/O interfaces such as PCI Express in the learning nodes 2-0 to 2-3.

Operation of the distributed deep learning system in this embodiment is shown in FIG. 19(A) to FIG. 19(E). First, a calculation result G0 of gradients is transmitted to the master computing interconnect device 4b from the learning node 2-0 connected to the master computing interconnect device 4b. The master computing interconnect device 4b transfers the calculation result G0 of the gradients to the slave computing interconnect device 5b-1 (FIG. 19(A)).

Figure 19:
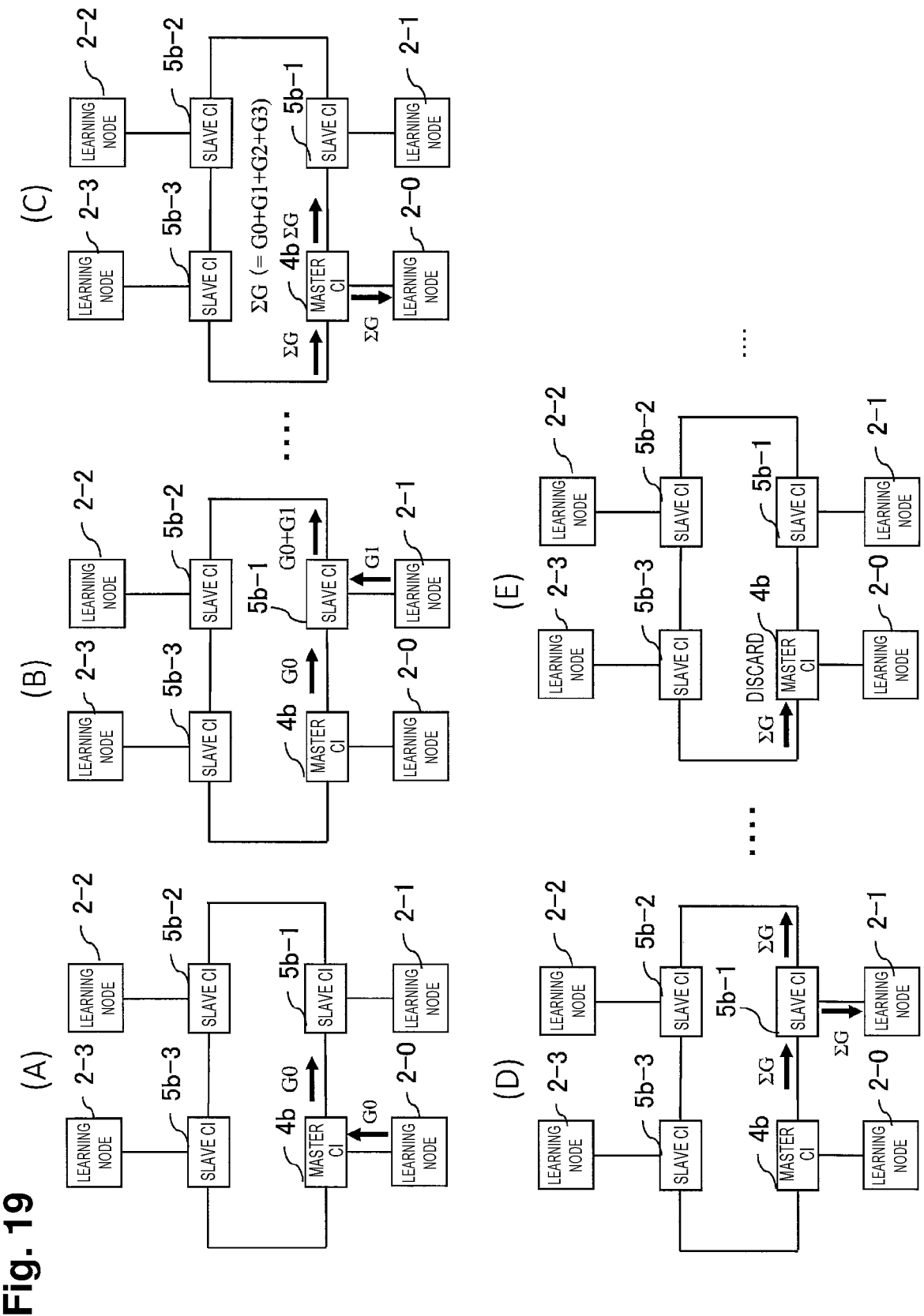
FIG. 19 is a diagram for explaining operation of the distributed deep learning system according to the fifth embodiment of the present invention.

The slave computing interconnect device 5b-1 calculates a sum G0+G1 of the calculation result G0 of the gradients transmitted from the master computing interconnect device 4b and a calculation result G1 of gradients transmitted from the learning node 2-1 directly under the master computing interconnect device 4b and transmits the calculation result G0+G1 to the slave computing interconnect device 5b-2 (FIG. 19(B)).

The same processing is performed in each of the slave computing interconnect devices 5b-2 and 5b-3. The slave computing interconnect device 5b-2 calculates a sum G0+G1+G2 of the calculation result G0+G1 of the sum of the gradients transmitted from the slave computing interconnect device 5b-1 and a calculation result G2 of gradients transmitted from the learning node 2-2 directly under the slave computing interconnect device 5b-2 and transmits the calculation results G0+G1+G2 to the slave computing interconnect device 5b-3. The slave computing interconnect device 5b-3 calculates a sum ΣG=G0+G1+G2+G3 of the calculation result G0+G1+G2 of the sum of the gradients transmitted from the slave computing interconnect device 5b-2 and a calculation result G3 of gradients transmitted from the learning node 2-3 directly under the slave computing interconnect device 5b-3 and transmits the calculation result ΣG to the master computing interconnect device 4b.

The master computing interconnect device 4b, which receives the calculation result ΣG of the sum of the gradients, transmits the received sum ΣG of the gradients to the learning node 2-0 and the slave computing interconnect device 5b-1 directly under the master computing interconnect device 4b (FIG. 19(C)).

The slave computing interconnect device 5b-1, which receives the sum ΣG of the gradients, transmits the sum ΣG of the gradients to the learning node 2-1 and the slave computing interconnect device 5b-2 directly under the slave computing interconnect device 5b-1 (FIG. 19(D)).

The same processing is performed in each of the slave computing interconnect devices 5b-2 and 5b-3. The slave computing interconnect device 5b-2 transmits the sum ΣG of the gradients, which is transmitted from the slave computing interconnect device 5b-1, to the learning node 2-2 and the slave computing interconnect device 5b-3 directly under the slave computing interconnect device 5b-2. The slave computing interconnect device 5b-3 transmits the sum ΣG of the gradients, which is transmitted from the slave computing interconnect device 5b-2, to the learning node 2-3 and the master computing interconnect device 4b directly under the slave computing interconnect device 5b-3.

Finally, the master computing interconnect device 4b, which receives the sum ΣG of the gradients, discards the sum ΣG of the gradients (FIG. 19(E)).

According to the operation explained above, the sum ΣG of the gradients is transmitted to the learning nodes 2-0 to 2-3.

Figure 20:
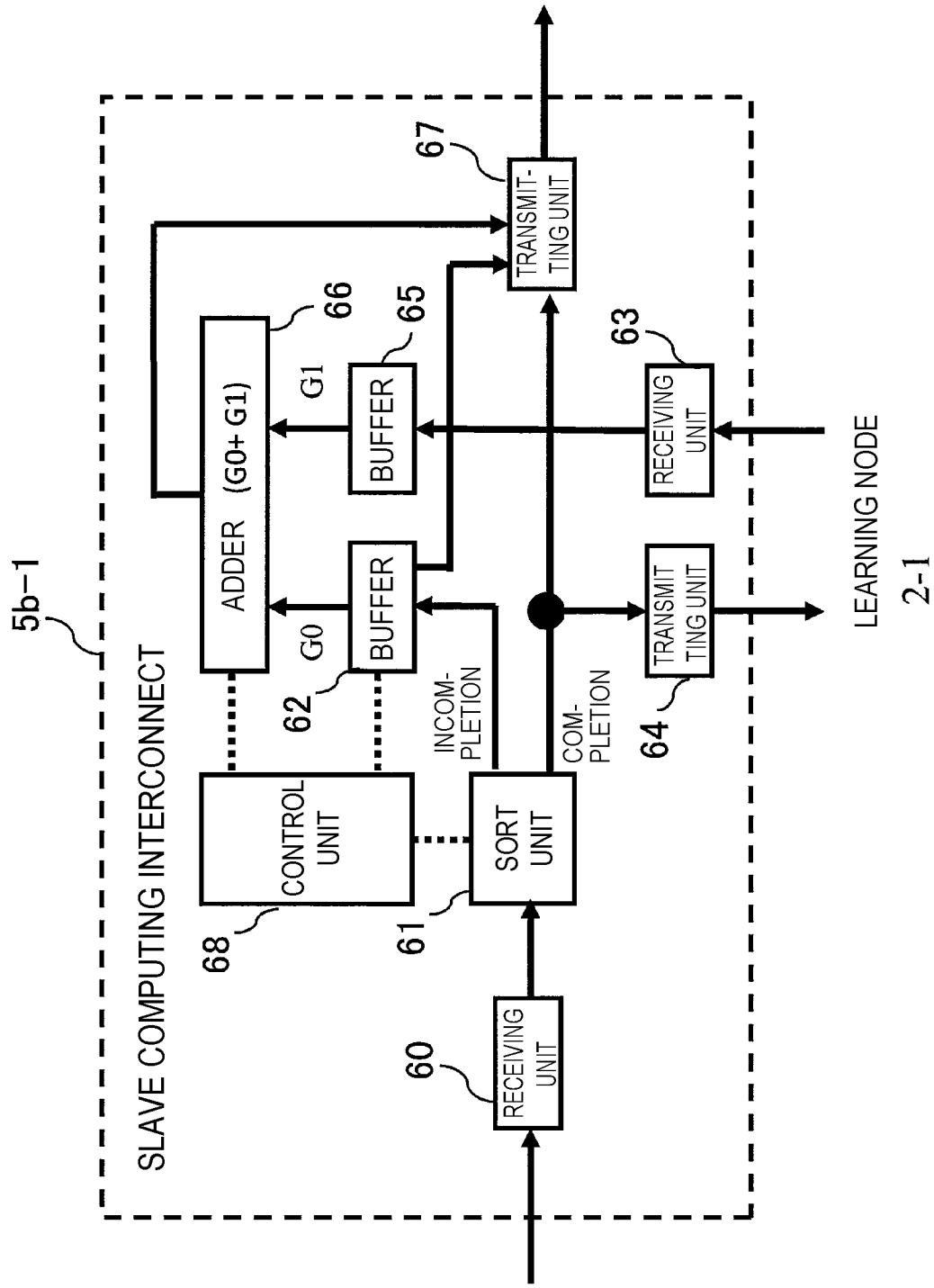
FIG. 20 is a block diagram showing a configuration of a slave computing interconnect device of the distributed deep learning system according to the fifth embodiment of the present invention.

A configuration of the slave computing interconnect device 5b-1 is shown in FIG. 20. The slave computing interconnect device 5b-1 includes a reception unit 60 that receives a communication packet transmitted from an adjacent upstream computing interconnect device (the master computing interconnect device 4b or a slave computing interconnect device on the left) in a ring-type network configuration in which communication is performed only in one direction (in this embodiment, the counterclockwise direction), a sort unit 61 that sorts data received from the reception unit 60 according to a reception completion flag (completion/incompletion) of the communication packet, a buffer memory 62 that temporarily stores the data received from the sort unit 61, a reception unit 63 that receives a communication packet transmitted from the learning node 2-1 directly under the slave computing interconnect device 5b-1, a transmission unit 64 that transmits a communication packet to the learning node 2-1 directly under the slave computing interconnect device 5b-1, a buffer memory 65 that temporarily stores data received from the reception unit 63, an adder 66 (an arithmetic unit) that calculates a sum of gradients, a transmission unit 67 that transmits a communication packet to an adjacent downstream computing interconnect device (the master computing interconnect device 4b or a slave computing interconnect device on the right) in the ring-type network configuration, and a control unit 68 that controls the buffer memories 62 and 65.

In an example shown in FIG. 20, the configuration of the slave computing interconnect device 5b-1 is shown. However, configurations of the other slave computing interconnect devices are the same as the configuration of the slave computing interconnect device 5b-1.

Figure 21:
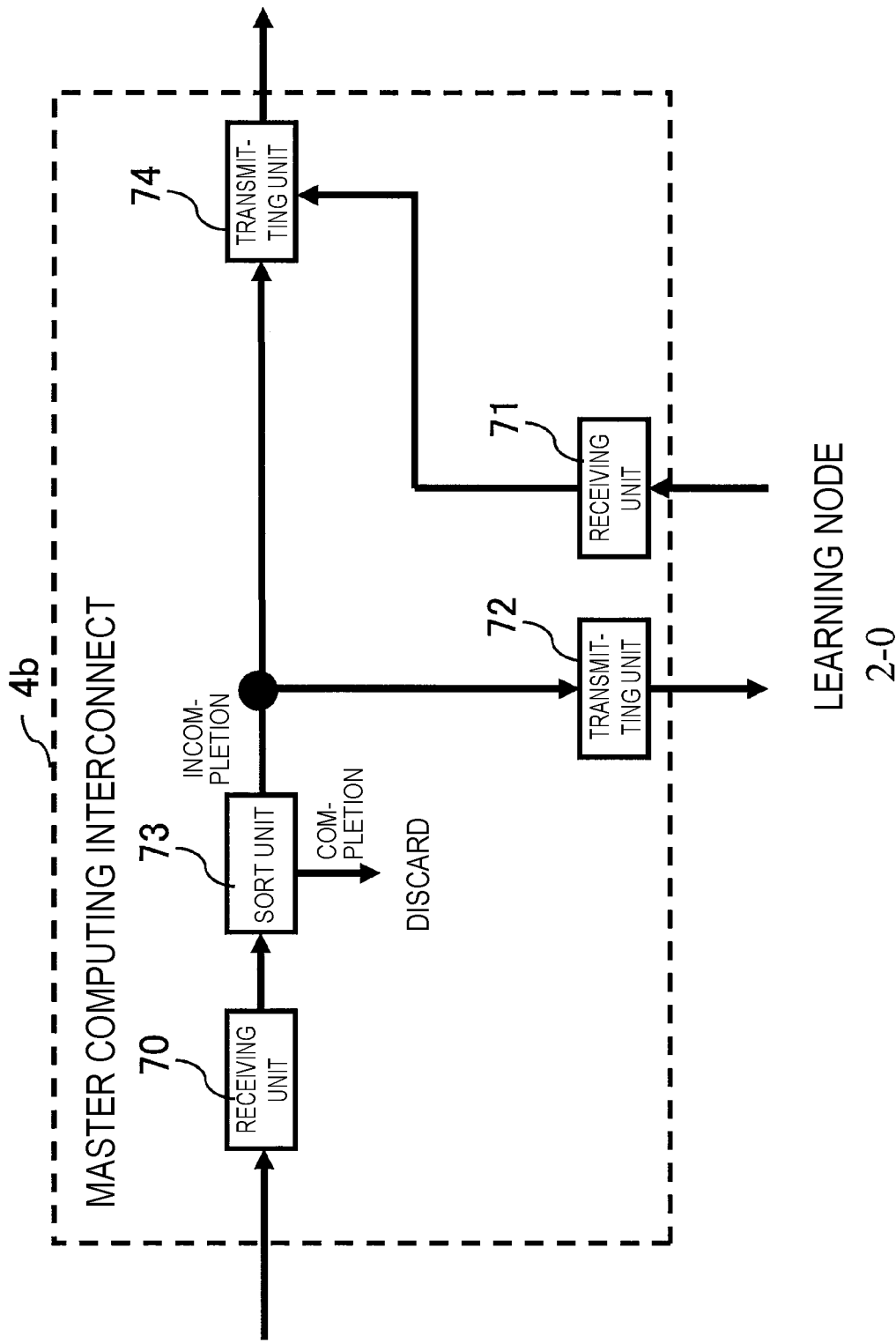
FIG. 21 is a block diagram showing a configuration of a master computing interconnect device of the distributed deep learning system according to the fifth embodiment of the present invention.

A configuration of the master computing interconnect device 4b is shown in FIG. 21. The master computing interconnect device 4b includes a reception unit 70 that receives a communication packet transmitted from an adjacent upstream computing interconnect device (a slave computing interconnect device on the left) in a ring-type network configuration, a reception unit 71 that receives a communication packet transmitted from the learning node 2-0 directly under the master computing interconnect device 4b, a transmission unit 72 that transmits a communication packet to the learning node 2-0 directly under the master computing interconnect device 4b, a sort unit 73 that sorts data received from the reception unit 70 according to a reception completion flag (completion/incompletion) of a communication packet, and a transmission unit 74 that transmits a communication packet to an adjacent downstream computing interconnect device (a slave computing interconnect device on the right) in the ring-type network configuration.

Figure 22:
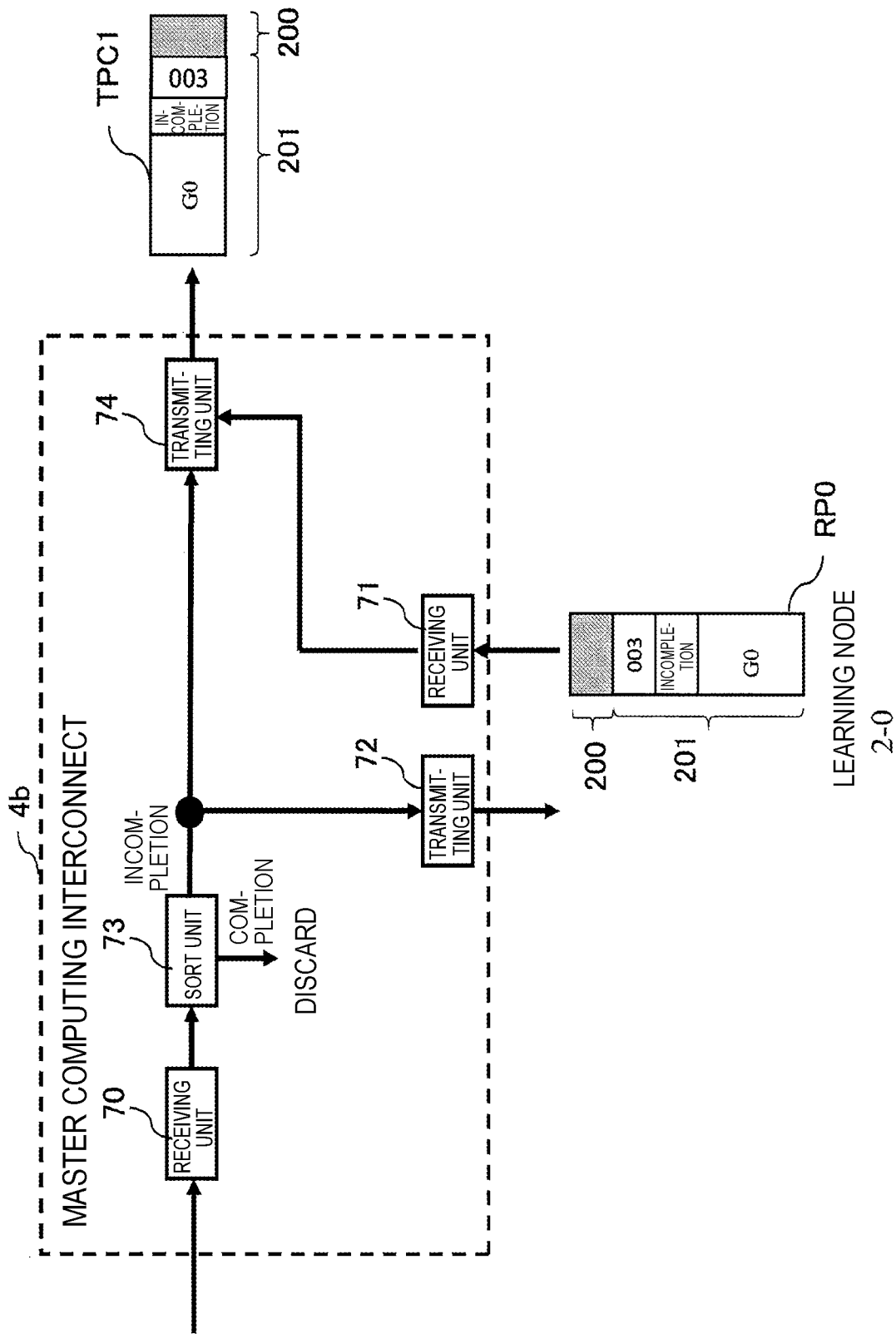
FIG. 22 is a diagram for explaining operation of the master computing interconnect device of the distributed deep learning system according to the fifth embodiment of the present invention.

FIG. 22 shows operation of the master computing interconnect device 4b in FIG. 19(A). As explained in the first embodiment, a communication packet includes the header 200 and the data payload 201. In the data payload of the communication packet RP0 transmitted from the learning node 2-0, a gradient value (G0 shown in FIG. 22) calculated by the learning node 2-0, a sequential number ("003" in an example shown in FIG. 22) of the gradient value, and a reception completion flag indicating acquisition completion/incompletion (incompletion in the example shown in FIG. 22) of a sum of gradients in the master computing interconnect device 4b are stored. Note that, in the slave computing interconnect devices 5b-1 to 5b-3, the reception completion flag means completion/incompletion of calculation of a sum of gradients.

The reception unit 71 of the master computing interconnect device 4b extracts the gradient value G0, the sequential number, and the reception completion flag from the data payload of the received communication packet RP0 and passes the gradient value G0, the sequential number, and the reception completion flag to the transmission unit 74.

The transmission unit 74 stores the gradient value G0, the sequential number, and the reception completion flag received from the reception unit 71 in a data payload of a communication packet TPC1 and transmits the communication packet TPC1 to an adjacent downstream computing interconnect device (the slave computing interconnect device 5b-1 in FIG. 19(A)).

Figure 23:
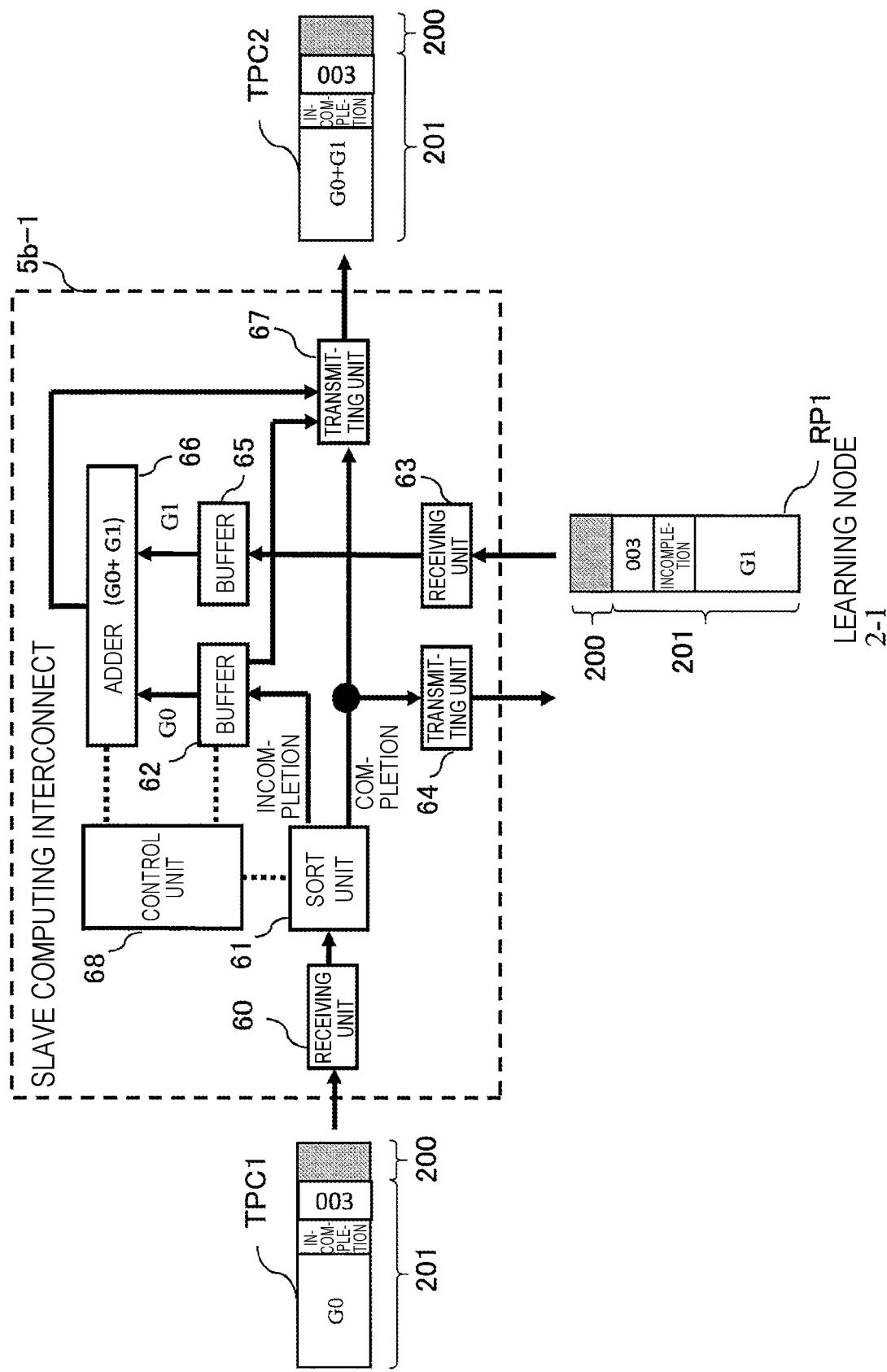
FIG. 23 is a diagram for explaining operation of the slave computing interconnect device of the distributed deep learning system according to the fifth embodiment of the present invention.

FIG. 23 shows operation of the slave computing interconnect device 5b-1 in FIG. 19(B).

The reception unit 60 of the slave computing interconnect device 5b-1 extracts the gradient value G0, the sequential number, and the reception completion flag from the data payload of the communication packet TPC1 received from the master computing interconnect device 4b and passes the gradient value G0, the sequential number, and the reception completion flag to the sort unit 61.

Since the reception completion flag received from the reception unit 60 indicates "incompletion", the sort unit 61 stores the gradient value G0, the sequential number, and the reception completion flag received from the reception unit 60 in the buffer memory 62.

On the other hand, the reception unit 63 of the slave computing interconnect device 5b-1 extracts the gradient value G1, the sequential number, and the reception completion flag from the data payload of the communication packet RP1 received from the learning node 2-1 directly under the slave computing interconnect device 5b-1 and stores the gradient value G1, the sequential number, and the reception completion flag in the buffer memory 65.

At a point in time when the gradient values G0 and G1 having the same sequential number are gathered in the buffer memory 62 and the buffer memory 65, the control unit 68 of the slave computing interconnect device 5b-1 reads out the gradient value G0, the sequential number, and the reception completion flag from the buffer memory 62, reads out the gradient value G1, the sequential number, and the reception completion flag from the buffer memory 65, and passes the gradient values G0 and G1 to the adder 66.

The adder 66 adds up the gradient values G0 and G1. The control unit 68 passes the sequential number and the reception completion flag read out from the buffer memory 62 to the transmission unit 67.

The transmission unit 67 of the slave computing interconnect device 5b-1 stores, in the data payload of the communication packet TPC2, the sum G0+G1 of the gradients calculated by the adder 66 and the sequential number and the reception completion flag received from the control unit 68 and transmits the communication packet TPC2 to an adjacent downstream computing interconnect device (the slave computing interconnect device 5b-2 in FIG. 19(B)).

Figure 24:
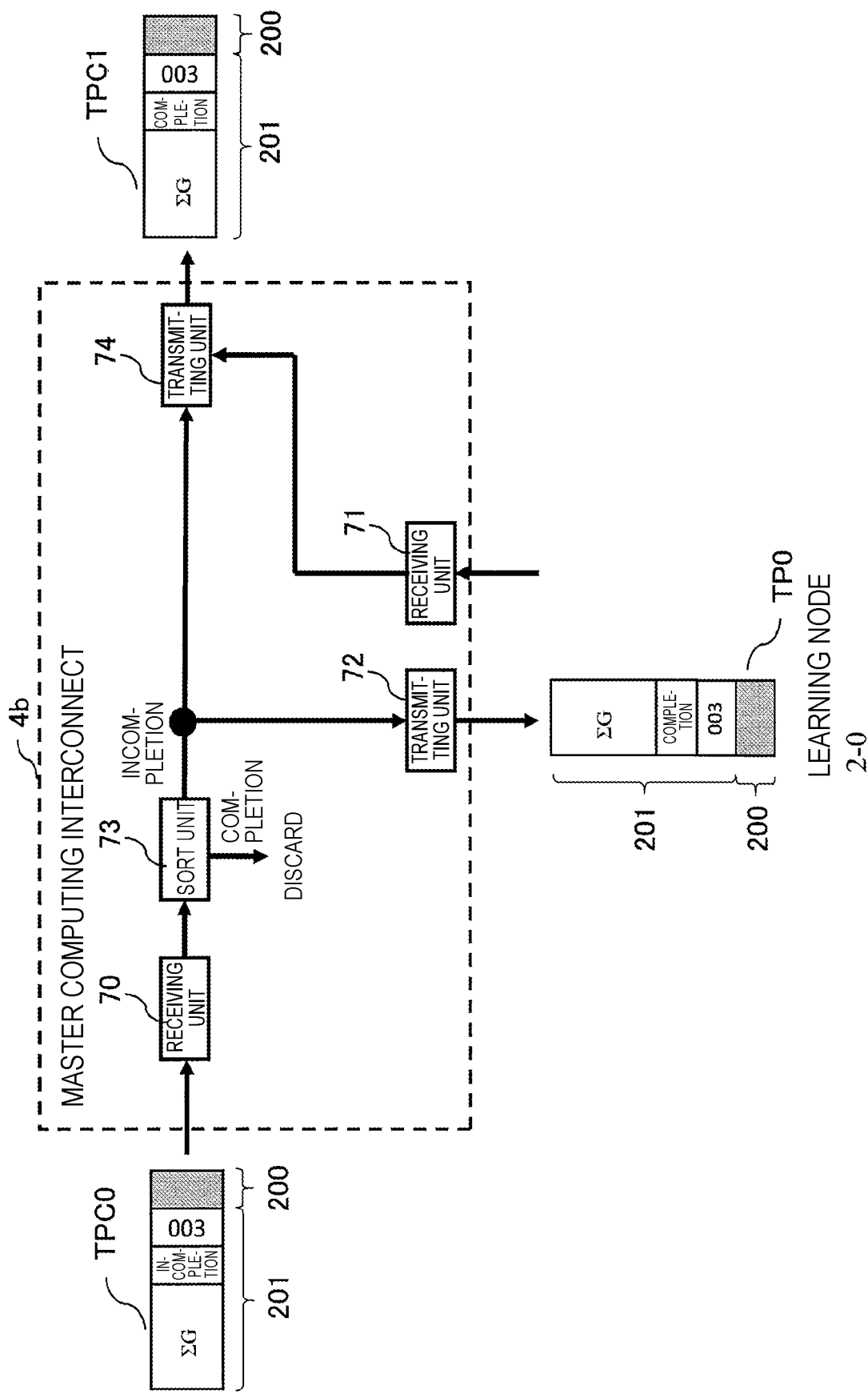
FIG. 24 is diagram for explaining the operation of the master computing interconnect device of the distributed deep learning system according to the fifth embodiment of the present invention.

FIG. 24 shows operation of the master computing interconnect device 4b in FIG. 19(C).

The reception unit 70 of the master computing interconnect device 4b extracts the sum $\Sigma G$ of the gradients, the sequential number, and the reception completion flag from the payload of the communication packet TPC0 received from an adjacent upstream computing interconnect device (the slave computing interconnect device 5b-3 in FIG. 19(C)) and passes the sum $\Sigma G$ of the gradients, the sequential number, and the reception completion flag to the sort unit 73.

Since the reception completion flag received from the reception unit 70 indicates "incompletion", the sort unit 73 passes the sum $\Sigma G$ of the gradients, the sequential number, and the reception completion flag received from the reception unit 70 to the transmission unit 72 and the transmission unit 74. At this time, the master computing interconnect device 4b receiving the communication packet TPC0 from the adjacent upstream slave computing interconnect device 5b-3 means that the communication packet has circulated around the ring-type communication network 8 and calculation of a sum of gradients has been completed. Therefore, the sort unit 73 changes the reception completion flag received from the reception unit 70 from a value indicating "incompletion" to a value indicating "completion" and then passes the reception completion flag to the transmission unit 72 and the transmission unit 74.

The transmission unit 72 stores the sum $\Sigma G$ of the gradients, the sequential number, and the reception completion flag received from the sort unit 73 in the data payload of the communication packet TP0 and transmits the communication packet TP0 to the learning node 2-0.

The transmission unit 74 stores the sum $\Sigma G$ of the gradients, the sequential number, and the reception completion flag received from the sort unit 73 in the data payload of the communication packet TPC1 and transmits the communication packet TRC1 to an adjacent downstream computing interconnect device (the slave computing interconnect device 5b-1 in FIG. 19(C)).

Figure 25:
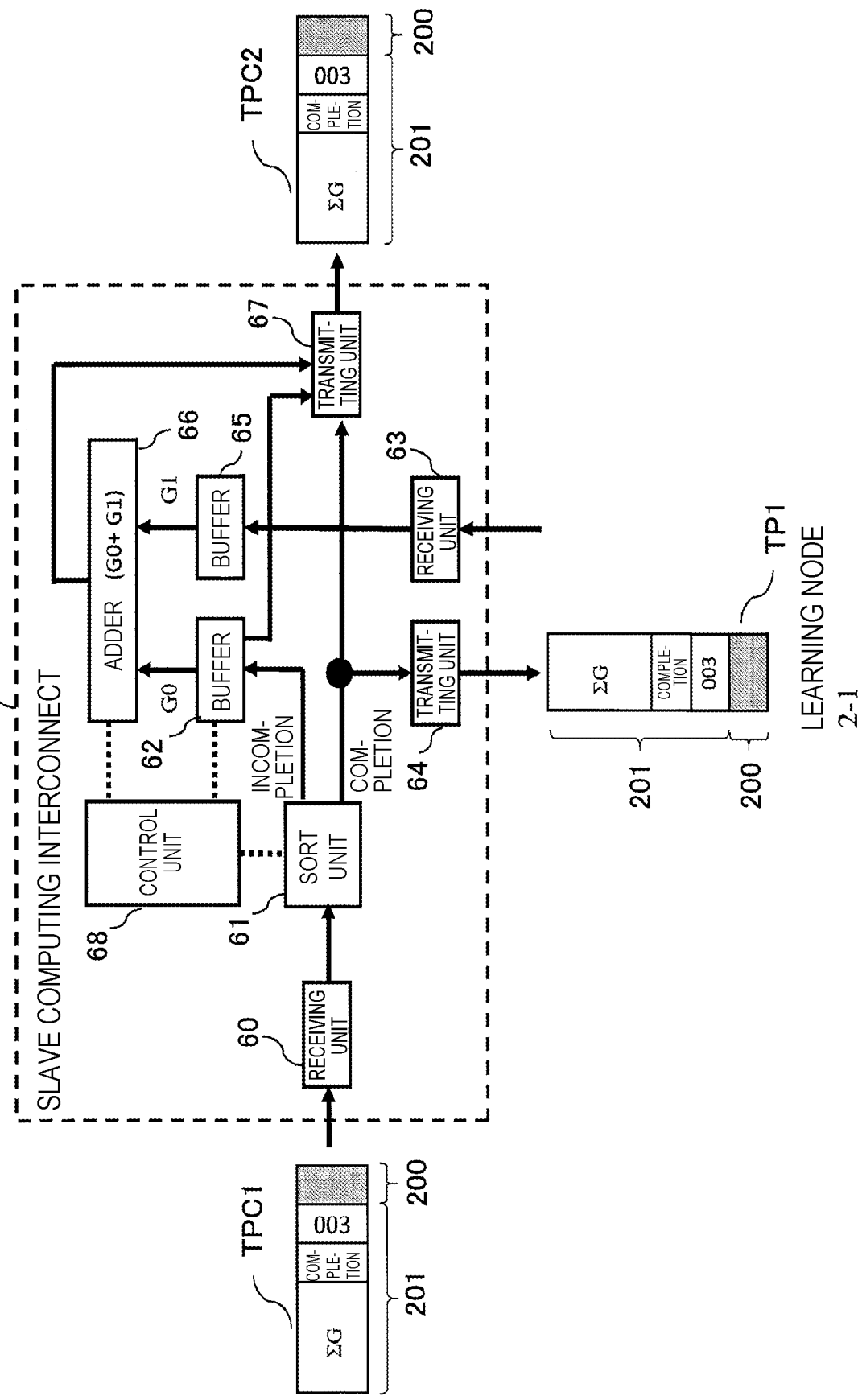
FIG. 25 is a diagram for explaining the operation of the slave computing interconnect device of the distributed deep learning system according to the fifth embodiment of the present invention.

FIG. 25 shows operation of the slave computing interconnect device 5b-1 in FIG. 19(D).

The reception unit 60 of the slave computing interconnect device 5b-1 extracts the sum $\Sigma G$ of the gradients, the sequential number, and the reception completion flag from the data payload of the communication packet TPC1 received from the master computing interconnect device 4b and passes the sum $\Sigma G$ of the gradients, the sequential number, and the reception completion flag to the sort unit 61.

Since the reception completion flag received from the reception unit 60 indicates "completion", the sort unit 61 passes the sum $\Sigma G$ of the gradients, the sequential number, and the reception completion flag received from the reception unit 60 to the transmission unit 64 and the transmission unit 67.

The transmission unit 64 stores the sum $\Sigma G$ of the gradients, the sequential number, and the reception completion flag received from the sort unit 61 in the data payload of the communication packet TP1 and transmits the communication packet TP1 to the learning node 2-1.

The transmission unit 74 stores the sum $\Sigma G$ of the gradients, the sequential number, and the reception completion flag received from the sort unit 61 in the data payload of the communication packet TPC2 and transmits the communication packet TPC2 to an adjacent downstream computing interconnect device (the slave computing interconnect device 5b-2 in FIG. 19(D)).

Figure 26:
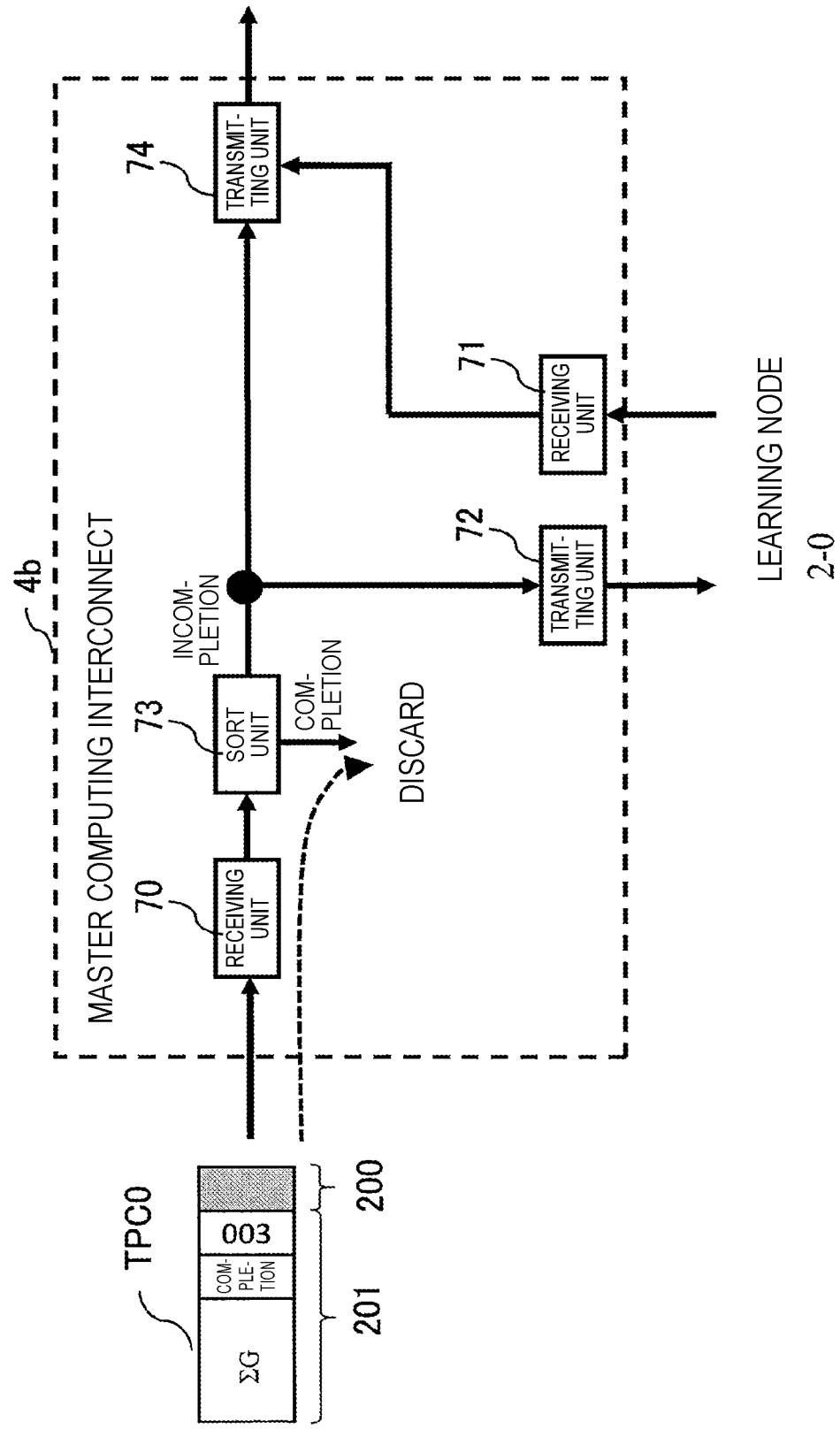
FIG. 26 is a diagram for explaining the operation of the master computing interconnect device of the distributed deep learning system according to the fifth embodiment of the present invention.

FIG. 26 shows operation of the master computing interconnect device 4b in FIG. 19(E).

The reception unit 70 of the master computing interconnect device 4b extracts the sum $\Sigma G$ of the gradients, the sequential number, and the reception completion flag from the data payload of the communication packet TPC0 received from an adjacent upstream computing interconnect device (the slave computing interconnect device 5b-3 in FIG. 19(E)) and passes the sum $\Sigma G$ of the gradients, the sequential number, and the reception completion flag to the sort unit 73.

Since the reception completion flag received from the reception unit 70 indicates "completion", the sort unit 73 discards the sum $\Sigma G$ of the gradients, the sequential number, and the reception completion flag received from the reception unit 70.

According to the operation explained above, the sum $\Sigma G$ of the gradients is transmitted to the learning nodes 2-0 to 2-3. The learning nodes 2-0 to 2-3 update the constituent parameters of the neural networks 26 using the sum ΣG of the gradients. One cycle of the distributed learning ends.

Configurations of the learning nodes 2-0 to 2-3 are the same as the configuration in the first embodiment shown in FIG. 7. This embodiment is different from the first embodiment in that the transmission units 23 of the learning nodes 2-0 to 2-3 write the reception completion flag indicating "incompletion" in the data payloads of the communication packets RP0 to RP3 besides the calculation result of the gradients calculated by the gradient calculation unit 22 and the sequential number and transmit the communication packets RP0 to RP3 to the master computing interconnect device 4b and the slave computing interconnect devices 5b-1 to 5b-3 directly above the learning nodes 2-0 to 2-3.

In this embodiment, since the computing interconnect devices 4b and 5b-1 to 5b-3 are used for the All-reduce processing, although there is a slight delay based on fluctuation in arrival times of communication packets from the learning nodes 2-0 to 2-3, transmission and reception processing for the communication packets between the computing interconnect devices 4b and 5b-1 to 5b-3 and the learning nodes 2-0 to 2-3 can be performed by hardware processing simultaneously in parallel and at high speed. Therefore, it is possible to perform processing at high speed compared with when the communication processing and the gradient addition processing are performed by software processing in the head node of the conventional technique.

Further, by connecting the computing interconnect devices 4b and 5b-1 to 5b-3 in a ring shape as in this embodiment, there is also an advantage that, even when many learning nodes 2-0 to 2-3 are connected to the computing interconnect devices 4b and 5b-1 to 5b-3, a communication band of the ring-type communication network 8 may be fixed irrespective of the number of the learning nodes 2-0 to 2-3.

Sixth Embodiment

Figure 27:
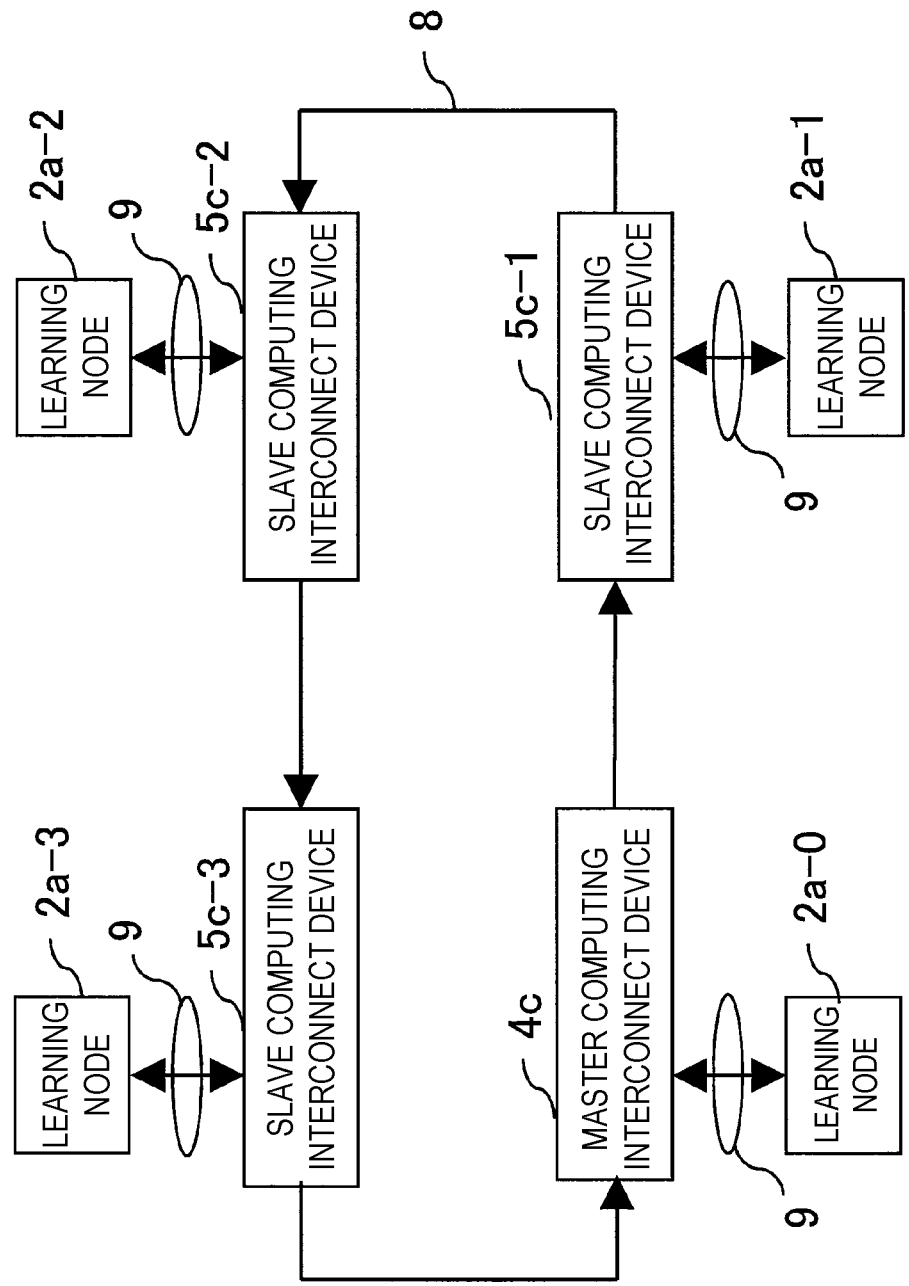
FIG. 27 is a block diagram showing a configuration of a distributed deep learning system according to a sixth embodiment of the present invention.

Subsequently, a sixth embodiment of the present invention is explained. FIG. 27 is a block diagram showing a configuration of a distributed deep learning system according to this embodiment. In this embodiment, as shown in FIG. 27, one master computing interconnect device 4c and a plurality of slave computing interconnect devices 5c-1 to 5c-3 are connected by the ring-type communication network 8 and the learning nodes 2a-0 to 2a-3 are respectively connected to the master computing interconnect device 4c and the slave computing interconnect devices 5c-1 to 5c-3. This embodiment is different from the fifth embodiment in that the master computing interconnect device 4c performs update calculation for constituent parameters of neural networks as well.

Operation of the distributed deep learning system in this embodiment is shown in FIG. 28(A) to FIG. 28(B). First, a calculation result G0 of gradients is transmitted to the master computing interconnect device 4c from the learning node 2a-0 connected to the master computing interconnect device 4c. The master computing interconnect device 4c transfers the calculation result G0 of the gradients to the slave computing interconnect device 5c-1 (FIG. 28(A)).

The slave computing interconnect device 5c-1 calculates a sum G0+G1 of the calculation result G0 of the gradients transmitted from the master computing interconnect device 4c and a calculation result G1 of gradients transmitted from the learning node 2a-1 directly under the slave computing interconnect device 5c-1 and transmits the calculation result G0+G1 to the slave computing interconnect device 5b-2 (FIG. 28(B)).

The same processing is performed in each of the slave computing interconnect devices 5c-2 and 5c-3. The slave computing interconnect device 5c-2 calculates a sum G0+G1+G2 of the calculation result G0+G1 of the sum of the gradients transmitted from the slave computing interconnect device 5c-1 and a calculation result G2 of gradients transmitted from the learning node 2a-2 directly under the slave computing interconnect device 5c-2 and transmits the calculation results G0+G1+G2 to the slave computing interconnect device 5c-3. The slave computing interconnect device 5c-3 calculates a sum ΣG=G0+G1+G2+G3 of the calculation result G0+G1+G2 of the sum of the gradients transmitted from the slave computing interconnect device 5c-2 and a calculation result G3 of gradients transmitted from the learning node 2a-3 directly under the slave computing interconnect device 5c-3 and transmits the calculation result ΣG to the master computing interconnect device 4c.

The master computing interconnect device 4c, which receives the calculation result ΣG of the sum of the gradients, calculates a value w_new after update of constituent parameters of neural networks using the sum ΣG of the gradients and transmits a result of the calculation to the learning node 2a-0 and the slave computing interconnect device 5c-1 directly under the master computing interconnect device 4c (FIG. 28(C)).

The slave computing interconnect device 5c-1, which receives the value w_new after the update of the constituent parameters, transmits the value w_new after the update of the constituent parameters to the learning node 2a-1 and the slave computing interconnect device 5c-2 directly under the slave computing interconnect device 5c-1 (FIG. 28(D)).

The same processing is performed in each of the slave computing interconnect devices 5c-2 and 5c-3. The slave computing interconnect device 5c-2 transmits the value w_new after the update of the constituent parameters, which is transmitted from the slave computing interconnect device 5c-1, to the learning node 2a-2 and the slave computing interconnect device 5c-3 directly under the slave computing interconnect device 5c-2. The slave computing interconnect device 5c-3 transmits the value w_new after the update of the constituent parameters, which is transmitted from the slave computing interconnect device 5c-2, to the learning node 2a-3 and the master computing interconnect device 4c directly under the slave computing interconnect device 5c-3.

Finally, the master computing interconnect device 4c, which receives the value w_new after the update of the constituent parameters, discards the value w_new after the update of the constituent parameters (FIG. 28(E)).

According to the operation explained above, the value w_new after the update of the constituent parameters is transmitted to the learning nodes 2a-0 to 2a-3.

Figure 29:
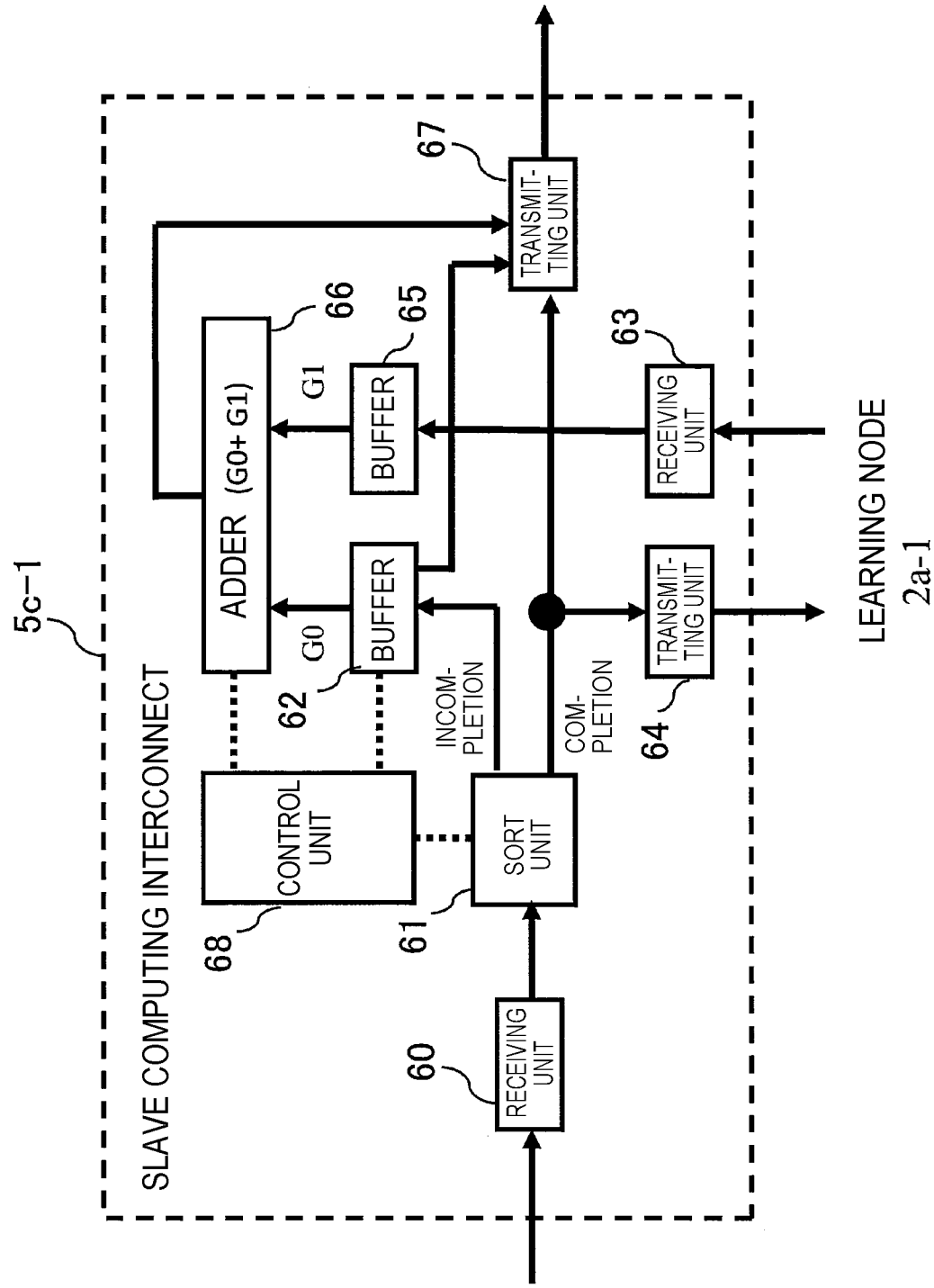
FIG. 29 is a block diagram showing a configuration of a slave computing interconnect device of the distributed deep learning system according to the sixth embodiment of the present invention.

A configuration of the slave computing interconnect device 5c-1 is shown in FIG. 29. The slave computing interconnect device 5c-1 includes the reception unit 60, the sort unit 61, the buffer memory 62, the reception unit 63, the transmission unit 64, the buffer memory 65, the adder 66, the transmission unit 67, and the control unit 68.

In an example shown in FIG. 29, the configuration of the slave computing interconnect device 5c-1 is shown. However, configurations of the other slave computing interconnect devices are the same as the configuration of the slave computing interconnect device 5c-1.

Figure 30:
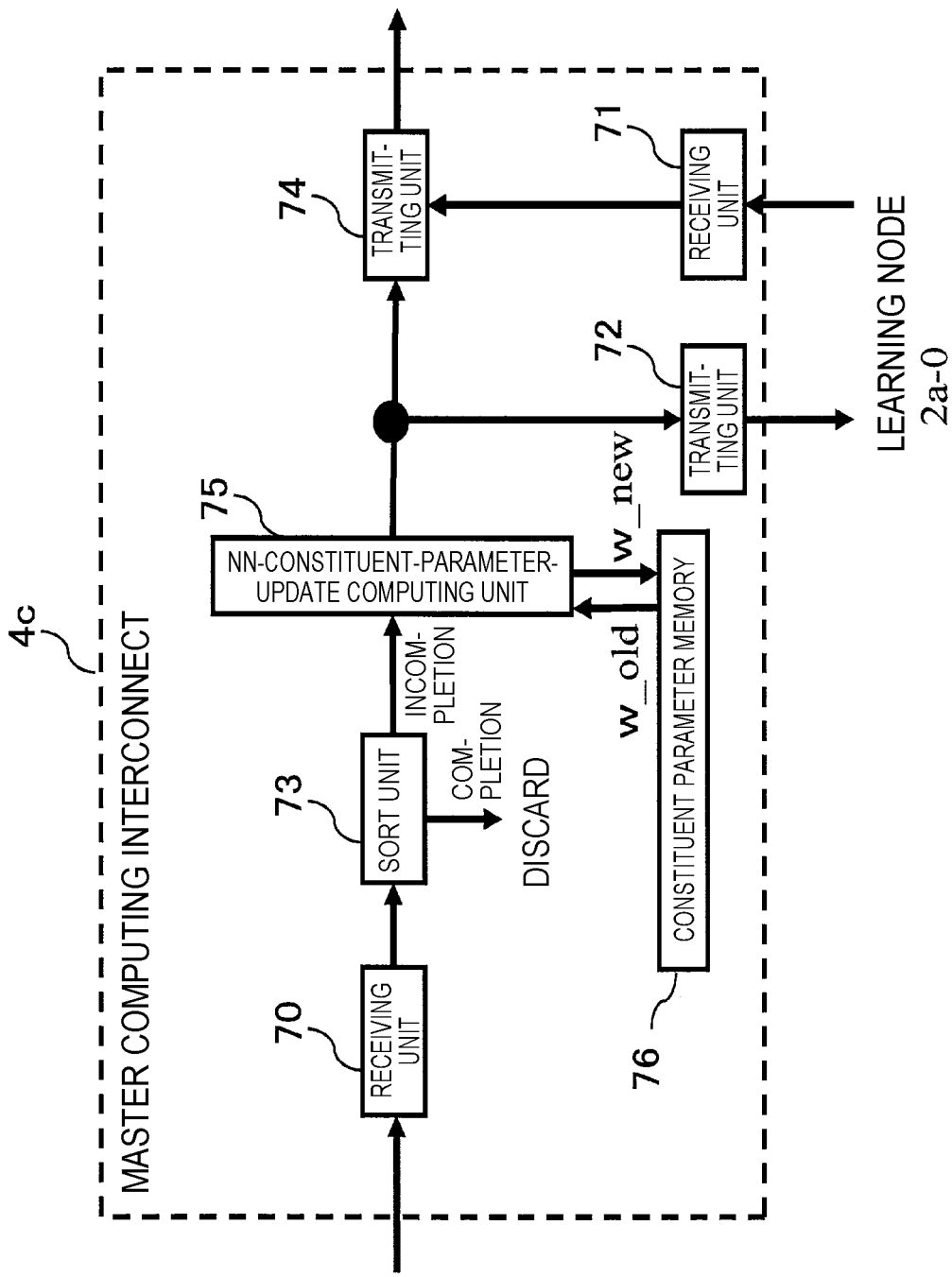
FIG. 30 is a block diagram showing a configuration of a master computing interconnect device of the distributed deep learning system according to the sixth embodiment of the present invention.

A configuration of the master computing interconnect device 4c is shown in FIG. 30. The master computing interconnect device 4c includes the reception unit 70, the reception unit 71, the transmission unit 72, the sort unit 73, the transmission unit 74, an NN (neural network)-constituent-parameter-update computation unit 75, and a constituent parameter memory 76. This embodiment is different from the fifth embodiment in that the NN-constituent-parameter-update computation unit 75 and the constituent parameter memory 76 are added.

Figure 31:
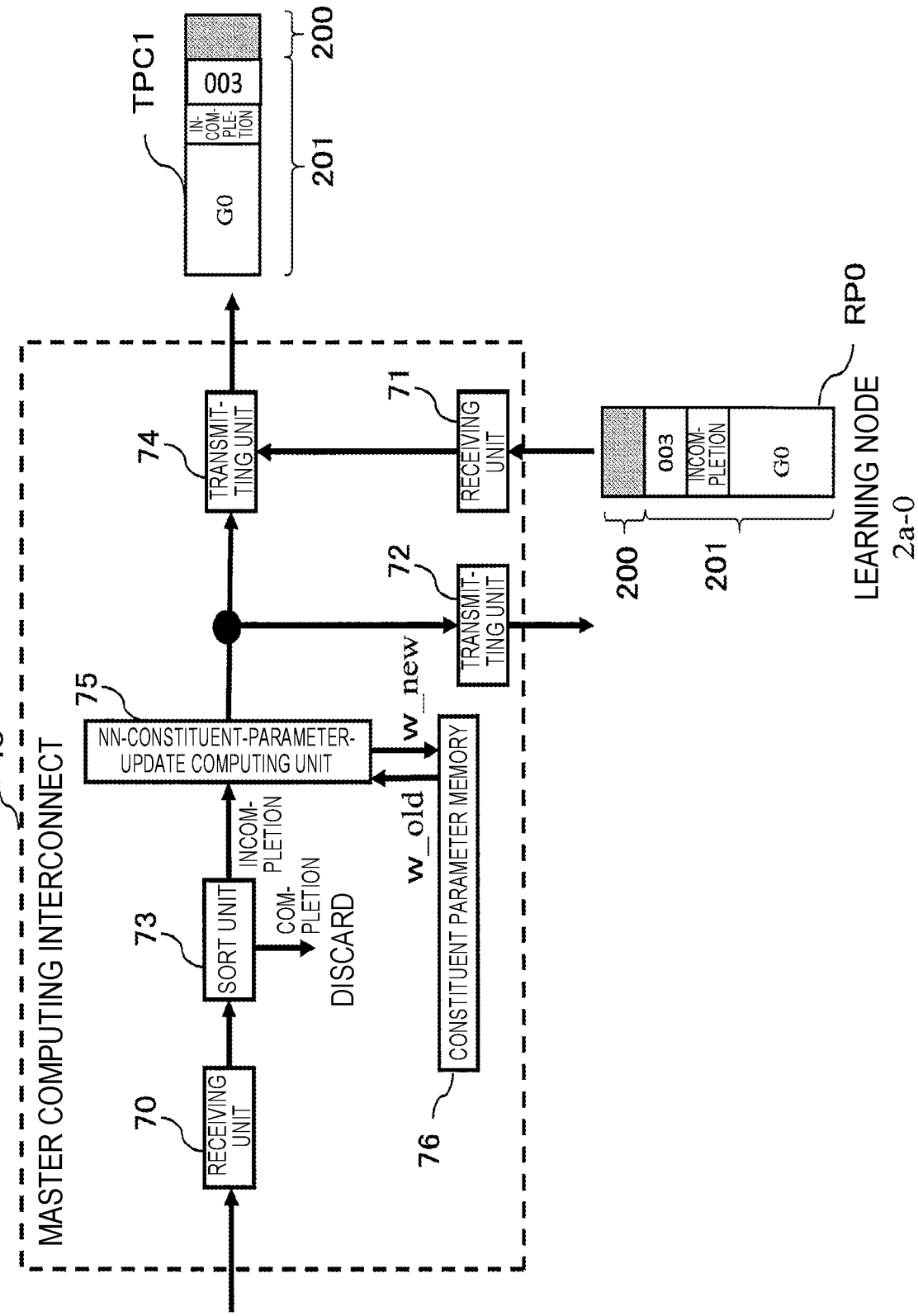
FIG. 31 is a diagram for explaining operation of the master computing interconnect device of the distributed deep learning system according to the sixth embodiment of the present invention.

FIG. 31 shows operation of the master computing interconnect device 4c in FIG. 28(A). In the data payload of the communication packet RP0 transmitted from the learning node 2a-0, a gradient value (G0 shown in FIG. 31) calculated by the learning node 2a-0, a sequential number ("003" in an example shown in FIG. 31) of the gradient value, and a reception completion flag (incompletion in the example shown in FIG. 31) are stored.

The reception unit 71 of the master computing interconnect device 4c extracts the gradient value G0, the sequential number, and the reception completion flag from the data payload of the received communication packet RP0 and passes the gradient value G0, the sequential number, and the reception completion flag to the transmission unit 74.

The transmission unit 74 stores the gradient value G0, the sequential number, and the reception completion flag received from the reception unit 71 in a data payload of a communication packet TPC1 and transmits the communication packet TPC1 to an adjacent downstream computing interconnect device (the slave computing interconnect device 5c-1 in FIG. 28(A)).

Figure 32:
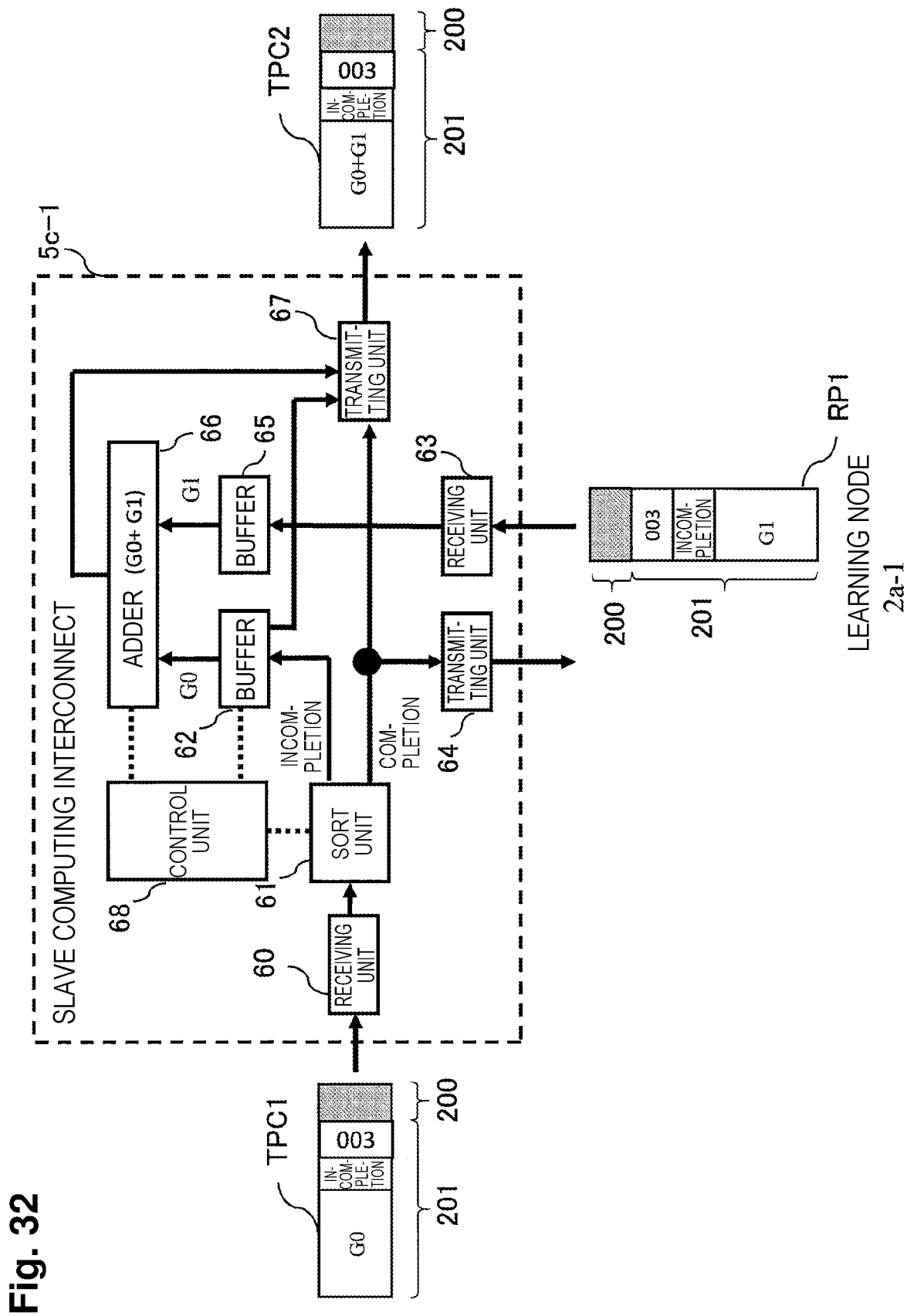
FIG. 32 is a diagram for explaining operation of the slave computing interconnect device of the distributed deep learning system according to the sixth embodiment of the present invention.

FIG. 32 shows operation of the slave computing interconnect device 5c-1 in FIG. 28(B).

The reception unit 60 of the slave computing interconnect device 5c-1 extracts the gradient value G0, the sequential number, and the reception completion flag from the data payload of the communication packet TPC1 received from the master computing interconnect device 4c and passes the gradient value G0, the sequential number, and the reception completion flag to the sort unit 61.

Since the reception completion flag received from the reception unit 60 indicates "incompletion", the sort unit 61 stores the gradient value G0, the sequential number, and the reception completion flag received from the reception unit 60 in the buffer memory 62.

On the other hand, the reception unit 63 of the slave computing interconnect device 5c-1 extracts the gradient value G1, the sequential number, and the reception completion flag from the data payload of the communication packet RP1 received from the learning node 2a-1 directly under the slave computing interconnect device 5c-1 and stores the gradient value G1, the sequential number, and the reception completion flag in the buffer memory 65.

At a point in time when the gradient values G0 and G1 having the same sequential number are gathered in the buffer memory 62 and the buffer memory 65, the control unit 68 of the slave computing interconnect device 5c-1 reads out the gradient value G0, the sequential number, and the reception completion flag from the buffer memory 62, reads out the gradient value G1, the sequential number, and the reception completion flag from the buffer memory 65, and passes the gradient values G0 and G1 to the adder 66.

The adder 66 adds up the gradient values G0 and G1. The control unit 68 passes the sequential number and the reception completion flag read out from the buffer memory 62 to the transmission unit 67.

The transmission unit 67 of the slave computing interconnect device 5c-1 stores, in the data payload of the communication packet TPC2, the sum G0+G1 of the gradients calculated by the adder 66 and the sequential number and the reception completion flag received from the control unit 68 and transmits the communication packet TPC2 to an adjacent downstream computing interconnect device (the slave computing interconnect device 5c-2 in FIG. 28(B)).

Figure 33:
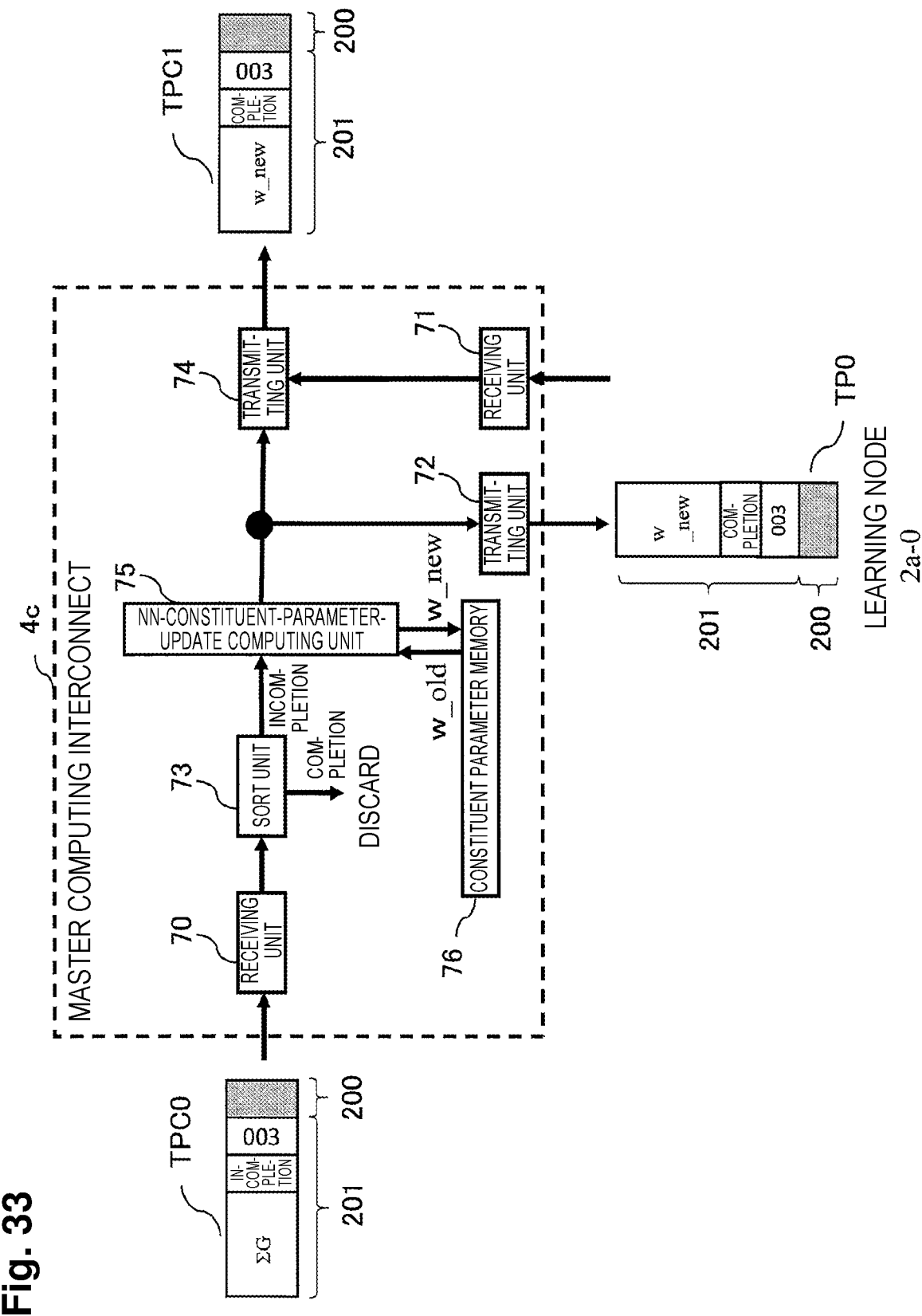
FIG. 33 is a diagram for explaining the operation of the master computing interconnect device of the distributed deep learning system according to the sixth embodiment of the present invention.

FIG. 33 shows operation of the master computing interconnect device 4c in FIG. 28(C).

The reception unit 70 of the master computing interconnect device 4c extracts the sum ΣG of the gradients, the sequential number, and the reception completion flag from the payload of the communication packet TPC0 received from an adjacent upstream computing interconnect device (the slave computing interconnect device 5c-3 in FIG. 28(C)) and passes the sum ΣG of the gradients, the sequential number, and the reception completion flag to the sort unit 73.

Since the reception completion flag received from the reception unit 70 indicates "incompletion", the sort unit 73 passes the sum ΣG of the gradients, the sequential number, and the reception completion flag received from the reception unit 70 to the NN-constituent-parameter-update computation unit 75. At this time, the sort unit 73 passes the reception completion flag received from the reception unit 70 to the NN-constituent-parameter-update computation unit 75 after changing the reception completion flag from "incompletion" to "completion".

As in the second embodiment, at a learning start point in time, in the neural networks 26 of the learning nodes 2a-0 to 2a-3, the same initial values of constituent parameters are set in all the learning nodes 2a-0 to 2a-3. The initial values of the constituent parameters are stored in the constituent parameter memory 76 of the master computing interconnect device 4c.

The NN-constituent-parameter-update computation unit 75 calculates, based on the sum ΣG of the gradients received from the sort unit 73 and the value w_old of the constituent parameters stored in the constituent parameter memory 76, for each of the constituent parameters, the value w_new after the update of the constituent parameters of the neural networks. The NN-constituent-parameter-update computation unit 75 outputs a result of the calculation and the sequential number and the reception completion flag received from the sort unit 73 to the transmission units 72 and 74. When, for example, the gradient descent method is used as an updating method, the calculation like Expression (5) is performed.

The NN-constituent-parameter-update computation unit 75 outputs the value w_new after the update of the constituent parameters to the transmission units 72 and 74 and, at the same time, overwrites the values of the constituent parameters stored in the constituent parameter memory 76 with the value w_new after the update.

The transmission unit 72 stores, in the data payload of the communication packet TP0, the value w_new after the update of the constituent parameters, the sequential number, and the reception completion flag received from the NN-constituent-parameter-update computation unit 75 and transmits the communication packet TP0 to the learning node 2a-0.

The transmission unit 74 stores, in the data payload of the communication packet TPC1, the value w_new after the update of the constituent parameters, the sequential number, and the reception completion flag received from the NN-constituent-parameter-update computation unit 75 and transmits the communication packet TRC1 to an adjacent downstream computing interconnect device (the slave computing interconnect device 5c-1 in FIG. 28(C)).

Figure 28:
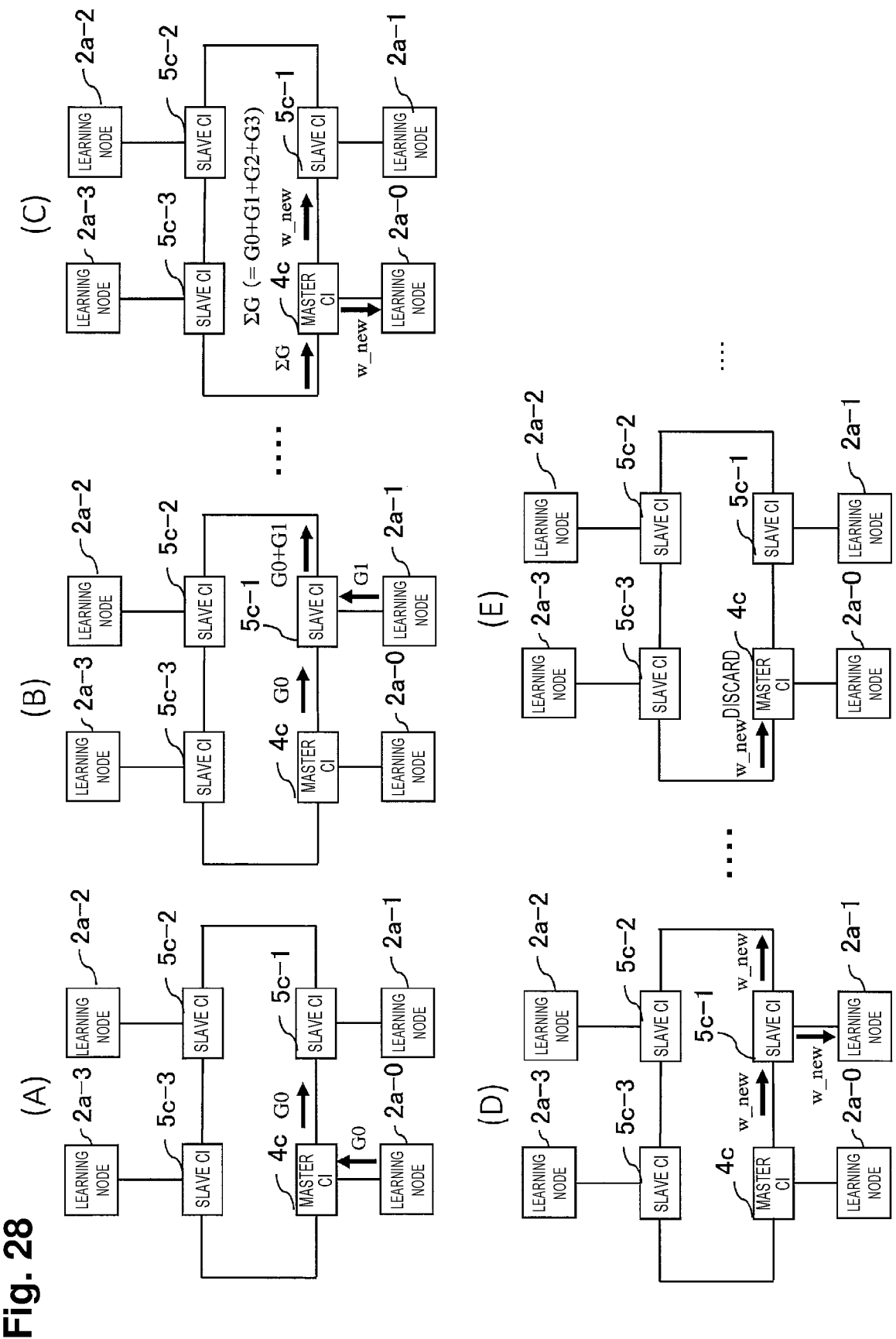
FIG. 28 is a diagram for explaining operation of the distributed deep learning system according to the sixth embodiment of the present invention.
Figure 34:
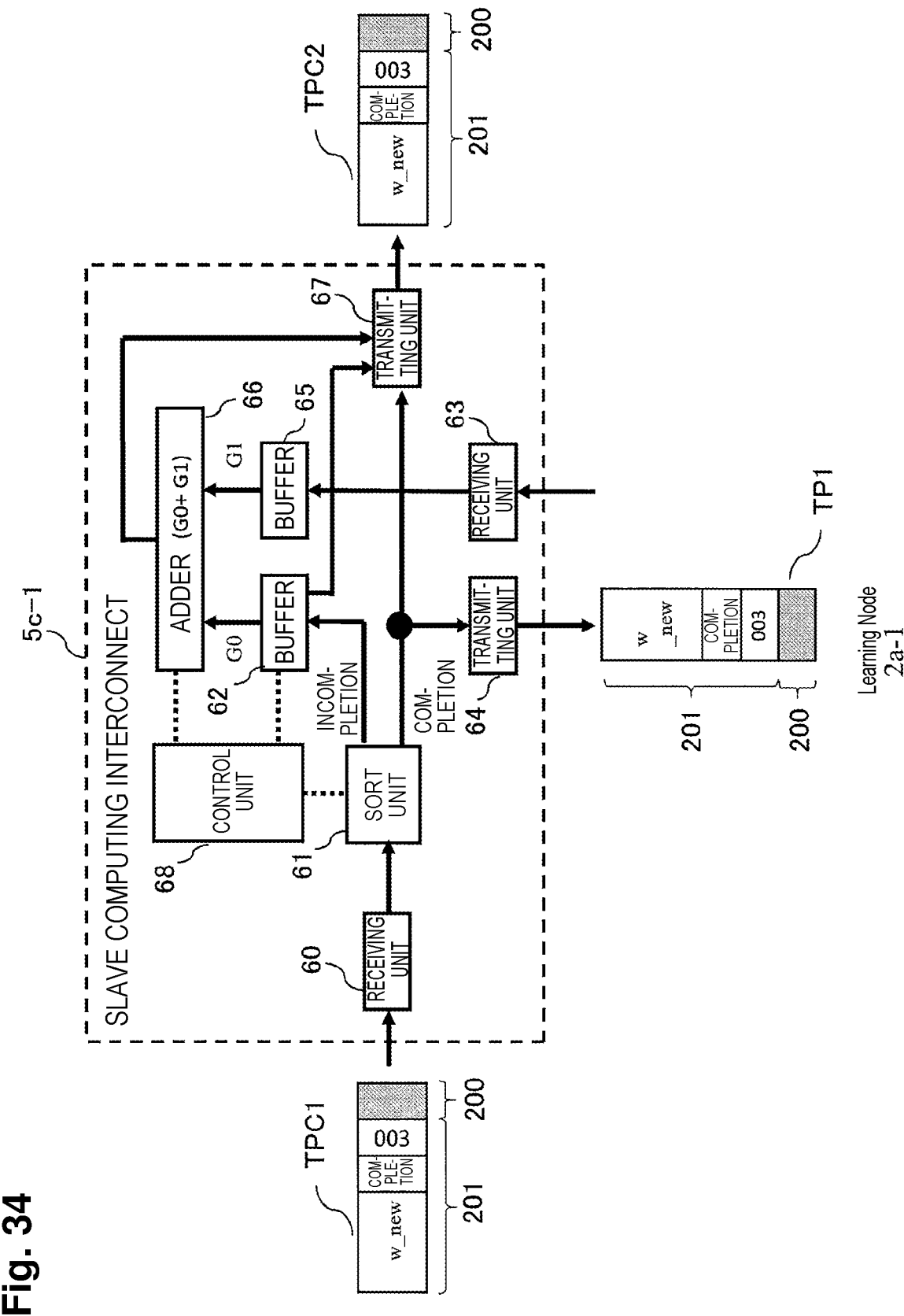
FIG. 34 is a diagram for explaining the operation of the slave computing interconnect device of the distributed deep learning system according to the sixth embodiment of the present invention.

FIG. 34 shows operation of the slave computing interconnect device 5c-1 in FIG. 28 (D).

The reception unit 60 of the slave computing interconnect device 5c-1 extracts the value w_new after the update of the constituent parameters, the sequential number, and the reception completion flag from the data payload of the communication packet TPC1 received from the master computing interconnect device 4c and passes the value w_new after the update of the constituent parameters, the sequential number, and the reception completion flag to the sort unit 61.

Since the reception completion flag received from the reception unit 60 indicates "completion", the sort unit 61 passes the value w_new after the update of the constituent parameters, the sequential number, and the reception completion flag received from the reception unit 60 to the transmission unit 64 and the transmission unit 67.

The transmission unit 64 stores, in the data payload of the communication packet TP1, the value w_new after the update of the constituent parameters, the sequential number, and the reception completion flag received from the sort unit 61 and transmits the communication packet TP1 to the learning node 2a-1.

The transmission unit 67 stores, in the data payload of the communication packet TPC2, the value w_new after the update of the constituent parameters, the sequential number, and the reception completion flag received from the sort unit 61 and transmits the communication packet TPC2 to an adjacent downstream computing interconnect device (the slave computing interconnect device 5c-2 in FIG. 28(D)).

Figure 35:
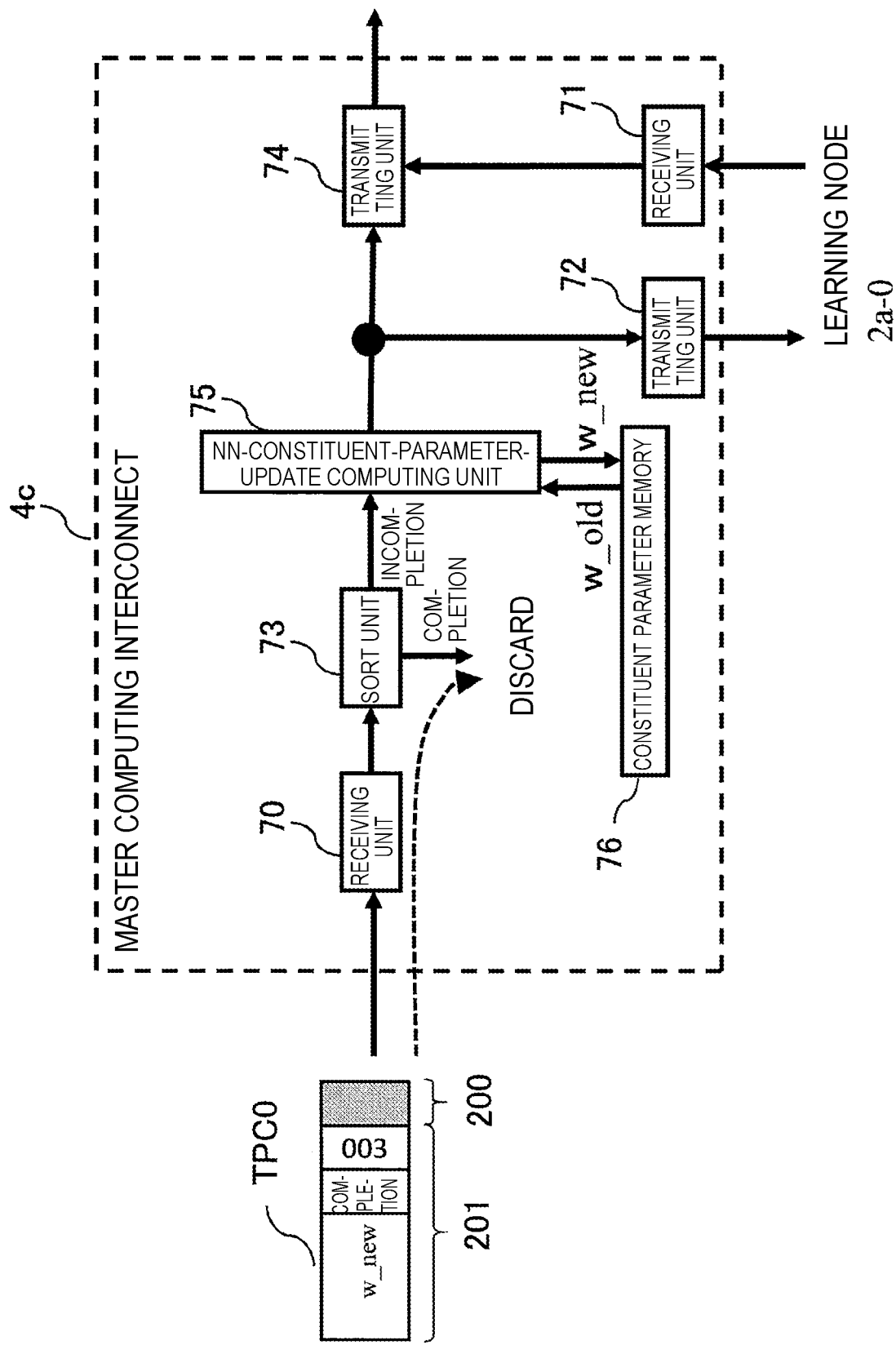
FIG. 35 is a diagram for explaining the operation of the master computing interconnect device of the distributed deep learning system according to the sixth embodiment of the present invention.
Figure 36:
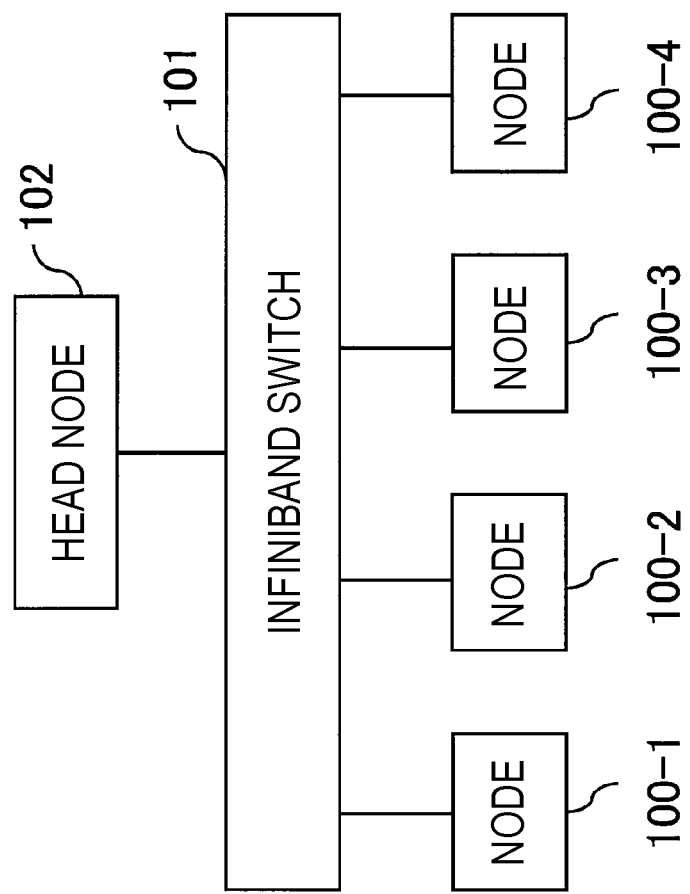
FIG. 36 is a block diagram showing a configuration of a conventional distributed deep learning system.

FIG. 35 shows operation of the master computing interconnect device 4c in FIG. 28(E).

The reception unit 70 of the master computing interconnect device 4c extracts the value w_new after the update of the constituent parameters, the sequential number, and the reception completion flag from the payload of the communication packet TPC0 received from an adjacent upstream computing interconnect device (the slave computing interconnect device 5c-3 in FIG. 28(E)) and passes the value w_new after the update of the constituent parameters, the sequential number, and the reception completion flag to the sort unit 73.

Since the reception completion flag received from the reception unit 70 indicates "completion", the sort unit 73 discards the value w_new after the update of the constituent parameters, the sequential number, and the reception completion flag received from the reception unit 70.

According to the operation explained above, the value w_new after the update of the constituent parameters is transmitted to the learning nodes 2a-0 to 2a-3. The learning nodes 2a-0 to 2a-3 update the constituent parameters of the neural networks 26 by overwriting the constituent parameters of the neural networks 26, which are specified by the sequential number, with the value w_new after the update of the constituent parameters.

Configurations of the learning nodes 2a-0 to 2a-3 are the same as the configuration in the second embodiment shown in FIG. 10. This embodiment is different from the second embodiment in the following points. The transmission units 23 of the learning nodes 2a-0 to 2a-3 write the reception completion flag indicating "incompletion" in the data payloads of the communication packets RP0 to RP3 besides the calculation result of the gradients calculated by the gradient calculation unit 22 and the sequential number and transmit the communication packets RP0 and RP3 to the master computing interconnect device 4c and the slave computing interconnect devices 5c-1 to 5c-3 directly above the learning nodes 2a-0 to 2a-3.

In this embodiment, since the computing interconnect devices 4c and 5c-1 to 5c-3 are used for the All-reduce processing and the update calculation of the constituent parameters of the neural networks, although there is a slight delay based on fluctuation in arrival times of communication packets from the learning nodes 2a-0 to 2a-3, transmission and reception processing for the communication packets between the computing interconnect devices 4c and 5c-1 to 5c-3 and the learning nodes 2a-0 to 2a-3 and the arithmetic processing such as the addition of the gradients and the update calculation of the constituent parameters can be performed by hardware processing simultaneously in parallel and at high speed. Therefore, it is possible to perform processing at high speed compared with when the communication processing and the gradient addition processing are performed by software processing in the head node of the conventional technique.

In particular, in this embodiment, it is possible to achieve an increase in speed by preparing a dedicated arithmetic circuit for the update calculation processing for the constituent parameters as well. As the sum calculation for the gradients and the update calculation for the constituent parameters, the same calculation only has to be performed independently for each of the constituent parameters irrespective of the configurations of the neural networks 26. Therefore, there is also an advantage that, even when the configurations of the neural networks 26 in the learning nodes 2a-0 to 2a-3 are changed, the same dedicated arithmetic circuit can be used as the arithmetic units of the computing interconnect devices 4c and 5c-1 to 5c-3.

Further, by connecting the computing interconnect devices 4c and 5c-1 to 5c-3 in a ring shape as in this embodiment, there is also an advantage that, even when many learning nodes 2a-0 to 2a-3 are connected to the computing interconnect devices 4c and 5c-1 to 5c-3, a communication band of the ring-type communication network 8 may be fixed irrespective of the number of the learning nodes 2a-0 to 2a-3.

Each of the learning nodes explained in the first to sixth embodiments can be realized by a computer including a CPU (Central Processing Unit), a storage device, and an interface and a program for controlling these hardware resources. The CPU of each of the learning nodes executes the processing explained in the first to sixth embodiments according to the program stored in the storage device of each of the learning nodes.

INDUSTRIAL APPLICABILITY

Embodiments of the present invention can be applied to a technique for performing machine learning of a neural network.

REFERENCE SIGNS LIST 1, 1a computing interconnect device
2-0 to 2-15, 2a-0 to 2a-15 learning node
3, 6 to 9 communication network
4, 4a to 4c master computing interconnect device
5-0 to 5-3, 5a-0 to 5a-3, 5b-1 to 5b-3, 5c-1 to 5c-3 slave computing interconnect device
10-0 to 10-3, 24, 24a, 40-0 to 40-3, 50-0 to 50-3, 56, 60, 63, 70, 71 reception unit
11-0 to 11-3, 41-0 to 41-3, 51-0 to 51-3, 62, 65 buffer memory
12, 42, 52, 66 adder 13-0 to 13-3, 13a-0 to 13a-3, 23, 43-0 to 43-3, 43a-0 to 43a-3, 53-0 to 53-3, 55, 64, 67, 72, 74 transmission unit
14-0 to 14-3, 14a-0 to 14a-3, 44-0 to 44-3, 44a-0 to 44a-3, 54-0 to 54-3, 68 control unit
15, 45, 76 constituent parameter memory
16, 46, 75 NN-constituent-parameter-update computation unit
20 input unit
21 loss-function calculation unit
22 gradient calculation unit
25, 25a constituent-parameter update unit
26 neural network
57 transfer unit
61, 73 sort unit.

The invention claimed is:

1. A distributed deep learning system comprising:
a plurality of learning nodes; and
a plurality of computing interconnect device connected to the plurality of learning nodes via a communication network;
wherein each learning node of the plurality of learning nodes comprises:
one or more first processors; and
a first non-transitory computer-readable storage medium storing a first program to be executed by the one or more first processors, the first program including instructions to:
calculate a gradient of a loss function from an output result obtained by inputting learning data to a learning target neural network corresponding to the learning node;
convert the gradient of the loss function into a first packet;
transmit the first packet to a computing interconnect device of the plurality of computing interconnect devices;
acquire a value stored in a second packet received from the computing interconnect device; and
update a constituent parameter of the learning target neural network based on the value stored in the second packet; and
wherein a first computing interconnect device of the plurality of computing interconnect devices that is positioned at highest order among the plurality of computing interconnect devices comprises:
one or more second processors; and
a second non-transitory computer-readable storage medium storing a second program to be executed by the one or more second processors, the second program including instructions to:
receive a third packet from a second computing interconnect device of the plurality of computing interconnect devices, the second computing interconnect device is at an immediately lower order than the first computing interconnect device;
receive a fourth packet transmitted from a first learning node of the plurality of learning nodes that is connected to the first interconnect computing device;
acquire a value of a gradient stored in the third packet and a value of a gradient stored in the fourth packet;
perform calculation processing on the value of the gradient in the third packet and the value of the gradient in the fourth packet;
convert a calculation result of the calculation processing into a fifth packet; and
transmit the fifth packet to the second computing interconnect device at the immediately lower order than the first computing interconnect device and to the first learning node connected to the first computing interconnect device.

2. The distributed deep learning system of claim 1, wherein the first computing interconnect device further comprises a constituent parameter memory that stores a respective constituent parameter of a respective learning target neural network of each of the plurality of learning nodes.

3. The distributed deep learning system of claim 2, wherein the second program comprises further instructions to:
calculate, based on the calculation result of the calculation processing, an updated value of a first constituent parameter of a first learning target neural network stored in the constituent parameter memory, wherein the first learning target neural network corresponds to one of the plurality of learning nodes; and
update the first constituent parameter stored in the constituent parameter memory with the updated value.

4. A distributed deep learning system comprising:
a plurality of learning nodes; and
a plurality of computing interconnect devices connected to the plurality of learning nodes or other devices via a communication network;
wherein each learning node of the plurality of learning nodes comprises:
a gradient calculator that calculates a gradient of a loss function from a respective output result obtained by inputting learning data to a learning target neural network corresponding to the learning node;
a first transmitter that converts a calculation result of the gradient calculator into a first packet and transmits the first packet to a computing interconnect device of the plurality of computing interconnect devices connected to the learning node;
a first receiver that receives a second packet transmitted from the computing interconnect device connected to the learning node and acquires a value stored in the second packet; and
a constituent-parameter updater that updates a constituent parameter of the learning target neural network based on the value stored in the second packet;
wherein a first computing interconnect device of the plurality of computing interconnect devices that is positioned at highest order among the plurality of computing interconnect devices comprises:
a second receiver that:
receives a third packet transmitted from a second computing interconnect device of the plurality of computing interconnect devices, the second computing interconnect device is at an immediately lower order than the first computing interconnect device; and
receives a fourth packet transmitted from a first learning node of the plurality of learning nodes that is connected to the first computing interconnect device and
acquires a value of a gradient stored in the third packet and a value of a gradient stored in the fourth packet;
a first calculator that receives and performs calculation processing on the value of the gradient stored in the third packet and the value of the gradient stored in the fourth packet; and a second transmitter that converts a calculation result of the first calculator into a fifth packet and transmits the fifth packet to the second computing interconnect device at the immediately lower order than the first computing interconnect device and to the first learning node connected to the first computing interconnect device, and wherein a another computing interconnect device of the plurality of computing interconnect devices at a lower order than the first computing interconnect device comprises:

a third receiver that:
  receives a sixth packet transmitted from a third computing interconnect device at an immediately lower order than the another computing interconnect device or transmitted from a second learning node of the plurality of learning nodes connected to the another computing interconnect device; and
  acquires a value of a gradient stored in the sixth packet;

a second calculator that receives and performs calculation processing on the value of the gradient in the sixth packet and performs calculation processing; and a third transmitter that converts a calculation result of the second calculator into a seventh packet and transmits the seventh packet to a fourth computing interconnect device at an immediately higher order than the another computing interconnect device.

5. The distributed deep learning system of claim 4, wherein the third transmitter further forwards an eighth packet transmitted from the fourth computing interconnect device to the third computing interconnect device or the second learning node.

6. The distributed deep learning system of claim 4, wherein:
  the third receiver receives an eighth packet transmitted from the fourth computing interconnect device and acquires a value stored in the eighth packet; and
  the third transmitter converts the value stored in the eight packet into a ninth packet and transmits the ninth packet to the fourth computing interconnect device or the second learning node.

7. The distributed deep learning system of claim 4, wherein the first computing interconnect device further comprises a constituent parameter memory that stores a respective constituent parameter of a respective learning target neural network of each of the plurality of learning nodes.

8. The distributed deep learning system of claim 7, wherein the first computing interconnect device further comprises:
  a constituent-parameter-updater that calculates, based on the calculation result of the first calculator and a value of a first constituent parameter of a first learning target neural network stored in the constituent parameter memory, an updated value and updates the value of the first constituent parameter stored in the constituent parameter memory with the updated value, wherein the first learning target neural network corresponds to one of the plurality of learning nodes.

9. The distributed deep learning system of claim 8, wherein the second transmitter converts the updated value into a ninth packet and transmits the ninth packet to the second computing interconnect device at the immediately lower order than the first computing interconnect device and to the first learning node connected to the first computing interconnect device.

10. The distributed deep learning system of claim 9, wherein a respective constituent-parameter updater of each of the plurality of learning nodes overwrites a respective constituent parameter of a respective learning target neural network with the updated value acquired by a respective first receiver.

11. The distributed deep learning system of claim 4, wherein the plurality of computing interconnect devices are connected by a ring-type communication network that performs communication in only one direction.

12. A distributed deep learning system comprising:
a plurality of learning nodes; and
a plurality of computing interconnect devices connected to the plurality of learning nodes or other devices via a communication network;
wherein the plurality of computing interconnect devices are connected by a ring-type communication network that performs communication in only one direction;
wherein each learning node of the plurality of learning nodes includes:
  a gradient calculator that calculates a gradient of a loss function from a output result obtained by inputting learning data to a learning target neural network of the learning node;
  a first transmitter that converts a calculation result of the gradient calculator into a first packet and transmits the first packet to a computing interconnect device of the plurality of computing interconnect devices connected to the learning node;
  a first receiver that receives a second packet transmitted from the computing interconnect device connected to the learning node and acquires a value stored in the second packet; and
  a constituent-parameter updater that updates a constituent parameter of the learning target neural network based on the value stored in the second packet;
wherein a first computing interconnect device of the plurality of computing interconnect devices comprises:
  a constituent parameter memory that stores a respective constituent parameter of a learning target neural network of each of the plurality of learning nodes;
  a second receiver that receives a third packet transmitted from a first learning node connected to the first computing interconnect device and acquires a value of a gradient stored in the third packet;
  a third receiver that receives a fourth packet transmitted from a second computing interconnect device adjacent and upstream to the first computing interconnect device and acquires a value of a gradient stored in the fourth packet;
  a first sorter that outputs the value of the gradient stored in the fourth packet and in response to acquiring a value of a gradient that was previously acquired discards the value of the gradient that was previously acquired;
  a constituent-parameter-update calculator that calculates, based on the value of the gradient output from the first sorter and a value of a first constituent parameter of a first learning target neural network stored in the constituent parameter memory, an updated value of the first constituent parameter and updates the value of the first constituent parameter stored in the constituent parameter memory, wherein the first learning target neural network corresponds to one of the plurality of learning nodes;
  a second transmitter that converts the value of the gradient stored in the third packet or the updated value of the first constituent parameter into a fifth packet and transmits the fifth packet to a third computing interconnect device adjacent and downstream to the first computing interconnect device; and a third transmitter that converts the updated value of the first constituent parameter into a sixth packet and transmits the sixth packet to the first learning node connected to the first computing interconnect device; and wherein a fourth computing interconnect device of the plurality of computing interconnect devices and different than the first computing interconnect device comprises:

a fourth receiver that receives a seventh packet transmitted from a fifth computing interconnect device adjacent and upstream to the fourth computing interconnect device upstream and acquires a value stored in the seventh packet;

a fifth receiver that receives an eighth packet transmitted from a second learning node connected to the fourth computing interconnect device and acquires a value of a gradient stored in the eighth packet;

a second sorter that sorts the value stored in the seventh packet as a value of incomplete calculation processing for a gradient and the updated value of the first constituent parameter;

a calculator that receives, as an input, the value of the incomplete calculation processing and the value of the gradient stored in the eighth packet and performs calculation processing;

a fourth transmitter that converts a calculation result of the calculator or the updated value of the first constituent parameter into ninth a packet and transmits the ninth packet to a sixth computing interconnect device adjacent and downstream to the fourth computing interconnect device; and a fifth transmitter that converts the value after the updated value of the first constituent parameter into a tenth packet and transmits the tenth packet to the second learning node connected to the fourth computing interconnect device; and wherein a respective constituent-parameter updater of each of the plurality of learning nodes overwrites a respective constituent parameter of a respective learning target neural network with the updated value of the first constituent parameter.

* * * * *